United States Patent
Migita et al.

(10) Patent No.: US 11,946,754 B2
(45) Date of Patent: Apr. 2, 2024

(54) INFORMATION PROCESSING APPARATUS, INFORMATION PROCESSING METHOD, AND PROGRAM

(71) Applicant: Sony Corporation, Tokyo (JP)

(72) Inventors: Takahito Migita, Tokyo (JP); Katsutoshi Kanamori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 598 days.

(21) Appl. No.: 17/059,274

(22) PCT Filed: May 24, 2019

(86) PCT No.: PCT/JP2019/020605
§ 371 (c)(1),
(2) Date: Nov. 27, 2020

(87) PCT Pub. No.: WO2019/235252
PCT Pub. Date: Dec. 12, 2019

(65) Prior Publication Data
US 2021/0231445 A1    Jul. 29, 2021

(30) Foreign Application Priority Data

Jun. 8, 2018  (JP) ............................... 2018-110262
Aug. 3, 2018  (JP) ............................... 2018-146503
Jan. 21, 2019  (JP) ............................... 2019-007599

(51) Int. Cl.
*G01C 21/34*  (2006.01)
*G01C 21/36*  (2006.01)
(Continued)

(52) U.S. Cl.
CPC ..... *G01C 21/3438* (2013.01); *G01C 21/3667* (2013.01); *G01C 21/3697* (2013.01); *G06Q 10/025* (2013.01); *G06Q 50/30* (2013.01)

(58) Field of Classification Search
CPC ............ G01C 21/3438; G01C 21/3667; G01C 21/3697; G06Q 10/025
See application file for complete search history.

(56) References Cited

U.S. PATENT DOCUMENTS 10,816,351 B1* 10/2020 Yao ..................... G01C 21/3484
2004/0260433 A1* 12/2004 Sawada .................. B60Q 9/006
701/1

(Continued)

FOREIGN PATENT DOCUMENTS

CN    102881152 A    1/2013
JP    2001222798 A    8/2001

(Continued)

OTHER PUBLICATIONS

International Search Report and Written Opinion dated Aug. 13, 2019 for PCT/JP2019/020605 filed on May 24, 2019, 12 pages including English Translation of the International Search Report.

Primary Examiner — James M McPherson
Assistant Examiner — Kyle J Kingsland
(74) Attorney, Agent, or Firm — XSENSUS LLP

(57) ABSTRACT

The present technique relates to an information processing apparatus, an information processing method, and a program which enable a prediction result that contributes toward improving a pick-up ratio to be presented. The information processing apparatus includes: a display control portion configured to divide a business area of a business vehicle into a plurality of areas and cause a display portion to display, as a prediction result, a movement direction and a movement distance of passengers in an attention area being the area of attention among the plurality of areas for which a pick-up demand has been predicted per area. For example, the present technique can be applied to an information (Continued)

processing apparatus or the like for displaying a prediction result of a pick-up demand of a taxi.

19 Claims, 45 Drawing Sheets

(51) Int. Cl.
*G06Q 10/02* (2012.01)
*G06Q 50/30* (2012.01)

(56) References Cited

U.S. PATENT DOCUMENTS

| | | | |
|---|---|---|---|
| 2016/0300318 A1* | 10/2016 | Godil | G06Q 50/30 |
| 2016/0371722 A1* | 12/2016 | Maginnis | G06Q 30/0243 |
| 2017/0098377 A1* | 4/2017 | Marco | G06Q 30/0202 |
| 2018/0096445 A1* | 4/2018 | Eyler | G06Q 50/30 |
| 2019/0017839 A1* | 1/2019 | Eyler | G02B 27/01 |
| 2019/0295408 A1* | 9/2019 | Wynter | G06Q 50/30 |
| 2019/0378180 A1* | 12/2019 | Endras | G06Q 30/0283 |

FOREIGN PATENT DOCUMENTS

| | | |
|---|---|---|
| JP | 2002-342890 A | 11/2002 |
| JP | 2006-195913 A | 7/2006 |
| JP | 2008-65396 A | 3/2008 |
| JP | 2009-145080 A | 7/2009 |
| JP | 2012088925 A | 5/2012 |
| JP | 2013-171566 A | 9/2013 |
| JP | 2014006890 A | 1/2014 |
| JP | 2014-157040 A | 8/2014 |
| JP | 2016-75981 A | 5/2016 |
| JP | 2017146808 A | 8/2017 |
| JP | 2017-194863 A | 10/2017 |

\* cited by examiner

Fig. 4

| COMPANY ID | RADIO ID | DRIVER ID | STATUS TIME POINT | LATITUDE | LONGITUDE | DIRECTION | SPEED | STATUS |
|---|---|---|---|---|---|---|---|---|
| 7 | 23 | 449 | 2017/2/14 0:00 | 35.64388 | 139.8978 | 315 | 18 | FOR HIRE |
| 7 | 23 | 449 | 2017/2/14 0:01 | 35.63872 | 139.8894 | 225 | 18 | FOR HIRE |
| 7 | 23 | 449 | 2017/2/14 0:02 | 35.63753 | 139.8823 | 270 | 18 | FOR HIRE |
| 7 | 23 | 449 | 2017/2/14 0:03 | 35.64084 | 139.8727 | 270 | 18 | FOR HIRE |
| 7 | 23 | 449 | 2017/2/14 0:04 | 35.64646 | 139.8554 | 270 | 18 | FOR HIRE |
| 7 | 23 | 449 | 2017/2/14 0:05 | 35.64744 | 139.8386 | 270 | 18 | FOR HIRE |
| 7 | 23 | 449 | 2017/2/14 0:06 | 35.64621 | 139.8242 | 270 | 18 | FOR HIRE |
| 7 | 23 | 449 | 2017/2/14 0:07 | 35.64538 | 139.8169 | 225 | 18 | FOR HIRE |
| 7 | 23 | 449 | 2017/2/14 0:08 | 35.65267 | 139.8115 | 360 | 18 | FOR HIRE |

Fig. 13
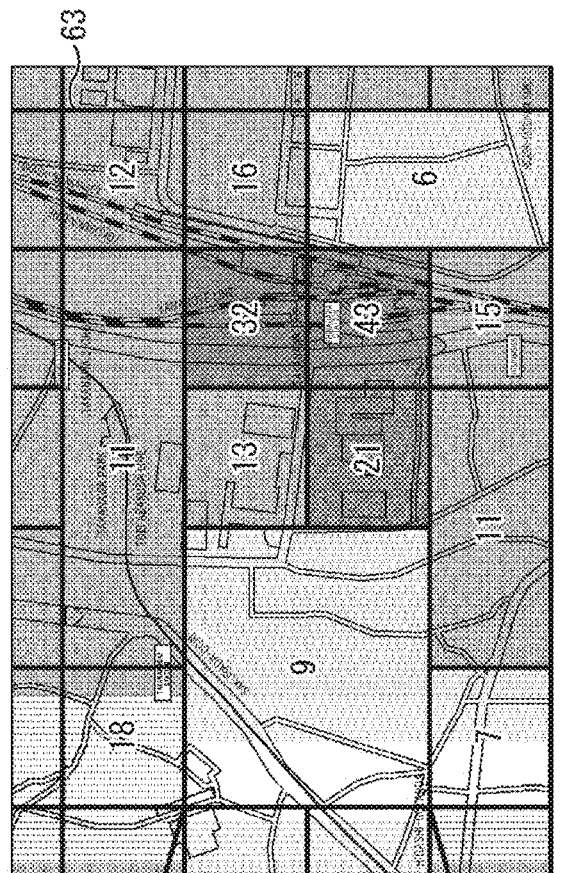
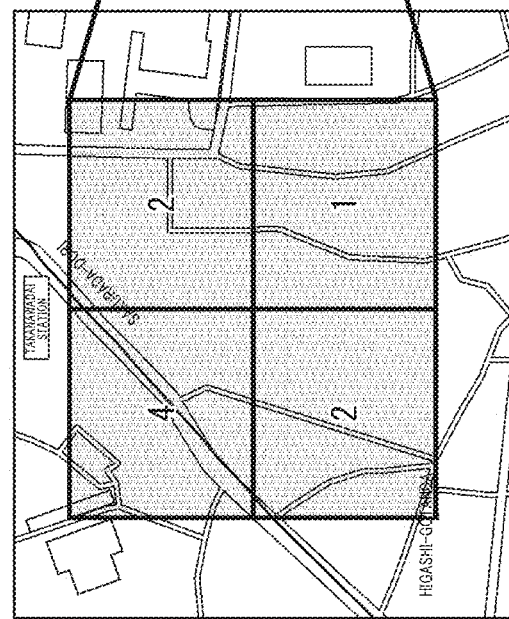

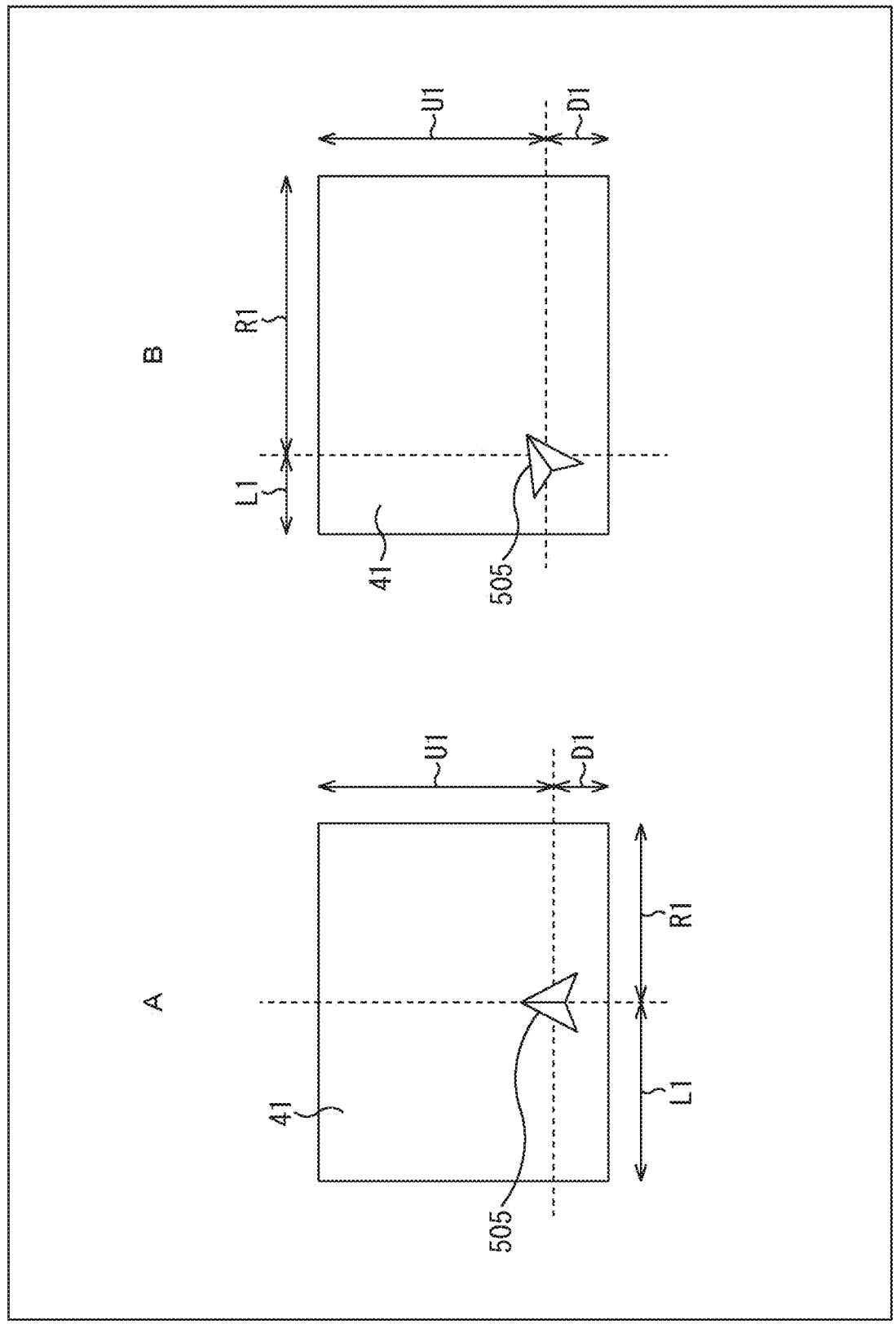

INFORMATION PROCESSING APPARATUS, INFORMATION PROCESSING METHOD, AND PROGRAM

CROSS-REFERENCE TO RELATED APPLICATIONS

The present application is based on PCT filing PCT/JP2019/020605, filed May 24, 2019, which claims priority to JP 2018-110262, filed Jun. 8, 2018, which claims priority to JP 2018-146503, filed Aug. 3, 2018, which claims priority to JP 2019-007599, filed Jan. 21, 2019, the entire contents of each are incorporated herein by reference.

TECHNICAL FIELD

The present technique relates to an information processing apparatus, an information processing method, and a program and, particularly, to an information processing apparatus, an information processing method, and a program configured to be capable of presenting a prediction result that contributes toward improving a pick-up ratio.

BACKGROUND ART

In the taxi business, initiatives to predict demands for taxis and conduct business in a more effective manner are being actively promoted (for example, refer to PTL 1)

CITATION LIST

Patent Literature

[PTL 1]
JP 2017-194863A

SUMMARY

Technical Problem

In a system that predicts demands for taxis, what kind of a prediction result is to be presented plays an important role in increasing a pick-up ratio.

The present technique has been devised in consideration of the situation described above and an object thereof is to enable a prediction result that contributes toward improving a pick-up ratio to be presented.

Solution to Problem

An information processing apparatus according to an aspect of the present technique includes a display control portion configured to divide a business area of a business vehicle into a plurality of areas and cause a display portion to display, as a prediction result, a movement direction and a movement distance of passengers in an attention area being the area of attention among the plurality of areas for which a pick-up demand has been predicted for each area.

An information processing method according to an aspect of the present technique includes an information processing apparatus dividing a business area of a business vehicle into a plurality of areas and causing a display portion to display, as a prediction result, a movement direction and a movement distance of passengers in an attention area being the area of attention among the plurality of areas for which a pick-up demand has been predicted for each area.

A program according to an aspect of the present technique causes a computer to execute processing for: dividing a business area of a business vehicle into a plurality of areas; and causing a display portion to display, as a prediction result, a movement direction and a movement distance of passengers in an attention area being the area of attention among the plurality of areas for which a pick-up demand has been predicted for each area.

In an aspect of the present technique, a business area of a business vehicle is divided into a plurality of areas, and a display portion is caused to display, as a prediction result, a movement direction and a movement distance of passengers in an attention area being the area of attention among the plurality of areas for which a pick-up demand has been predicted for each area.

The program can be provided by being transmitted via a transmission medium or being recorded in a recording medium.

The information processing apparatus according to an aspect of the present technique can be realized by having a computer execute the program.

In addition, in order to realize the information processing apparatus according to an aspect of the present technique, the program to be executed by the computer can be provided by being transmitted via a transmission medium or being recorded in a recording medium.

The information processing apparatus may be an independent apparatus or an internal block that constitutes a single apparatus.

Advantageous Effects of Invention

According to an aspect of the present technique, a prediction result that contributes toward improving a pick-up ratio can be presented.

It should be noted that the advantageous effects described above are not necessarily restrictive and any of the advantageous effects described in the present disclosure may apply.

BRIEF DESCRIPTION OF DRAWINGS

FIG. 4 is a diagram showing an example of vehicle dynamic log data.

FIG. 13 is a diagram showing a first display example of the demand prediction screen.

FIG. 43 is a diagram showing an example of the demand prediction screen displaying additional information in consideration of a distance or a bearing.

FIG. 44 is a diagram showing an example of the demand prediction screen displaying information in accordance with a travel direction.

DESCRIPTION OF EMBODIMENT

Hereinafter, a mode (hereinafter, referred to as an embodiment) for implementing the present technique will be described. The description will be given in the following order.

1. Configuration example of prediction system
  2. Example of screen of demand prediction application
  3. Block diagram
  4. Hired vehicle sequence data generation processing
  5. Learning prediction processing
  6. Unknown area cluster classification processing
  7. Combined display of areas AR
  8. Display of demand direction and frequency
  9. Display of pinpoint prediction
  10. Display of prediction of queueing time
  11. Display of prediction of degree of long distance
  12. Display of prediction of ride distance
  13. Display of prediction of fare
  14. Learning of pick-up position
  15. Learning of drop-off position
  16. Learning of pick-up position
  17. Pick-up demand guidance by sound
  18. Recommended route presentation processing
  19. No-pick-up zone guide display
  20. Queue location display
  21. Train time display
  22. Reverse pick-up point display
  23. Display of demand prediction classification of pre-booking, hailing, and queueing
  24. Display of fare prediction
  25. Display of number of vehicles for hire in real time
  26. Display of one-day business evaluation
  27. Display of additional information in consideration of distance and bearing
  28. Display of information in accordance with travel direction
  29. Configuration example of computer 1. Configuration Example of Prediction System FIG. 1 shows a configuration example of an embodiment of a prediction system to which the present technique has been applied.

Figure 1:
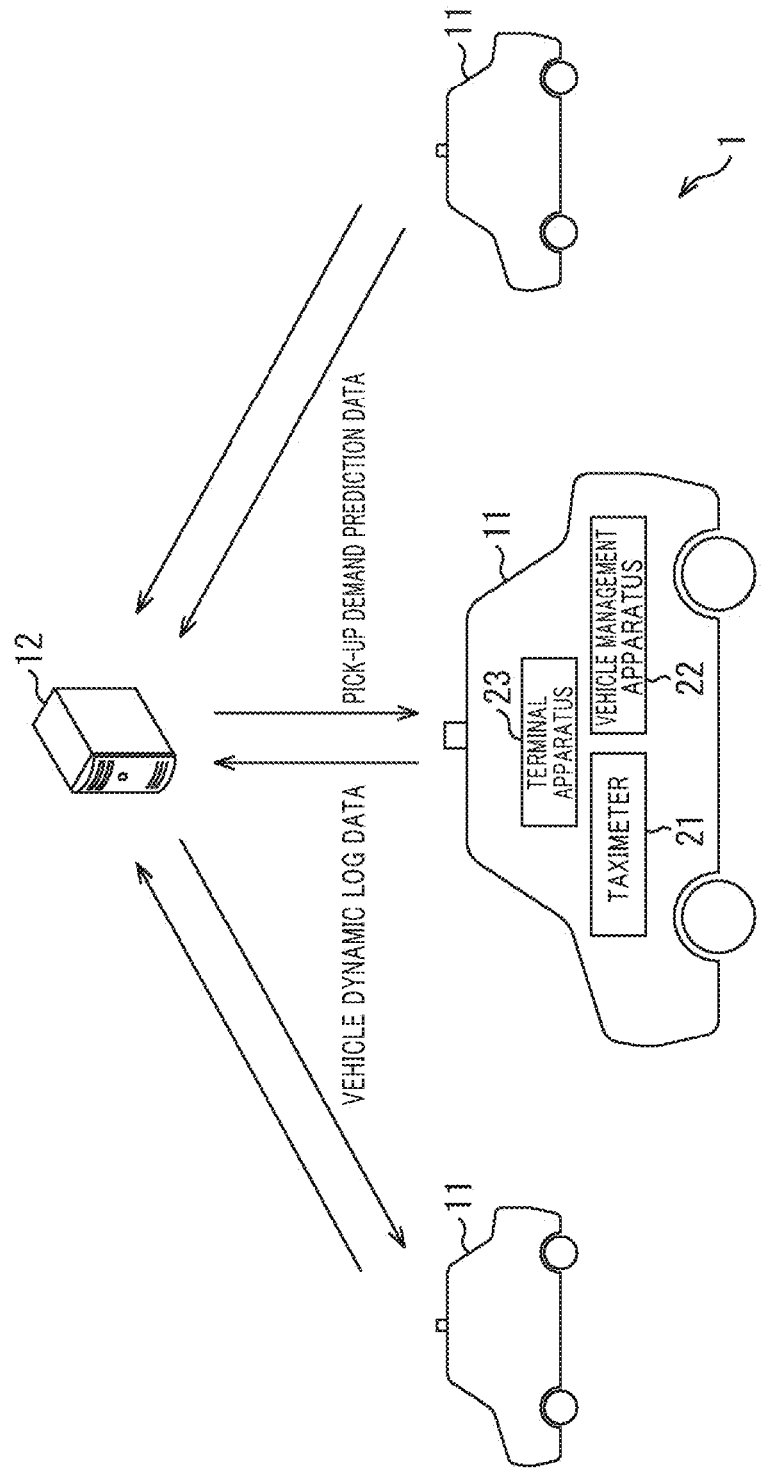
FIG. 1 is a block diagram showing a configuration example of an embodiment of a prediction system to which the present technique has been applied.

A prediction system 1 shown in FIG. 1 is a system which is constituted by a plurality of taxis 11 and a server (an information processing apparatus) 12 and which predicts a demand for rides in a business area of the taxis 11 based on data acquired from the taxis 11.

The taxi 11 is a business vehicle that travels in a prescribed business area and picks up a passenger. The taxi 11 is mounted with a taximeter 21, a vehicle management apparatus 22, and a terminal apparatus 23.

The taximeter 21 accepts operations of "hired" and "for hire" by a driver. "Hired" represents a state where the taxi 11 has picked up a passenger and is traveling, and "for hire" represents a state the taxi 11 is traveling without picking up a passenger. When "hired", the taximeter 21 calculates a fare (price of passage) in accordance with at least one of a travel time and a travel distance and displays the fare on a prescribed display portion.

The vehicle management apparatus 22 generates vehicle dynamic log data that time-sequentially records positions (paths) traveled by the taxi 11, a status of "hired" or "for hire", and the like at prescribed time intervals and transmits the generated vehicle dynamic log data to the server 12 via a prescribed network. The status of "hired" or "for hire" is acquired from the taximeter 21.

The terminal apparatus 23 is constituted by an information processing apparatus such as a smartphone or a tablet terminal. The terminal apparatus 23 stores an application program (hereinafter, also simply referred to as a demand prediction application) that displays a demand prediction of pick-ups on a display using pick-up demand prediction data transmitted from the server 12.

The demand prediction application is activated and executed on the terminal apparatus 23 by an operation performed by the driver. The demand prediction application receives pick-up demand prediction data transmitted from the server 12 via a prescribed network and, based on the received pick-up demand prediction data, displays a prediction result in which a pick-up demand is predicted on a map on a display. A specific display example of a prediction result that predicts a pick-up demand will be described later with reference to FIG. 2 and the like.

The server 12 acquires vehicle dynamic log data from a plurality of the taxis 11 via a network. In addition, using the large number of acquired pieces of vehicle dynamic log data, the server 12 generates pick-up demand prediction data and transmits the generated pick-up demand prediction data to each of the plurality of taxis 11 via the network.

The network that connects the server 12, the vehicle management apparatus 22, and the terminal apparatus 23 is constituted by, for example, a mobile communication network such as a so-called 3G or 4G network, the Internet, a public telephone network, a satellite communication network, or the like.

The driver of the taxi 11 drives the taxi 11 in order to acquire a passenger while referring to the pick-up demand prediction that is displayed on the display of the terminal apparatus 23 by the demand prediction application.

2. Example of Screen of Demand Prediction Application

Figure 2:
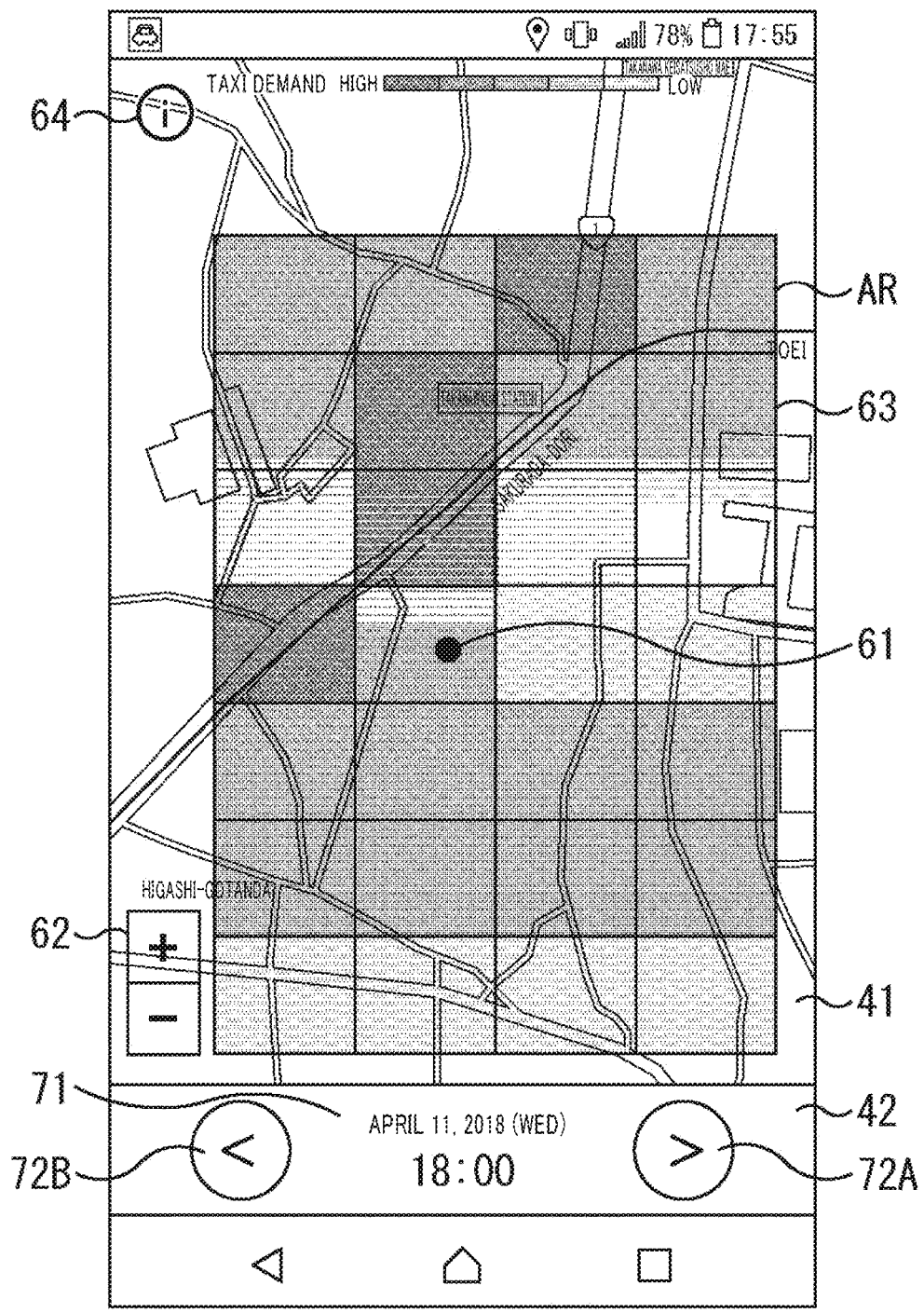
FIG. 2 is a diagram showing an example of a demand prediction screen of a demand prediction application.

FIG. 2 shows an example of the demand prediction screen that is displayed by the demand prediction application in the terminal apparatus 23.

On the demand prediction screen shown in FIG. 2, a map 41 is displayed and, at the same time, a current location symbol 61, a scaling button 62, a demand prediction mesh 63, a setting button 64, and the like are superimposed and displayed on the map 41.

In addition, the demand prediction screen is provided with a prediction time point setting region 42 in a region that differs from a display region of the map 41, and the prediction time point setting region 42 includes a prediction time point display 71 and prediction time point change buttons 72A and 72B.

The current location symbol 61 represents a current location of the taxi 11. The scaling button 62 is operated when enlarging or reducing a scale of the map 41.

The demand prediction mesh 63 is constituted by a plurality of areas ARs being arranged in a matrix pattern. An area AR represents a single region created by dividing the demand prediction mesh 63 in a grid-like manner. While 28 (4 times 7) areas ARs are arranged in a partial region of the map 41 in the example shown in FIG. 2, the areas AR may be superimposed and displayed on an entire region of the map 41.

Each area AR of the demand prediction mesh 63 is displayed in a color or density in accordance with a degree of a pick-up demand based on the pick-up demand prediction data transmitted from the server 12. For example, in FIG. 2, an area AR with high density represents an area AR with a high pick-up demand and an area AR with low density represents an area AR with a low pick-up demand.

The setting button 64 is operated when configuring various settings related to display of the demand prediction screen such as selecting items that are displayable on the demand prediction screen and an order of display. Details of each item that is displayable on the demand prediction screen will be described later.

The prediction time point display 71 in the prediction time point setting region 42 displays a time point of demand prediction that is being displayed by the demand prediction mesh 63. In other words, a demand prediction at a time point displayed in the prediction time point display 71 is displayed on the demand prediction mesh 63. Tapping the prediction time point display 71 resets the prediction time point display 71 to a present time point. The prediction time point change buttons 72A and 72B are operated when advancing or reversing the prediction time point of the prediction time point display 71 by prescribed units (for example, 10 minutes).

As described above, the demand prediction application of the terminal apparatus 23 receives pick-up demand prediction data transmitted from the server 12 and, based on the received pick-up demand prediction data, displays the demand prediction mesh 63 that predicts a pick-up demand on the map 41 as a prediction result on a display.

While each area AR of the demand prediction mesh 63 is to be displayed in a different color or density in accordance with a degree of a pick-up demand in the example shown in FIG. 2, as shown in FIG. 13 to be described later, a prediction result of the number of pick-ups can be displayed at the same time.

3. Block Diagram

Next, detailed configurations of each apparatus mounted to the taxi 11 and the server 12 will be described.

Figure 3:
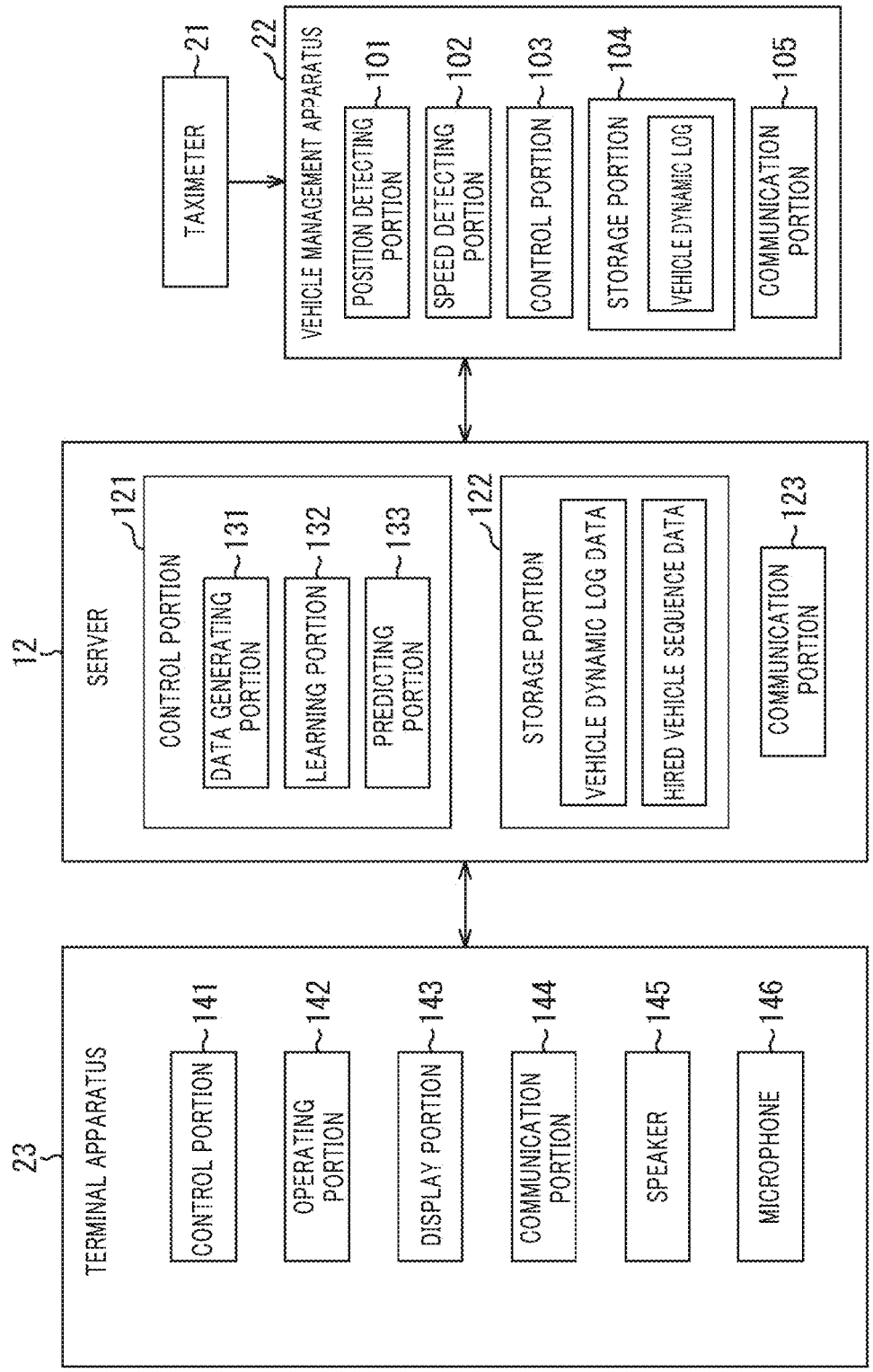
FIG. 3 is a block diagram showing a configuration example of the prediction system.

FIG. 3 is a block diagram showing configuration examples of the server 12, the taximeter 21, the vehicle management apparatus 22, and the terminal apparatus 23.

The taximeter 21 accepts operations of "hired" and "for hire" by the driver and displays a status of "hired" or "for hire" and a fare (price of passage) on a prescribed display portion. The taximeter 21 supplies the vehicle management apparatus 22 with the status of "hired" or "for hire".

The vehicle management apparatus 22 includes a position detecting portion 101, a speed detecting portion 102, a control portion 103, a storage portion 104, and a communication portion 105.

For example, the position detecting portion 101 is constituted by a GPS (Global Positioning System) receiver or the like and receives a positioning signal broadcast by a positioning satellite to detect a current position of the taxi 11. In addition, the position detecting portion 101 includes a gyroscope sensor, a geomagnetic sensor, or the like and detects a travel direction of the taxi 11.

The speed detecting portion 102 is constituted by a speed sensor, an acceleration sensor, or the like and detects a movement speed of the taxi 11. Alternatively, the speed detecting portion 102 may detect the movement speed of the taxi 11 by acquiring a measurement value from a speed sensor that detects a revolution speed of a wheel of the taxi 11.

For example, the control portion 103 is constituted by a CPU (Central Processing Unit), a RAM (Random Access Memory), and the like, reads an operation control program stored in the storage portion 104, and controls operations of the entire vehicle management apparatus 22 in accordance with the operation control program. Specifically, the control portion 103 acquires data at constant time intervals from each of the taximeter 21, the position detecting portion 101, and the speed detecting portion 102, generates vehicle dynamic log data, and causes the storage portion 104 to store the generated vehicle dynamic log data. In addition, at a prescribed timing set in advance, the control portion 103 regularly or irregularly transmits the vehicle dynamic log data stored in the storage portion 104 to the server 12 via the communication portion 105.

For example, the storage portion 104 is constituted by a hard disk, a ROM (Read Only Memory), a RAM, an NVRAM (Non Volatile RAM), and the like and stores vehicle dynamic log data. The communication portion 105 performs prescribed communication with the server 12 under the control of the control portion 103. The communication portion 105 is constituted by a network interface that performs network communication via a prescribed network.

The server 12 includes a control portion 121, a storage portion 122, and a communication portion 123.

For example, the control portion 121 is constituted by a CPU, a RAM, and the like, reads an operation control program stored in the storage portion 122, and controls operations of the entire server 12 in accordance with the operation control program.

Functionally, the control portion 121 at least includes a data generating portion 131, a learning portion 132, and a predicting portion 133 and predicts a pick-up demand for each area AR on the map 41 by machine learning. As a method of machine learning, an arbitrary method can be selected such as the k-means method, a self-organizing map (SOM), a neural network, or an HMM (hidden Markov model).

The data generating portion 131 causes the storage portion 122 to store vehicle dynamic log data acquired from each vehicle management apparatus 22 of a plurality of taxis 11 via the communication portion 123.

FIG. 4 shows an example of vehicle dynamic log data which is generated by the vehicle management apparatus 22 of the taxi 11 and which is transmitted to the server 12.

The vehicle management apparatus 22 generates vehicle dynamic log data at prescribed time intervals (for example, 1-minute intervals) and accumulates the vehicle dynamic log data.

As shown in FIG. 4, items to be generated as vehicle dynamic log data include: a company ID for identifying a company to which the taxi 11 belongs; a radio ID for identifying a vehicle of the taxi 11; a driver ID for identifying a driver who is driving the taxi 11; a status time point that represents a generation time point of a status; a latitude and a longitude that represent positional information of the taxi 11; a direction and a speed that represent a travel speed and a travel direction of the taxi 11; and a status of "hired" or "for hire".

The data generating portion 131 generates hired vehicle data that is data related to a hired vehicle from the vehicle dynamic log data stored in the storage portion 122.

Figure 5:
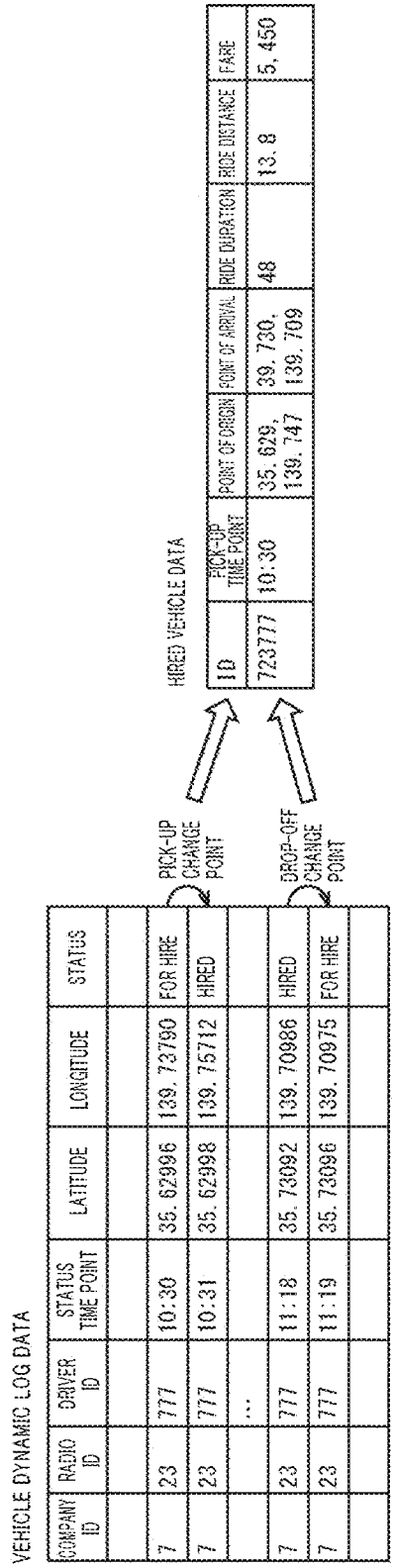
FIG. 5 is a diagram for explaining an example of generation of hired vehicle data.

FIG. 5 shows an example of generation of hired vehicle data.

The hired vehicle data is data which is generated by extracting information related to a pick-up made by the taxi 11 from vehicle dynamic log data and which is generated from information on a pick-up change point at which the status changes from "for hire" to "hired" and a drop-off change point at which the status changes from "hired" to "for hire".

For example, as shown in FIG. 5, the hired vehicle data includes respective items of an ID, a pick-up time point, a point of origin, a point of arrival, a ride duration, a ride distance, and a fare.

The ID is data that combines the company ID, the radio ID, and the driver ID in vehicle dynamic log data.

As the pick-up time point, a time point between the status time point of "for hire" and the status time point of "hired" of the pick-up change point is calculated and recorded.

As the point of origin, a latitude and a longitude between a latitude and a longitude of "for hire" and a latitude and a longitude of "hired" of the pick-up change point is calculated and recorded.

As the point of arrival, a latitude and a longitude between a latitude and a longitude of "for hire" and a latitude and a longitude of "hired" of the drop-off change point is calculated and recorded.

As the ride duration, a period of time (in units of, for example, minutes) between the status time point of "for hire" and the status time point of "hired" of the drop-off change point from the pick-up time point is calculated and recorded.

As the ride distance, a distance (in units of, for example, km) from the point of origin to the point of arrival is calculated and recorded.

The fare is calculated in accordance with provisions on taxi fares from the ride duration and the ride distance and the calculated fare is recorded.

The calculation methods of the respective items of hired vehicle data are not limited to the methods described above and other methods may be adopted. For example, the respective items described above may be calculated from first and last pieces of vehicle dynamic log data of which the status is "hired". In addition, information on the fare and the ride distance may be acquired from the vehicle management apparatus 22 as a part of the vehicle dynamic log data instead of being calculated from positions of the pick-up change point and the drop-off change point.

Based on the large number of pieces of hired vehicle data generated from the vehicle dynamic log data of the vehicle management apparatuses 22 of the large number of taxis 11, the data generating portion 131 generates, for each area AR, hired vehicle sequence data that is time-sequential data representing the number of pick-ups in prescribed time units (10 minutes). For example, the data generating portion 131 generates, for each area AR, hired vehicle sequence data that is time-sequential data representing a count of the number of pick-ups for every 10 minutes.

Figure 6:
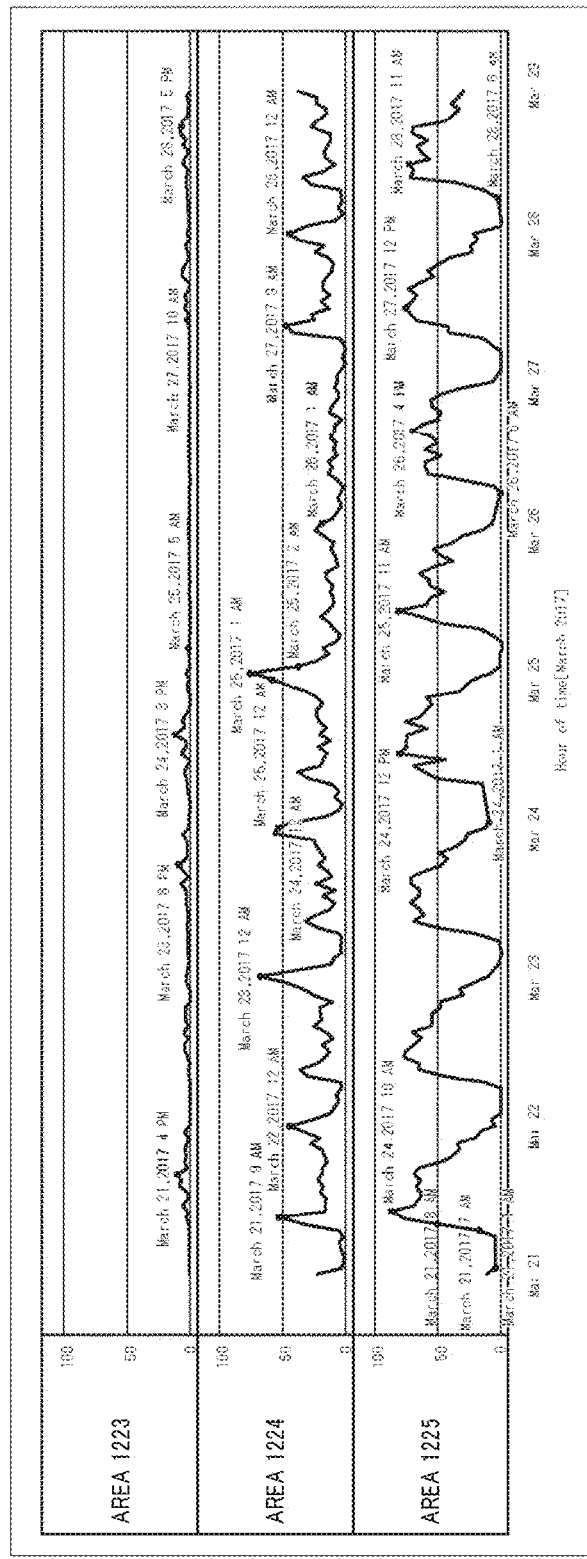
FIG. 6 is a diagram showing an example of hired vehicle sequence data.

FIG. 6 shows an example of hired vehicle sequence data of three areas AR, namely, an area 1223, an area 1224, and an area 1225 among the plurality of areas AR obtained by dividing the business area of the taxi 11.

An abscissa of the hired vehicle sequence data represents a date and a time point and an ordinate thereof represents the number of pick-ups. While the hired vehicle sequence data shown in FIG. 6 is eight days' worth of data, a creation period of hired vehicle sequence data can be set to an arbitrary period such as one week, one month, or one year. For example, setting the creation period of hired vehicle sequence data to one week enables a variation by day of the week to be captured, and setting the creation period of hired vehicle sequence data to a long period such as several months or one year enables seasonal variations such as the year-end and New Year holidays, the Golden Week vacation (a collection of public holidays on the Japanese calendar), and summer vacation to be captured in addition to a variation by day of the week.

In the example of the hired vehicle sequence data of the area 1223, for example, the number of pieces of hired vehicle data of which the pick-up time point is included in the 10 minutes from 10:00 to 10:10 on Mar. 21, 2017 and the point of origin is located within the area 1223 is counted as the number of pick-ups. The count result is adopted as the hired vehicle sequence data of the area 1223 from 10:00 to 10:10 on Mar. 21, 2017. Similar processing is calculated in an entire period of the acquired hired vehicle data to generate hired vehicle sequence data of the area 1223.

Returning to FIG. 3, using the large number of pieces of hired vehicle sequence data of a long period generated based on the hired vehicle data acquired from the vehicle management apparatuses 22 of the large number of taxis 11, the learning portion 132 generates, by learning, a predictor for predicting a pick-up demand.

The predicting portion 133 predicts a pick-up demand at a prescribed time point or in a prescribed time slot using the predictor generated by the learning portion 132. A prediction result of the predicting portion 133 is transmitted to the terminal apparatus 23 as pick-up demand prediction data.

The storage portion 122 stores the vehicle dynamic log data acquired from each of the vehicle management apparatuses 22 and the hired vehicle sequence data generated from the vehicle dynamic log data. The hired vehicle data which is intermediate data for generating the hired vehicle sequence data from the vehicle dynamic log data may also be stored in the storage portion 122.

The communication portion 123 performs prescribed communication with the vehicle management apparatus 22 and the terminal apparatus 23 under the control of the control portion 121. The communication portion 123 is constituted by a network interface that performs network communication via a prescribed network.

The terminal apparatus 23 includes a control portion 141, an operating portion 142, a display portion 143, a communication portion 144, a speaker 145, and a microphone 146.

For example, the control portion 141 is constituted by a CPU, a RAM, and the like and controls operations of the entire terminal apparatus 23 in accordance with an operation control program that is stored in a storage portion (not illustrated). For example, the control portion 141 executes a demand prediction application based on an operation by the driver who is a user. In addition, the control portion 141 also functions as a display control portion that controls the display portion 143 and causes the display portion 143 to display an execution result of the demand prediction application such as the demand prediction screen shown in FIG. 2.

The operating portion 142 is constituted by a plurality of operation buttons provided on the terminal apparatus 23, a touch panel superimposed on the display portion 143, and the like and accepts an operation by the user and supplies the control portion 141 with an operation signal that corresponds to the accepted operation.

For example, the display portion 143 is constituted by an LCD (Liquid Crystal Display) and displays prescribed information such as the demand prediction screen shown in FIG. 2.

The communication portion 144 performs prescribed communication with the server 12 under the control of the control portion 141. The communication portion 144 is constituted by a network interface that performs network communication via a prescribed network.

The speaker 145 outputs sound such as an electronic sound, a sound effect, or a voiced message. The microphone 146 detects voice uttered by the user and collects ambient sound.

The server 12, the taximeter 21, the vehicle management apparatus 22, and the terminal apparatus 23 are configured as described above.

Hereinafter, details of processing respectively executed by the server 12, the vehicle management apparatus 22, and the terminal apparatus 23 will be described.

4. Hired Vehicle Sequence Data Generation Processing

Figure 7:
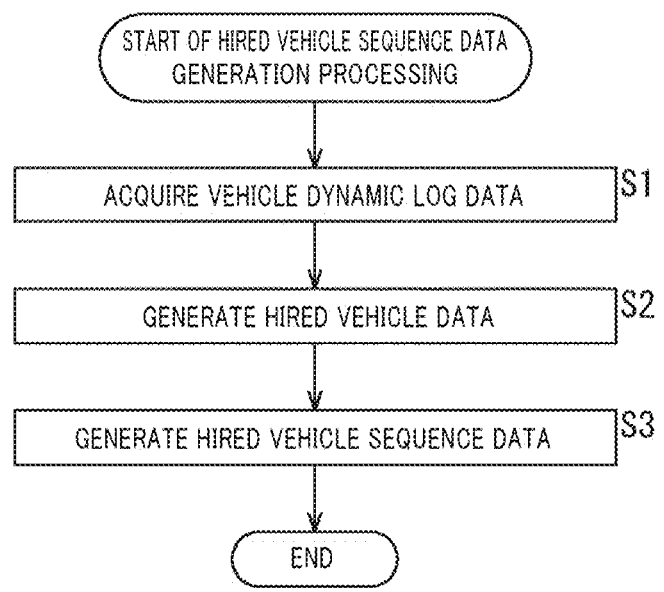
FIG. 7 is a flow chart for explaining hired vehicle sequence data generation processing.

First, hired vehicle sequence data generation processing by the server 12 will be described with reference to the flow chart shown in FIG. 7. For example, the processing can be executed at a prescribed timing such as regularly or irregularly.

First, in step S1, the data generating portion 131 of the server 12 acquires (receives) vehicle dynamic log data transmitted via the network from each of the vehicle management apparatuses 22 of the plurality of taxis 11. It should be noted that each vehicle management apparatus 22 can individually transmit the vehicle dynamic log data to the server 12 at an arbitrary timing and the transmission need not be concurrent.

In step S2, the data generating portion 131 generates hired vehicle data from the acquired pieces of vehicle dynamic log data. For example, the hired vehicle data includes data calculated from items of the vehicle dynamic log data such as a pick-up time point and a point of origin as well as external data added by the server 12 such as a fare. Other examples of external data that can be provided include date-related information that is related to a date such as a day of the week, a weekday, or a holiday, event information that is related to an event or the like held on the day of data acquisition in a relevant area AR, and information on weather. Adding external data as hired vehicle data enables, for example, a state-specific pick-up demand in accordance with each day of the week, a presence or absence of an event, the weather, or the like to be learned and predicted.

In step S3, based on the large number of pieces of hired vehicle data generated from the vehicle management apparatuses 22 of the large number of taxis 11, the data generating portion 131 generates hired vehicle sequence data for each area AR, stores the generated hired vehicle sequence data in the storage portion 122, and ends the hired vehicle sequence data generation processing.

5. Learning Prediction Processing

Next, referring to the flow chart in FIG. 8, learning prediction processing for learning and predicting a pick-up demand using the generated hired vehicle sequence data for each area AR will be described. For example, the processing can also be executed at a prescribed timing such as regularly or irregularly.

First, in step S21, the learning portion 132 of the server 12 extracts representative areas from the plurality of areas AR obtained by dividing the business area of the taxis 11. The learning portion 132 selects areas AR in a prescribed number determined in advance from the plurality of areas AR as representative areas. The representative areas may be randomly determined or, for example, a knowledgeable user may select representative areas according to a prescribed criterion such as inner-city areas AR and suburban areas AR, areas AR near a station and areas AR far from a station, or areas AR with a large number of stations and areas AR with a small number of stations.

In step S22, the learning portion 132 performs two-stage clustering using hired vehicle sequence data of each of the areas AR extracted as representative area. More specifically, the learning portion 132 executes, using a first parameter, first clustering for clustering each of the extracted plurality of areas AR and, using a second parameter, second clustering for clustering each of the extracted plurality of areas AR.

For example, the learning portion 132 executes the first clustering using an average and a dispersion of the number of pick-ups per unit time (for example, per day) in an area AR as the first parameter and executes the second clustering using a waveform of an average number of pick-ups per unit time (for example, per day) in the area AR as the second parameter. As a method of clustering, for example, the k-means method or the like can be used.

Figure 9:
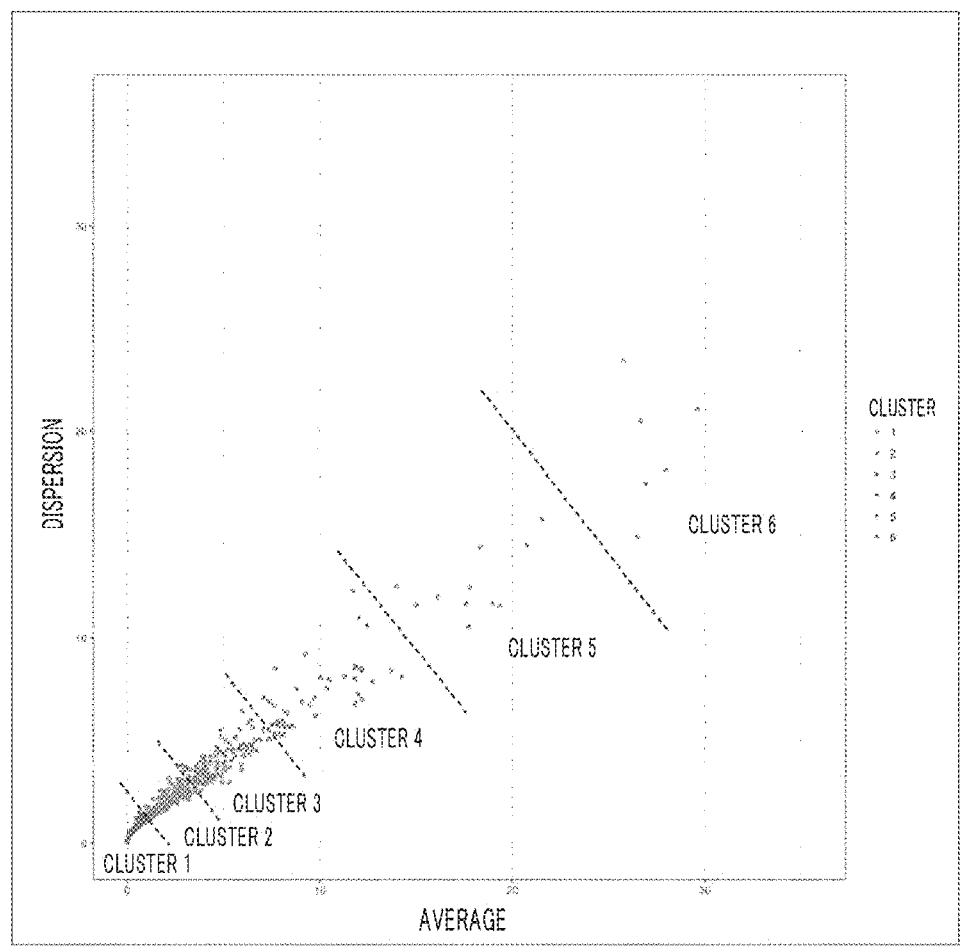
FIG. 9 is a diagram showing an example of a result of first clustering.
Figure 10:
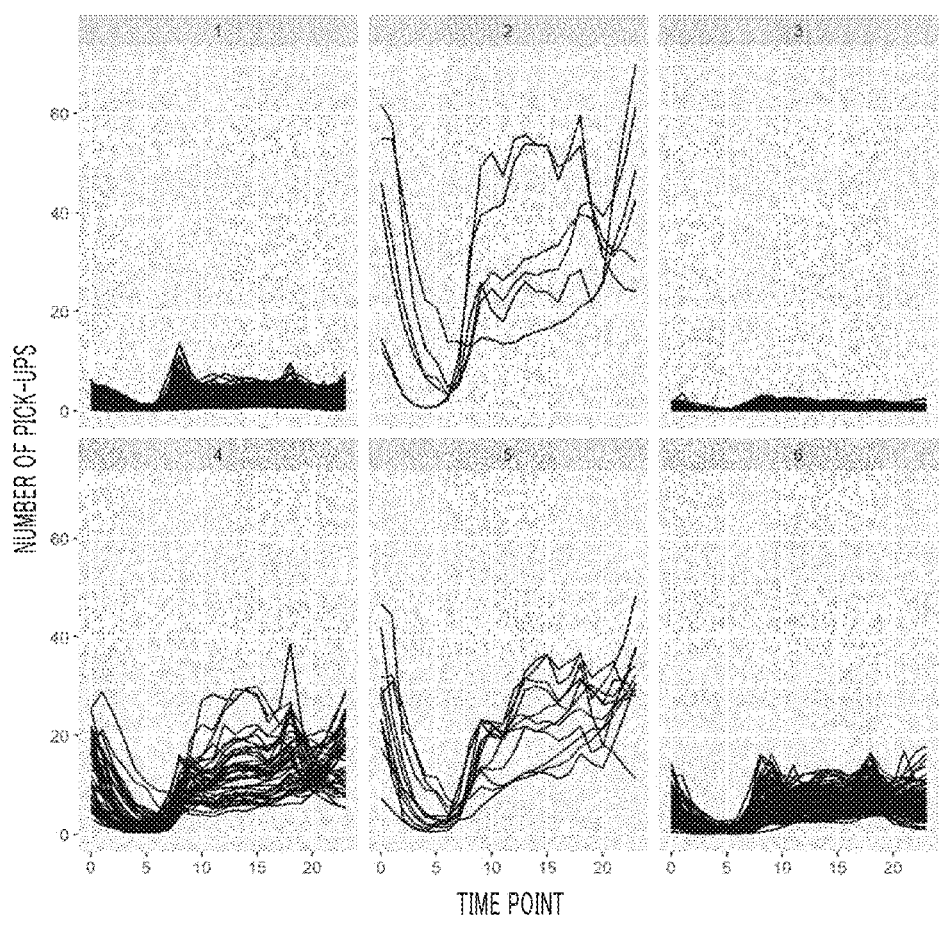
FIG. 10 is a diagram showing an example of a result of first clustering.

FIGS. 9 and 10 show an example of a result of the first clustering for clustering a plurality of areas AR that are representative areas using an average and a dispersion of the number of pick-ups as parameters.

FIG. 9 shows a distribution of the plurality of areas AR extracted as representative areas, with an abscissa representing an average and an ordinate representing a dispersion.

FIG. 10 is a diagram showing hired vehicle sequence data of the plurality of areas AR that are representative areas for each cluster. In FIG. 10, an abscissa represents a time point (0:00 to 24:00) and an ordinate represents the number of pick-ups.

Basically, since a similar feature appears in the hired vehicle sequence data for each of the respective time slots (morning, daytime, nighttime, and the like) of a day, the clustering is performed using data obtained by dividing the hired vehicle sequence data into basic units (day).

In FIGS. 9 and 10, (hired vehicle sequence data of) a plurality of areas AR extracted as representative areas is classified into six clusters.

Figure 11:
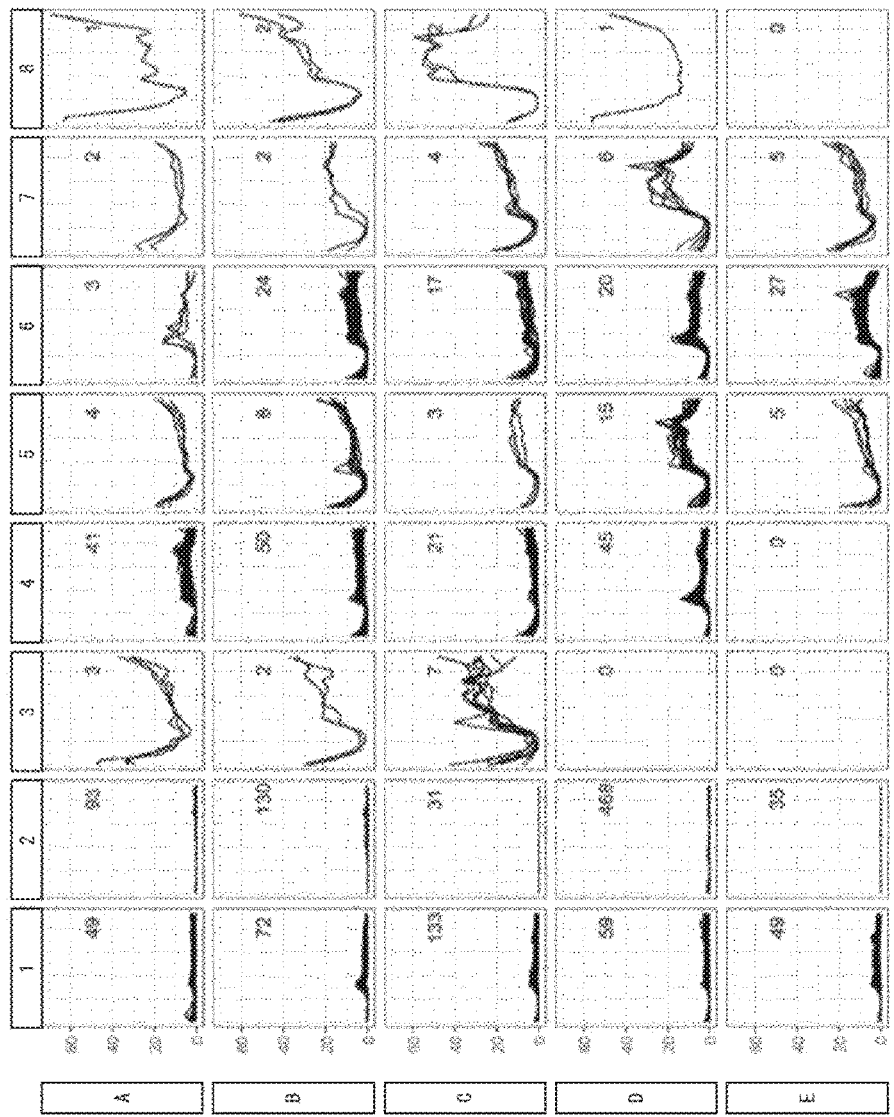
FIG. 11 is a diagram showing an example of a result of two-stage clustering.

FIG. 11 shows an example of a result of two-stage clustering which organizes a clustering result of the first clustering and a clustering result of the second clustering.

In FIG. 11, a horizontal direction (units of columns) represents the clustering result of a first stage and a vertical direction (units of rows) represents the clustering result of a second stage. Abscissas and ordinates of the respective graphs arranged in a matrix pattern are similar to those in FIG. 10.

In FIG. 11, a column number 1, a column number 2, a column number 3, . . . are the clustering result by the first clustering and represent a set of areas AR (a group of areas AR) in which a plurality of areas AR arranged in a vertical direction have similar averages and dispersions of the number of pick-ups. On the other hand, a row number A, a row number B, a row number C, . . . are the clustering result by the second clustering and represent a result of further clustering, in areas AR with similar waveforms of the average number of pick-ups, respective groups of areas AR that represent the clustering result of the first clustering. A numeral in each of the graphs arranged in a matrix pattern represents the number of areas AR classified into the cluster. For example, the numeral "468" in a graph of a cluster D-2 with a row number of D and a column number of 2 represents that 468 areas AR among the representative areas have been classified into the cluster D-2. The average and the dispersion of the number of pick-ups per unit time having been used as the first parameter presents a magnitude of the number of pick-ups per unit time and a magnitude of a variation in the number of pick-ups in the unit time, and the waveform of the average number of pick-ups per unit time having been used as the second parameter presents a trend in a variation over time of the number of pick-ups in the unit time.

It should be noted that the clustering of the second stage may be individually executed for each clustering result of the first stage or may be executed for all of the plurality of areas AR extracted as representative area independent of the clustering results of the first stage.

In the present embodiment, for example, it is assumed that the business area of the taxis 11 are divided into 4,400 areas AR, among the 4,400 areas AR, half or 2,200 areas AR are extracted as representative meshes, and two-stage clustering is performed with respect to the 2,200 areas AR to classify the areas AR into 44 clusters.

Figure 8:
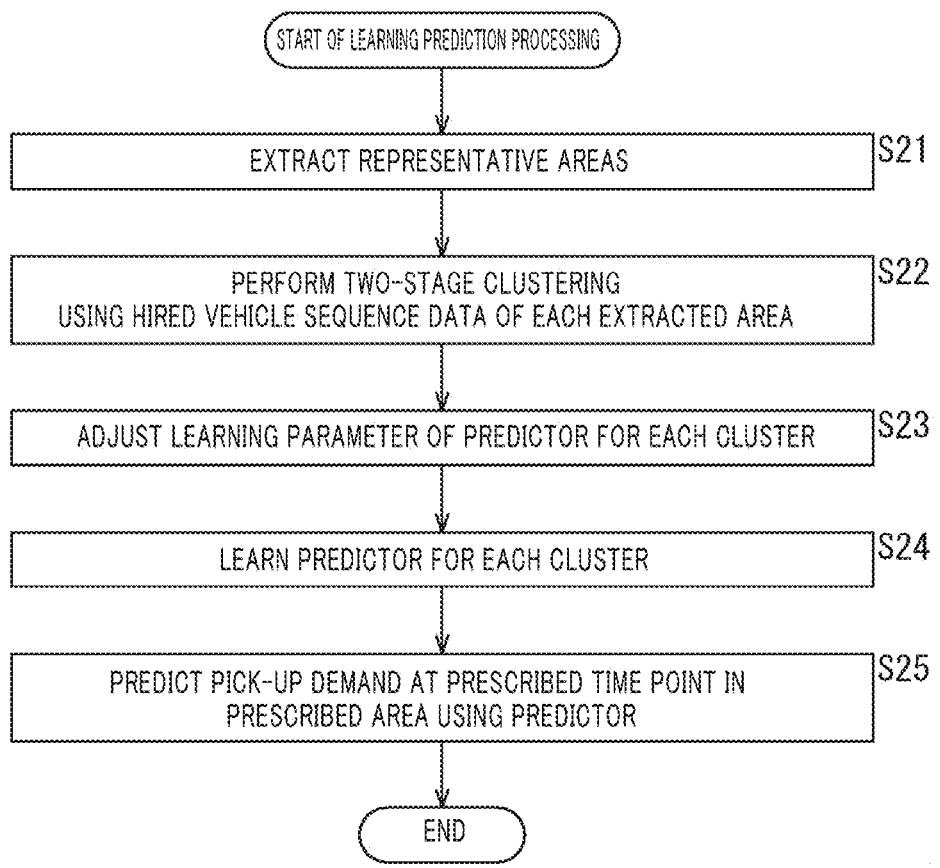
FIG. 8 is a flow chart for explaining learning prediction processing.

Next, in step S23 shown in FIG. 8, the learning portion 132 adjusts, for each cluster, a learning parameter of a predictor that is typified by a learning rate using hired vehicle sequence data belonging to the cluster and advances to step S24.

In step S24, the learning portion 132 learns, for each cluster, the predictor for predicting a pick-up demand using the adjusted learning parameter and the hired vehicle sequence data of one or more areas AR belonging to the cluster, and advances to step S25.

In step S25, the predicting portion 133 predicts a pick-up demand at a prescribed time point in a prescribed area AR using the predictor generated by the learning portion 132. For example, when predicting a pick-up demand of areas AR belonging to a cluster C-4, a pick-up demand of a prescribed time point is predicted using a predictor of the cluster C-4.

The learning processing of steps S21 to S24 and the prediction processing of step S25 may be executed as a continuous series of processing or the prediction processing of step S25 may be executed at a different timing to the processing of steps S21 to S24.

For example, the processing of step S25 is executed following the processing of step S24 and the pick-up demand at a prescribed time point of each area AR constituting the business area of the taxis 11 is calculated and stored in the storage portion 122. In addition, in response to a request from the terminal apparatus 23, prediction data of a demand that is stored in the storage portion 122 is transmitted to the terminal apparatus 23 as pick-up demand prediction data.

Alternatively, the processing of step S25 is executed at a timing where prediction data of a pick-up demand at a prescribed time point of one or more areas AR is requested by the terminal apparatus 23, and a processing result of step S25 is transmitted to the terminal apparatus 23 as pick-up demand prediction data.

As shown in FIG. 2, the demand prediction application of the terminal apparatus 23 having received the pick-up demand prediction data displays the demand prediction mesh 63 of which a color or a density is changed in accordance with the number of pick-ups of each area AR that is a prediction result.

According to the learning prediction processing described above, among the 4,400 areas AR that constitute the business area, each of the 2,200 areas AR extracted as representative areas is classified into a prescribed cluster, and a pick-up demand can be predicted in accordance with a classification result.

On the other hand, with respect to the remaining 2,200 areas AR (hereinafter, also referred to as unknown areas AR) not having been extracted as representative areas, at this stage, it is unclear into which cluster the areas AR are to be classified and a pick-up demand cannot be predicted.

6. Unknown Area Cluster Classification Processing

Next, processing for predicting a pick-up demand of an unknown area AR will be described.

Unknown area cluster classification processing for determining a cluster to which an unknown area AR belongs will be explained with reference to the flow chart in FIG. 12. For example, the processing can be executed at a prescribed timing such as regularly or irregularly.

First, in step S41, the learning portion 132 of the server 12 learns a feature (an average, a dispersion, or a shape) of hired vehicle sequence data of each cluster having been classified in the learning prediction processing. In other words, a relationship between the hired vehicle sequence data of the 2,200 areas AR extracted as representative areas and clusters is learned by a learner.

In step S42, the predicting portion 133 of the server 12 inputs hired vehicle sequence data of an unknown area AR into a classifier that uses the parameter obtained by the learning in step S41 to determine a cluster of the unknown area AR.

As described above, according to the unknown area cluster classification processing, clustering of unknown areas AR other than representative areas can be executed using a classifier generated by learning a relationship between clustering results of the representative areas and pieces of hired vehicle sequence data.

Once the cluster of an unknown area AR can be determined, a pick-up demand for the unknown area AR can be predicted by executing the prediction processing of step S25 described above using a predictor of the determined cluster.

Figure 12:
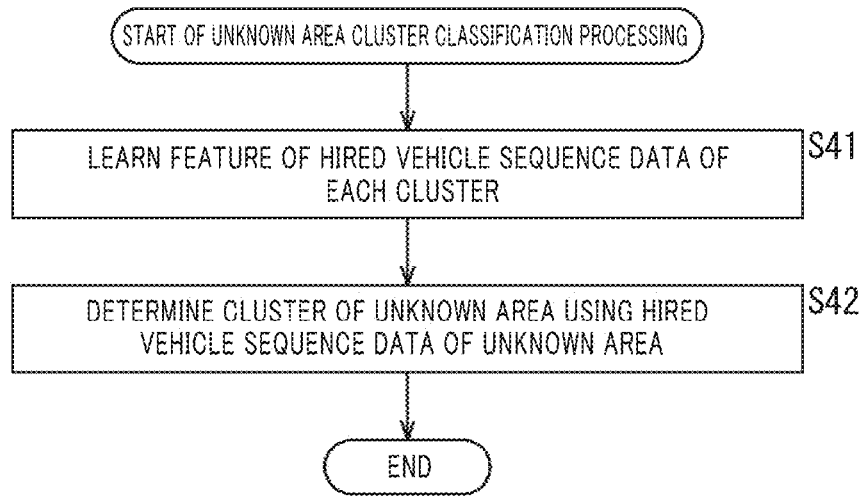
FIG. 12 is a flow chart for explaining unknown area cluster classification processing.

Therefore, by executing both the learning prediction processing shown in FIG. 8 and the unknown area cluster classification processing shown in FIG. 12, a pick-up demand of all of the 4,400 areas AR that constitute the business area of the taxis 11 can be predicted.

In the learning prediction processing shown in FIG. 8, since the number of areas AR to be learned or, in other words, a data amount of hired vehicle sequence data can be reduced by extracting representative areas which is the processing in step S21, a calculation load can be reduced and a cost and a time required by pick-up demand prediction can be reduced.

In addition, in step S22, by performing two-stage clustering using hired vehicle sequence data of each of the areas AR extracted as representative areas, the number of learners can be reduced and the cost and the time required by pick-up demand prediction can be reduced. Specifically, while learners in the number of (2,200) areas AR extracted as representative areas are required when the two-stage clustering is not performed, performing the two-stage clustering and classifying the areas AR into a prescribed number of clusters enables the number of learners necessary for learning to be reduced to the number of (44) clusters.

The learner of each cluster can use the hired vehicle sequence data of all of the areas AR classified into the cluster. In other words, for example, when learning a pick-up demand prediction of the area 1223, generally, learning is performed using only the hired vehicle sequence data acquired in the area 1223. In contrast, in the present technique, for example, when the area 1223 is classified into a cluster D-2 and there are 468 areas AR belonging to the cluster D-2, learning can be performed using hired vehicle sequence data of 468 areas AR including areas AR other than the area 1223. Therefore, since learning can be performed with respect to one learner using a larger amount of data than an amount of data that can be acquired in a single area AR, prediction accuracy can be improved.

In addition, even with respect to an unknown area AR that is not extracted as a representative area in the learning prediction processing, performing unknown area cluster classification processing enables a pick-up demand of the unknown area AR to be predicted using a predictor of the cluster that has been determined.

While adjustment of a learning parameter and learning of a predictor are performed using only the hired vehicle sequence data of each of the areas AR extracted as representative areas in steps S23 and S24 described above, alternatively, the adjustment of the learning parameter and the learning of the predictor may be performed by additionally using the hired vehicle sequence data of all unknown areas AR included in the business area once clusters have been determined with respect to the unknown areas AR.

Therefore, according to the prediction system 1 shown in FIG. 1, learning and predictions can be performed more efficiently. In addition, prediction accuracy can be improved with a small amount of data.

In the learning prediction processing and the unknown area cluster classification processing described above, cluster classification and learning are performed using hired vehicle sequence data generated from all of the pieces of vehicle dynamic log data acquired from the vehicle management apparatuses 22 of a plurality of taxis 11 irrespective of a day of the week, a weekday, a holiday, or the like.

However, hired vehicle sequence data may be classified into categories such as a day of the week, a weekday, a holiday, weather, or the like and cluster classification and learning may be performed for each category. Accordingly, a pick-up demand can be predicted for each prescribed condition such as a day of the week, a weekday, a holiday, weather, a presence or an absence of an event, or the like and a prediction result thereof can be displayed on a display.

7. Combined Display of Areas AR

Hereinafter, various display examples with respect to the demand prediction application of the terminal apparatus 23 displaying a prediction result of a pick-up demand on a display will be explained.

FIG. 13 shows a first display example of the demand prediction screen that is displayed by the demand prediction application.

On the demand prediction screen shown in FIG. 2, the demand prediction mesh 63 is constituted by arranging areas AR with a same rectangular size in a matrix pattern. In addition, the number of pick-ups of each area AR which represents a prediction result is not displayed on the screen.

In contrast, in the demand prediction mesh 63 shown in FIG. 13, the number of pick-ups of each area AR which represents a prediction result is displayed in the area AR.

In addition, with respect to a plurality of areas AR of which the number of pick-ups of a plurality of adjacent areas AR is equal to or smaller than a prescribed threshold, the number of pick-ups is displayed by combining the plurality of areas AR into a single area AR. In a first display example shown in FIG. 13, a plurality of areas AR of which the number of pick-ups of a plurality of adjacent areas AR is equal to or smaller than 10 is combined and displayed as a single area AR. Specifically, 2×2 areas AR of which the numbers of pick-ups when displayed in a same rectangular size are "4", "2", "2", and "1" are combined into a single area AR and displayed as "9". It is needless to say that, there are cases where, depending on the number of adjacent pick-ups, areas AR are not combined even when the number of pick-ups of a plurality of adjacent areas AR is equal to or smaller than 10.

Since guessing a demand is difficult when the predicted number of pick-ups is small such as when 0, 1, or 2, the demand prediction application can display a demand prediction in units of areas AR of which the number of pick-ups is equal to or larger than a certain value. Accordingly, accuracy of prediction can be improved and a driver can be provided with more useful information.

It should be noted that the number of pick-ups to be displayed as a prediction result may be a value given a certain leeway such as "10 to 13".

8. Display of Demand Direction and Frequency

Figure 14:
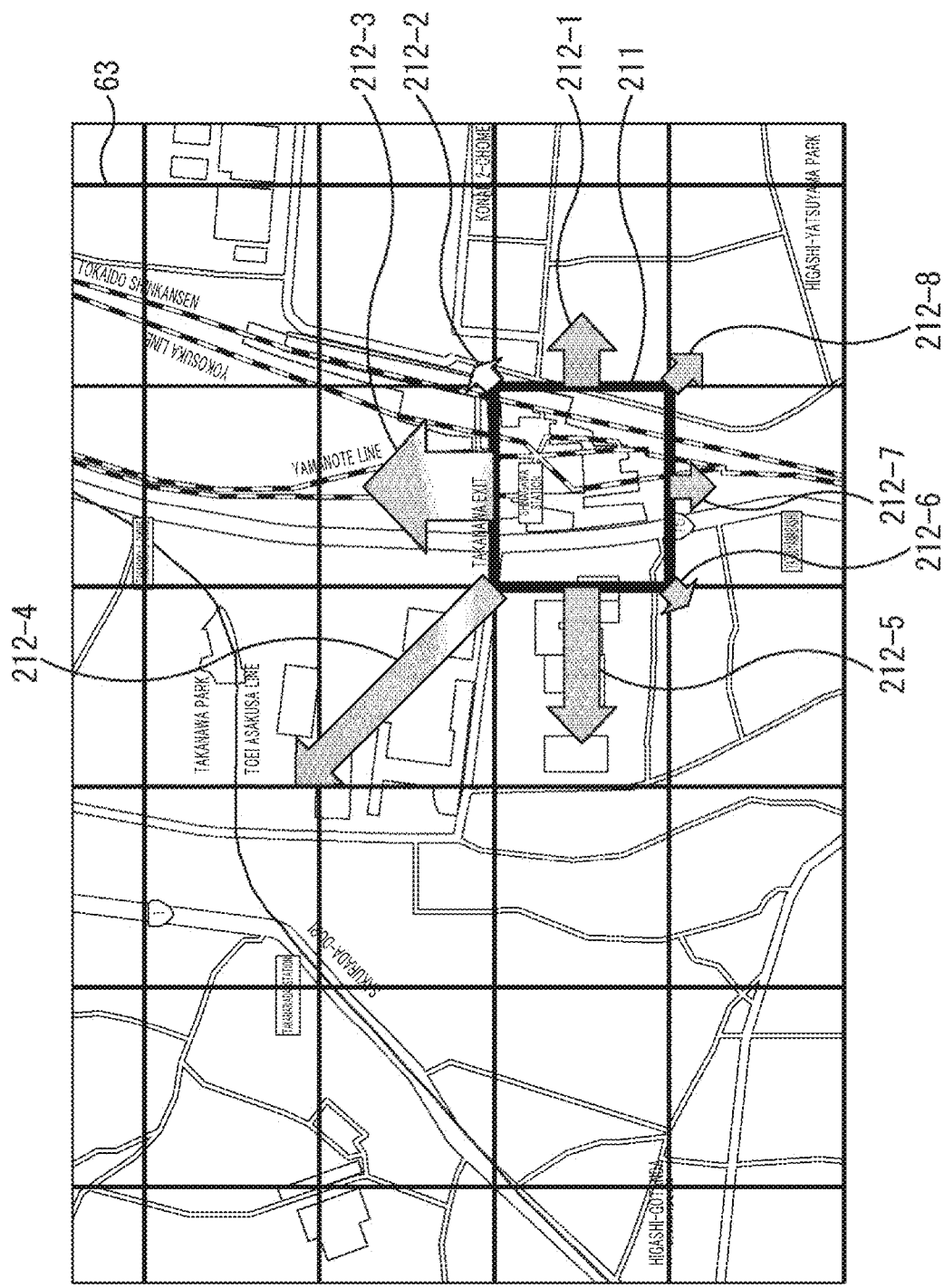
FIG. 14 is a diagram showing a second display example of the demand prediction screen.

FIG. 14 shows a second display example of the demand prediction screen that is displayed by the demand prediction application.

In FIG. 14, display of a color or a density in accordance with a degree of a pick-up demand of each area AR has been omitted.

FIG. 14 shows a display example of displaying a further detailed prediction result with respect to an area AR (hereinafter, referred to as an area AR of attention) that attracts attention from the driver among the respective areas AR of the demand prediction mesh 63 that is superimposed and displayed on the map 41.

When the driver performs an operation to designate the area AR of attention such as tapping (touching) a prescribed area AR among the respective areas AR of the demand prediction mesh 63 that is superimposed and displayed on the map 41, the demand prediction application performs display such as that shown in FIG. 14 with respect to the designated area AR of attention.

In FIG. 14, with respect to the area AR of attention designated by the driver, an area-of-attention frame 211 that is a wider frame than other areas AR is displayed. In addition, arrows 212-1 to 212-8 that point outward from the area-of-attention frame 211 are displayed. When each of the arrows 212-1 to 212-8 is not particularly distinguished from one another, the arrows 212-1 to 212-8 will be simply referred to as an arrow 212.

A direction of the arrow 212 represents a movement direction of passengers who are picked up in the area AR of attention and a length of the arrow 212 represents an average movement distance of passengers who are picked up in the area AR of attention and who move in the direction of the arrow 212. In addition, a width of the arrow 212 (a thickness in a direction perpendicular to the direction of the arrow) represents a ratio of pick-ups in the direction indicated by the arrow 212 to all directions.

Therefore, the example shown in FIG. 14 shows that, among passengers who are picked up in the area AR of attention, there is a large number of passengers who move in the direction of the arrow 212-3 in terms of ratios of pick-ups and passengers who move in the direction of the arrow 212-4 do so over a long movement distance. In addition, for example, it is shown that, among passengers who are picked up in the area AR of attention, there are only a few passengers who move in the directions of the arrows 212-2 and 212-6 and movement distances of such passengers are short.

For example, when determining an area AR to perform so-called "cruising" (looking for a passenger while driving the taxi 11), the driver can set a prescribed area AR of the demand prediction mesh 63 as an area AR of attention, search for an area AR with a large number of passengers whose direction is the same direction in which the driver is returning by displaying the arrow 212, and the like.

A movement direction of passengers in each area AR can be predicted by learning that also includes information on directions (travel directions) of vehicle dynamic log data.

It should be noted that the number of arrows 212 to be displayed or, in other words, the number of predictions of the movement direction of passengers may be any number other than 8 shown in FIG. 14. In addition, the ratio of passengers moving in the direction of the arrow 212 to all directions may be represented by a method other than a representation by a width of an arrow such as the use of a different color or numerical notation.

9. Display of Pinpoint Prediction

Figure 15:
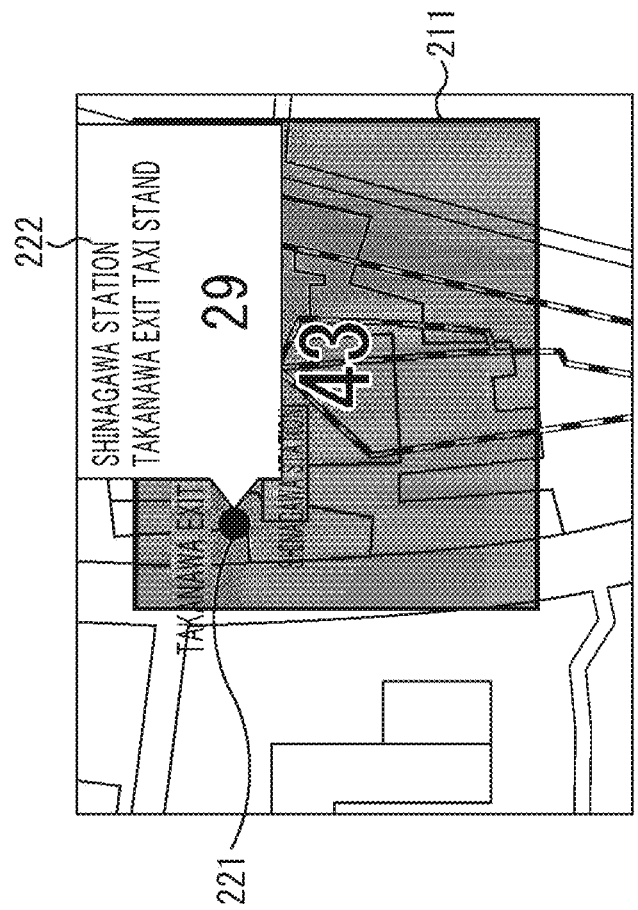
FIG. 15 is a diagram showing a third display example of the demand prediction screen.

FIG. 15 shows a third display example of the demand prediction screen that is displayed by the demand prediction application.

FIG. 15 also shows a display example of displaying a further detailed prediction result when the driver selects a prescribed area AR as the area AR of attention.

For example, areas AR created by dividing the business area into prescribed units may include locations which have a fixed pick-up position and which have a larger number of pick-ups than other locations such as a taxi stand in front of a station, a taxi stand in front of a hotel, and the like.

When such a pick-up position with a large number of pick-ups is present in the area AR of attention, the demand prediction application can make a pinpoint prediction of a pick-up position with a large number of pick-ups and the number of pick-ups at the pick-up position and display the pick-up position and the number of pick-ups separately from the number of pick-ups in the entire area AR of attention. Hereinafter, a pick-up position with a large number of pick-ups which is specified in the area AR of attention will be referred to as a pinpoint pick-up position.

In FIG. 15, a pinpoint pick-up position symbol 221 that represents a pinpoint pick-up position is displayed at a prescribed position in the area AR of attention and a number-of-pick-ups display 222 that displays a predicted number of pick-ups at the pinpoint pick-up position symbol 221 is displayed. In FIG. 15, "43" displayed in the area-of-attention frame 211 represents the number of pick-ups for the entire area AR of attention and, in the range "43", the number-of-pick-ups display 222 of "29" represents the number of pick-ups at a pinpoint pick-up position "Shinagawa Station Takanawa Exit Taxi Stand" denoted by the pinpoint pick-up position symbol 221. In this manner, by displaying a pinpoint pick-up position and the number of pick-ups that is predicted at the pinpoint pick-up position in addition to the number of pick-ups of the area AR of attention, a ratio of hires can be increased.

A pinpoint pick-up position can be estimated by learning using hired vehicle data instead of individually studying locations with fixed pick-up positions in the area AR.

Figure 16:
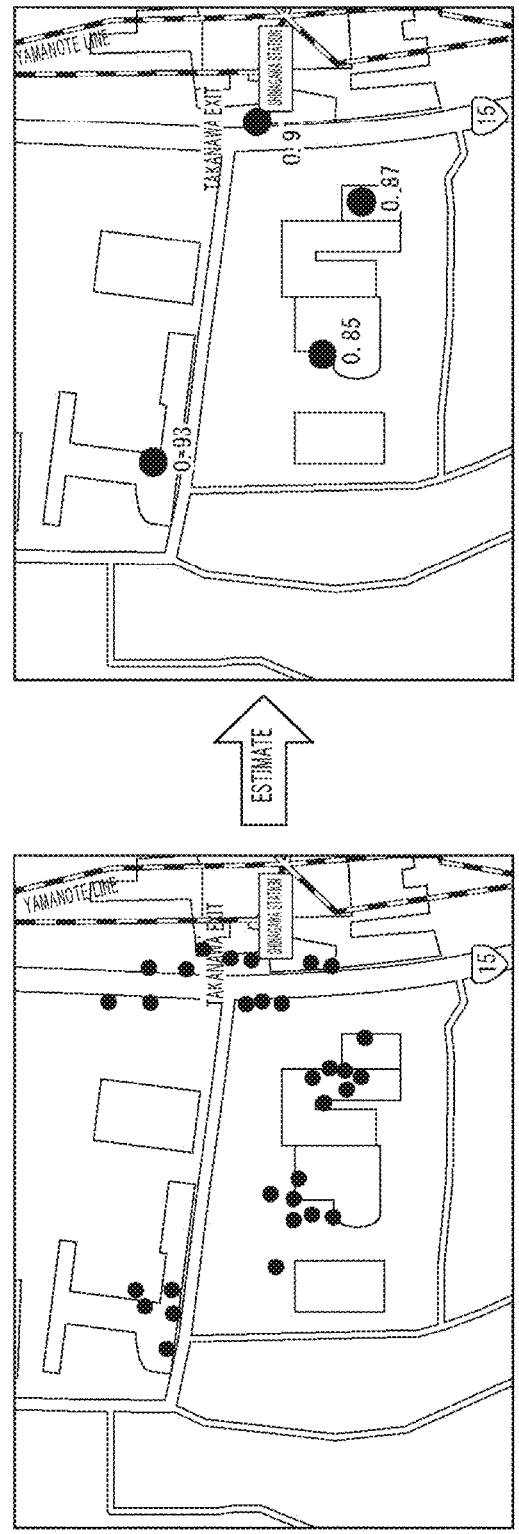
FIG. 16 is a diagram for explaining learning of a pick-up position.

Specifically, as indicated by black dots on a left side of FIG. 16, previous pick-up positions of passengers can be identified from information on a point of origin of hired vehicle data. By learning previous pick-up positions of passengers, as shown on a right side of FIG. 16, estimated values of pick-up positions indicated by black dots and probabilities (likelihoods) of the pick-up positions are calculated. The probability of a pick-up position is represented by a numeral ranging from 0 to 1 which is displayed in a vicinity of the pick-up position in FIG. 16. For example, the demand prediction application can display an estimated value of a pick-up position of which a probability as a pick-up position is equal to or higher than a prescribed threshold (for example, 0.8) as a pinpoint pick-up position in the area AR of attention.

10. Display of Prediction of Queueing Time

Figure 17:
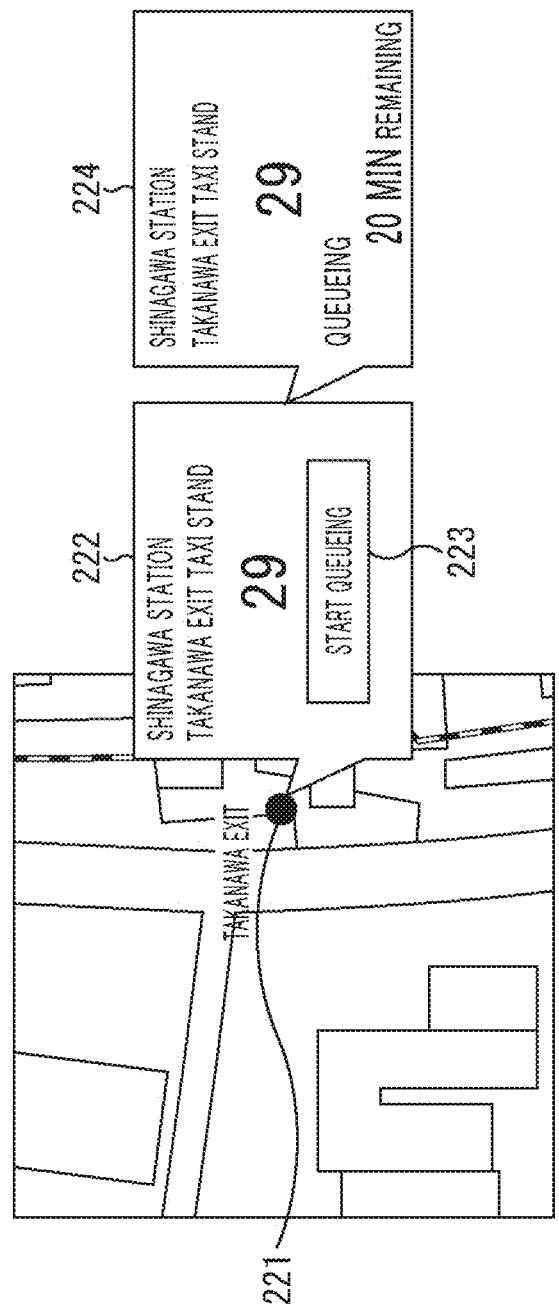
FIG. 17 is a diagram showing a fourth display example of the demand prediction screen.

FIG. 17 shows a fourth display example of the demand prediction screen that is displayed by the demand prediction application.

FIG. 17 also shows a display example of displaying a further detailed prediction result when the driver selects a prescribed area AR as the area AR of attention.

At locations which have a fixed pick-up position and which have a larger number of pick-ups such as a taxi stand in front of a station and a taxi stand in front of a hotel, there is a method called "queueing" in which a taxi 11 acquires a passenger by standing by in a queue formed by taxis 11 waiting for passengers at a pick-up position. A disadvantage of queueing is that, for example, when a long queue of taxis 11 has already been formed at a taxi stand, a taxi 11 must wait for a long time to pick up a passenger after lining up at the end of the long queue of taxis 11.

In consideration thereof, when queueing is performed at a pick-up position (a pinpoint pick-up position) with a large number of pick-ups, the demand prediction application can display a time required for queueing or, in other words, a time required to pick up a passenger while waiting at the pick-up position.

Specifically, as shown in FIG. 17, when the pinpoint pick-up position symbol 221 in the area AR of attention is a queueing location, the demand prediction application causes a queueing start button 223 to be displayed in the number-of-pick-ups display 222 at the pinpoint pick-up position symbol 221. When the queueing start button 223 is tapped (touched), the demand prediction application displays a queueing display 224 that indicates a time (a queueing time) required by queueing when the queueing is performed. In the example shown in FIG. 17, "20 minutes" is displayed as the queueing time.

For example, by causing the queueing display 224 to be displayed at the pinpoint pick-up position, the driver can check the queueing time and select a location where queueing is to be performed. The queueing time to be displayed by the queueing display 224 may be a value given a certain leeway such as "15 minutes to 20 minutes".

In vehicle dynamic log data, since a pick-up change point where the status changes from "for hire" to "hired" and a state in which the taxi 11 is moving slowly shortly before the pick-up change point can also be detected, a queueing operation of the taxi 11 can also be detected. For example, travel at or below a prescribed speed (at or below 5 km/h) in a prescribed period prior to the time point of the pick-up change point or within a prescribed distance can be detected as a queueing operation. Therefore, by learning a queueing operation, a queueing time at a prescribed pick-up position can be predicted.

11. Display of Prediction of Degree of Long Distance

Figure 18:
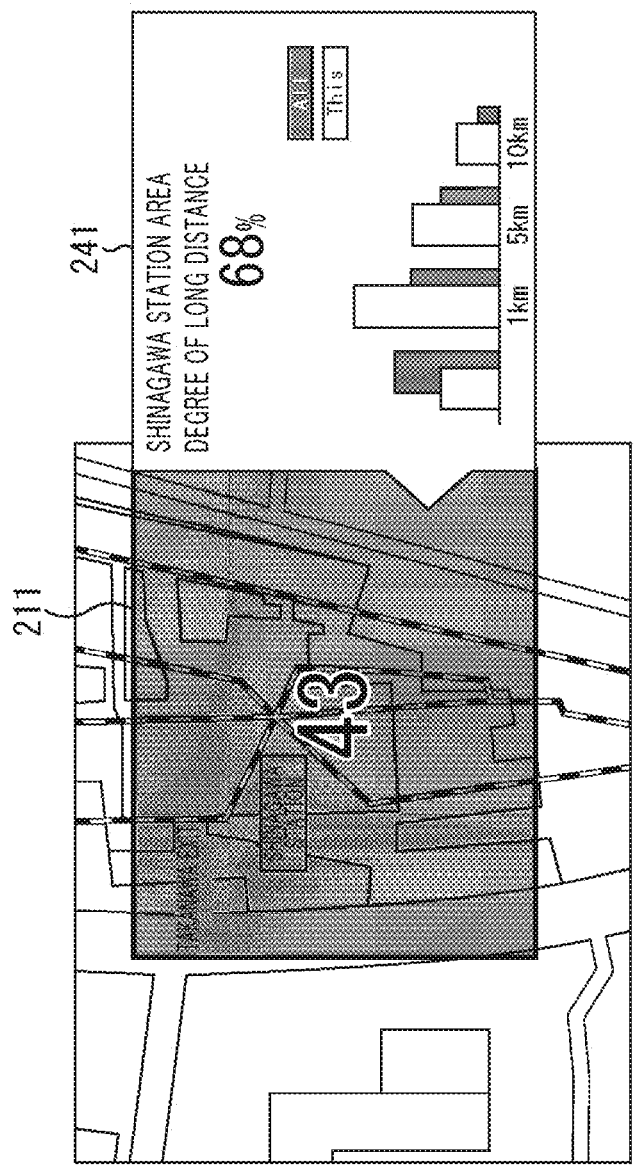
FIG. 18 is a diagram showing a fifth display example of the demand prediction screen.

FIG. 18 shows a fifth display example of the demand prediction screen that is displayed by the demand prediction application.

FIG. 18 also shows a display example of displaying a further detailed prediction result when the driver selects a prescribed area AR as the area AR of attention.

For example, areas AR created by dividing the business area into prescribed units may include areas AR or pick-up positions with a high ratio of pick-ups that involve long ride distances (a prescribed distance or longer) such as when the destination is Haneda Airport or Narita Airport. Preferably, the driver is capable of determining the possibility of long-distance passengers.

In consideration thereof, as shown in FIG. 18, the demand prediction application can perform a long-distance display 241 that displays a ratio of long-distance passengers in the area AR of attention separately from a total number of pick-ups in the area AR of attention.

In long-distance display 241, a ratio (proportion) of pick-ups of which a ride distance is a long distance to the total number of pick-ups of the area AR of attention is displayed as a degree of long distance. In addition, in long-distance display 241, ride distances are divided into a plurality of classifications and a ratio of pick-ups for each divided classification is displayed by a bar graph as a classification of long distance. In FIG. 18, bar graphs labeled "All" indicate a ratio of pick-ups for each classification to the entire business area and bar graphs labeled "This" indicate a ratio of pick-ups for each classification of an area AR of attention.

The long-distance display 241 may display a degree of long distance and a classification of long distance with respect to the area AR of attention as shown in FIG. 18 or display a degree of long distance and a classification of long distance in association with the pinpoint pick-up position symbol 221 and display a degree of long distance and a classification of long distance with respect to a pinpoint pick-up position.

While the bar graphs of the long-distance display 241 shown in FIG. 18 divide ride distances into a plurality of classifications as classifications of long distance and indicate a ratio of pick-ups for each divided classification (ride distance), alternatively, fares may be divided into a plurality of classifications and a ratio of pick-ups for each divided classification (fare) may be indicated.

In addition, the long-distance display 241 may predict a pick-up demand for each time slot or each type of weather and display a degree of long distance or a classification of long distance that is customized for a prescribed time slot or a prescribed type of weather.

A degree of long distance and a classification of long distance can be predicted by performing learning so as to also include the items of ride distance and fare of hired vehicle data.

12. Display of Prediction of Ride Distance

Figure 19:
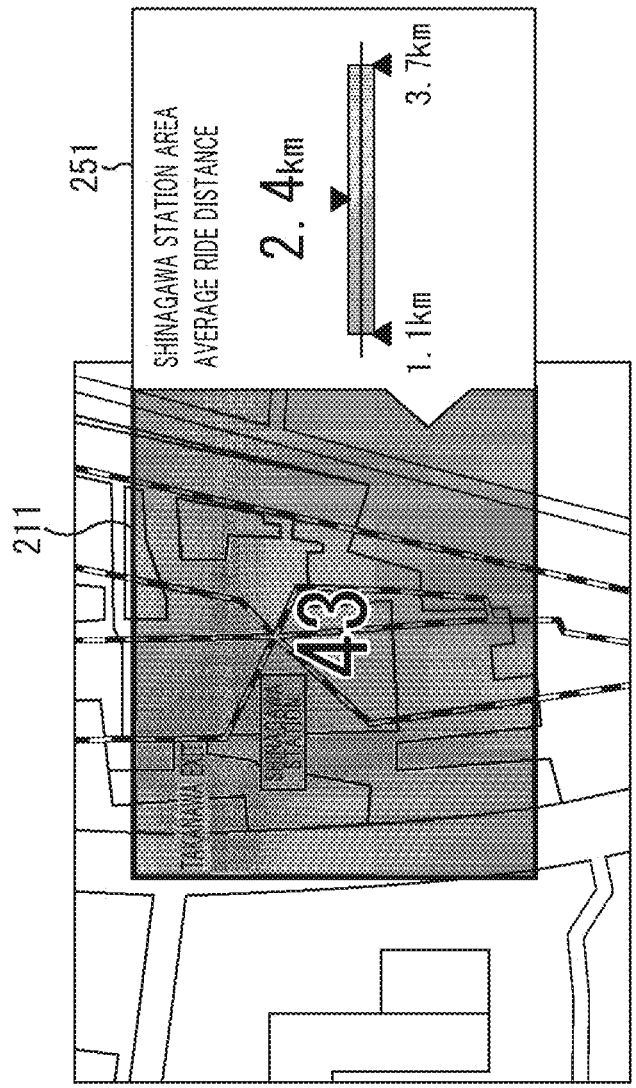
FIG. 19 is a diagram showing a sixth display example of the demand prediction screen.

FIG. 19 shows a sixth display example of the demand prediction screen that is displayed by the demand prediction application.

FIG. 19 also shows a display example of displaying a further detailed prediction result when the driver selects a prescribed area AR as the area AR of attention.

As shown in FIG. 19, when a prescribed area AR is selected as the area AR of attention, the demand prediction application can perform ride distance display 251 that displays an average ride distance and a confidence interval thereof of passengers who are picked up in the area AR of attention. The confidence interval represents a range in which an average value of a population (a population average) is included with prescribed reliability.

In the ride distance display 251, it is displayed that the average ride distance of pick-ups in the area AR of attention is "2.4 km" and a confidence interval of the average ride distance at, for example, 95%-reliability is "1.1 km to 3.7 km". The reliability of the confidence interval is not limited to 95% and can be arbitrarily set to 99% or the like.

In this manner, by displaying an average ride distance and a confidence interval thereof of the area AR of attention, for example, the driver can search for an area AR with a ride distance suitable for remaining on-duty time or search for an area AR with a long ride distance as a "cruising" path.

The ride distance display 251 may display an average ride distance and a confidence interval with respect to the area AR of attention as shown in FIG. 19 or display an average ride distance and a confidence interval in association with the pinpoint pick-up position symbol 221 and display an average ride distance and a confidence interval with respect to a pinpoint pick-up position.

Alternatively, an average fare and a confidence interval may be displayed instead of an average ride distance and a confidence interval.

Yet alternatively, an average ride duration and a confidence interval may be displayed instead of an average ride distance and a confidence interval.

In addition, the ride distance display 251 may predict a pick-up demand for each time slot or each type of weather and display an average ride distance and a confidence interval, an average fare and a confidence interval, or an average ride duration and a confidence interval that are customized for a prescribed time slot or a prescribed type of weather.

13. Display of Prediction of Fare

There are users who refrain from using taxis 11 since fares are only finalized after being picked up. The demand prediction application has a function of predicting a fare from a current location and a destination and displaying the predicted fare.

Figure 20:
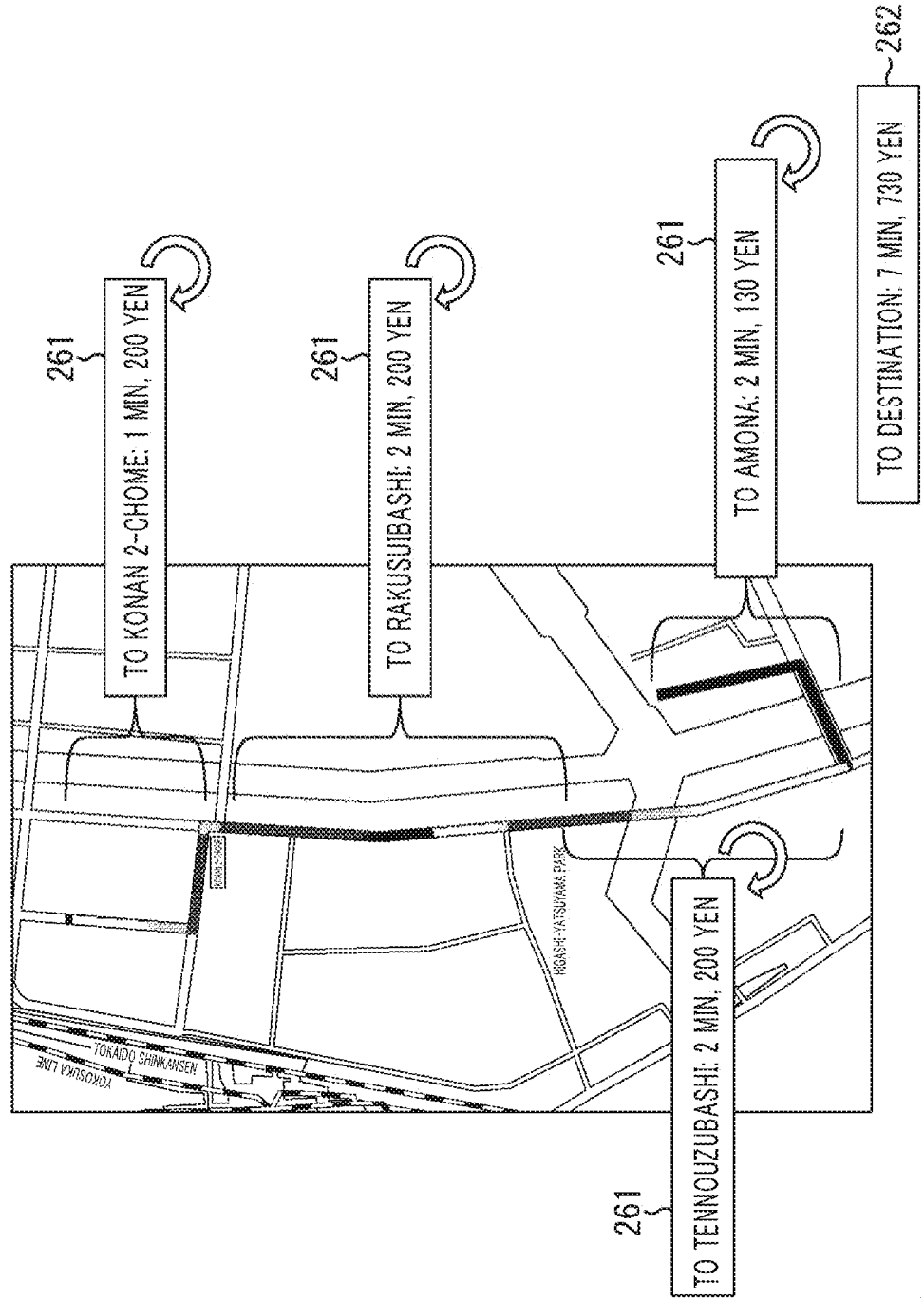
FIG. 20 is a diagram showing an example of a fare prediction screen.

FIG. 20 shows an example of a fare prediction screen that is displayed by the demand prediction application.

The demand prediction application causes a time and a fare required to move to a destination to be displayed on a display as a prediction result and, at the same time, causes a time and a fare required by movement for each division unit created by dividing a movement path to the destination into prescribed units to be displayed on the display as a prediction result.

On the fare prediction screen shown in FIG. 20, an individual display 261 indicates a time and a fare required by movement for each division unit. A destination display 262 indicates a time and a fare required by the movement to the destination.

Learning of a fare and a movement time is difficult when using the hired vehicle data shown in FIG. 5 without modification since both a point of origin and a point of arrival require the same data. In consideration thereof, the control portion 121 learns a time and a fare required by movement for each divided unit from the vehicle dynamic log data. In addition, by obtaining a sum of times and fares of the respective divided units included from the point of origin to the point of arrival, the control portion 121 calculates a time and a fare required to move to the destination. For example, the division unit can be a unit divided using at least one or a plurality of a unit divided by a prescribed distance, a prescribed time, a road section (block), or the like, a unit divided by traffic lights or intersections, and the like.

A movement time and a fare for each divided unit and a movement time and a fare to the destination may be displayed with a prescribed leeway such as "5 minutes to 10 minutes" and "300 yen to 500 yen".

According to the various display methods described with reference to FIGS. 13 to 20, the driver of the taxi 11 can conduct business in a more efficient manner. In other words, the demand prediction application can present a prediction result that contributes toward improving a pick-up ratio.

With respect to the various display methods described with reference to FIGS. 13 to 20, enabling or disabling display, an order of displays, and the like can be appropriately set on a setting screen that is displayed on the display when the driver operates the setting button 64 of the demand prediction application.

14. Learning of Pick-Up Position

Next, learning and predictions other than those related to a pick-up demand which are performed by the server 12 will be explained.

Figure 21:
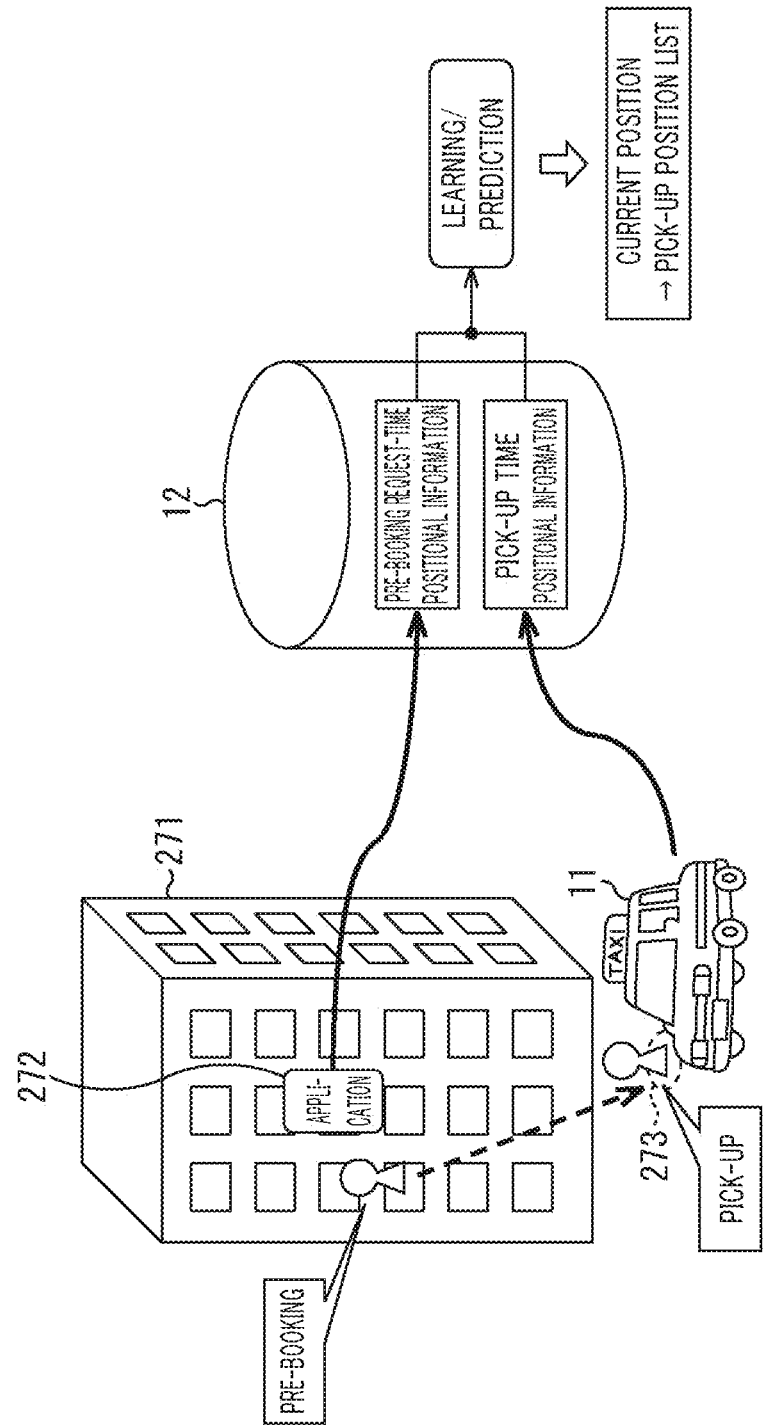
FIG. 21 is a diagram for explaining learning of a pick-up position.

FIG. 21 is a diagram for explaining learning of a pick-up position with respect to a building.

For example, a user (customer) of the taxi 11 books the taxi 11 using a pre-booking application 272 executed on a terminal such as a smartphone from a prescribed position inside a building 271 and gets on the taxi 11 at a prescribed position 273 such as a driveway of the building 271. In this case, the pre-booking application 272 acquires positional information of the user at a timing at which the user had booked the taxi 11 from a GPS receiver inside the terminal and transmits the positional information to the server 12 as pre-booking request-time positional information. In addition, pick-up time positional information that is positional information of the user at a timing at which the user had got onto the taxi 11 can be acquired from the vehicle dynamic log data that is transmitted from the vehicle management apparatus 22 of the taxi 11.

The server 12 learns a relationship between the pre-booking request-time positional information and the pick-up time positional information. Accordingly, a pick-up position at the building 271 can be learned in terms of where the driver should position the taxi 11 relative to the building 271 when the user books the taxi 11 from a prescribed position inside the building 271. The server 12 stores a learning result in the storage portion 122 as a pick-up position list. The demand prediction application can display a learned pick-up position at the building 271 on the map 41. In addition, when the user designates the building 271 as a destination, the driver can adopt the learned pick-up position at the building 271 as a drop-off position.

Furthermore, even with respect to buildings other than the building 271 at which the taxi 11 had actually been booked, the server 12 can infer a pick-up position at the buildings based on a learned relationship between the pre-booking request-time positional information and the pick-up time positional information and display the inferred pick-up position on the map 41.

15. Learning of Drop-Off Position

FIG. 21 is a diagram for explaining learning of a drop-off position with respect to a building.

For example, a user is dropped off by the taxi 11 at a prescribed position 274 and moves to the prescribed building 271 that is a destination. Drop-off time positional information that is positional information of the user at a timing at which the user had been dropped off by the taxi 11 can be acquired from the vehicle dynamic log data that is transmitted from the vehicle management apparatus 22 of the taxi 11. In addition, the pre-booking application 272 acquires positional information of the building 271 to which the user had moved after being dropped off by the taxi 11 from the GPS receiver inside the terminal and transmits the positional information to the server 12 as positional information after movement.

The server 12 learns a relationship between the drop-off time positional information and the positional information after movement. Accordingly, a drop-off position at the building 271 can be learned in terms of where the driver should drop off a user when the user designates the building 271 as a destination. The server 12 stores a learning result in the storage portion 122 as a drop-off position list. The demand prediction application can display a learned drop-off position at the building 271 on the map 41. In addition, when the user books the taxi 11 using the pre-booking application 272 from a prescribed position inside the building 271, the driver can also utilize the learned drop-off position at the building 271 as a pick-up position.

16. Learning of Pick-Up Position

Figure 22:
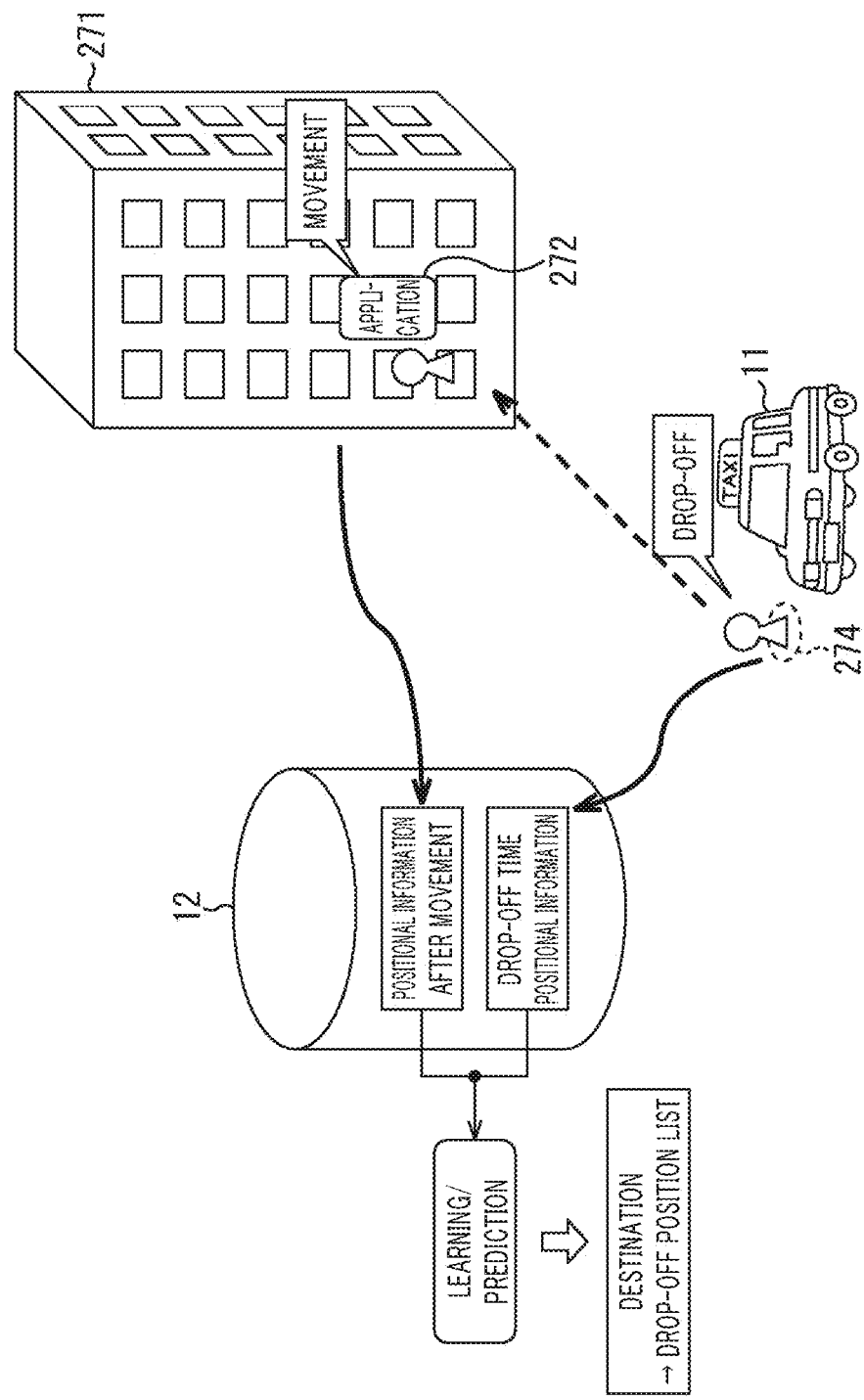
FIG. 22 is a diagram for explaining learning of a drop-off position.

While the examples explained with reference to FIGS. 21 and 22 include also displaying a learned pick-up position as a drop-off position and also displaying a learned drop-off position as a pick-up position, generally, a pick-up position and a drop-off position with respect to a building are often situated in a taxi pool or a driveway, in front of an entrance, or the like and are often the same position or positions that are close to each other.

Figure 23:
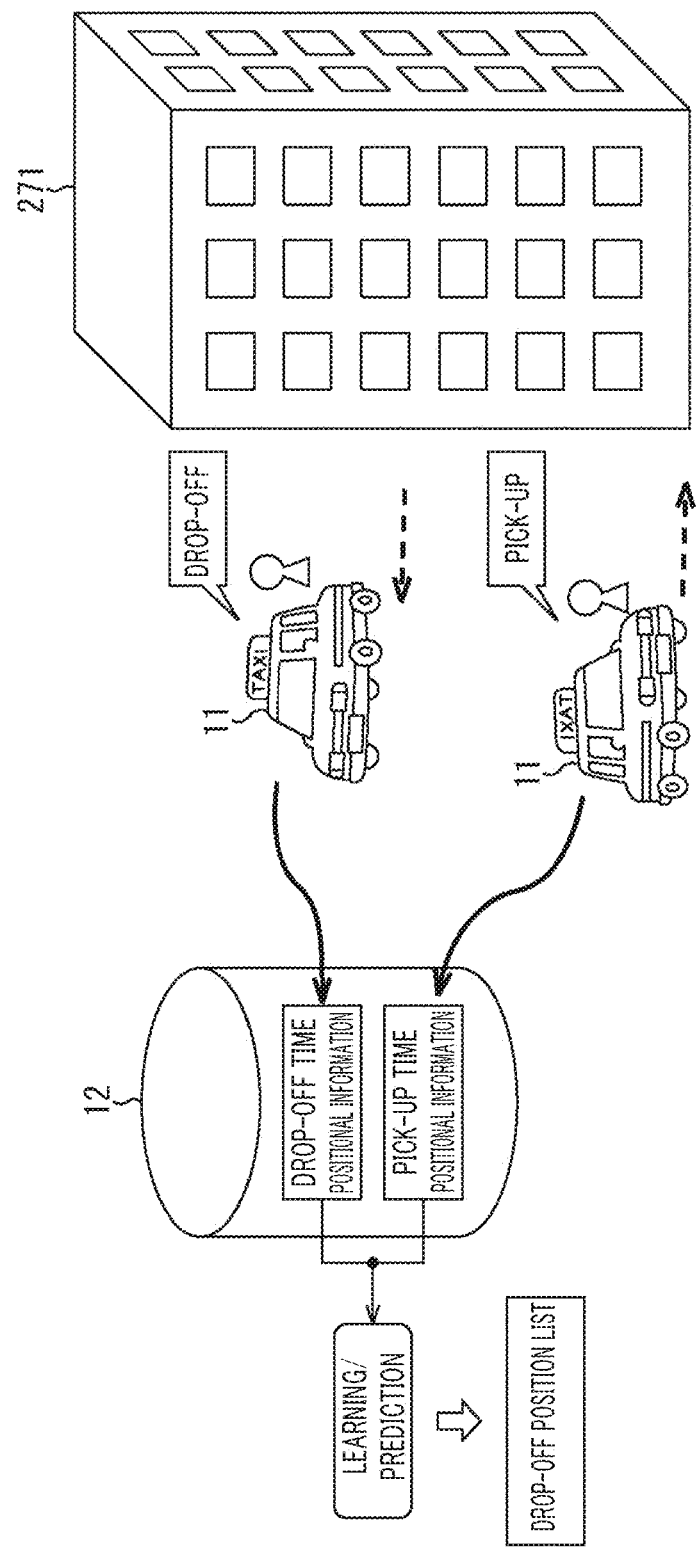
FIG. 23 is a diagram for explaining learning of a pick-up position.

In consideration thereof, as shown in FIG. 23, the server 12 learns pick-up time positional information and drop-off time positional information, learns an optimal pick-up position for the building 271, and stores the learned optimal pick-up position in the storage portion 122 as a pick-up position list. The demand prediction application can display a learned pick-up position at the building 271 on the map 41.

17. Pick-Up Demand Guidance by Sound

Next, guidance of a prediction result of a pick-up demand by sound that is executed by the demand prediction application will be described.

For safety reasons, the driver of the taxi 11 cannot look at the demand prediction screen that is displayed by the demand prediction application while driving. In consideration thereof, in addition to displaying a prediction result of predicting a pick-up demand on a map on the display, the demand prediction application has a function of also notifying the driver of the prediction result of a pick-up demand using sound.

Since the demand prediction application is unable to notify all of the prediction results being displayed on the demand prediction screen by sound, the demand prediction application notifies a prediction result corresponding to a current location (hereinafter, also referred to as a host vehicle position) of the taxi 11 and a travel direction of the taxi 11.

In addition, the demand prediction application switches between a display method and a sound notification method of a demand prediction in accordance with the scale of the map 41 that displays the demand prediction.

Hereinafter, display and sound output of a demand prediction in a case where the scale of the map 41 that displays the demand prediction is a high magnification or, in other words, in a case of wide-area map display and display and sound output of a demand prediction in a case where the scale of the map 41 is a low magnification or, in other words, in a case of detailed map display will be explained in order.

Since notifications using sound of the demand prediction application include both notifications by non-verbal sound (also referred to as a sound effect, an electronic sound, or the like) such as "beep, beep, beep", "boing", and "ding-dong" and notifications by voice (message) constituted by words or sentences, in the following description, a sound effect will be simply expressed as a sound and an audio output constituted by words will be expressed as voice for the sake of brevity.

Example of Sound Notification in Wide-Area Map Display

Figure 24:
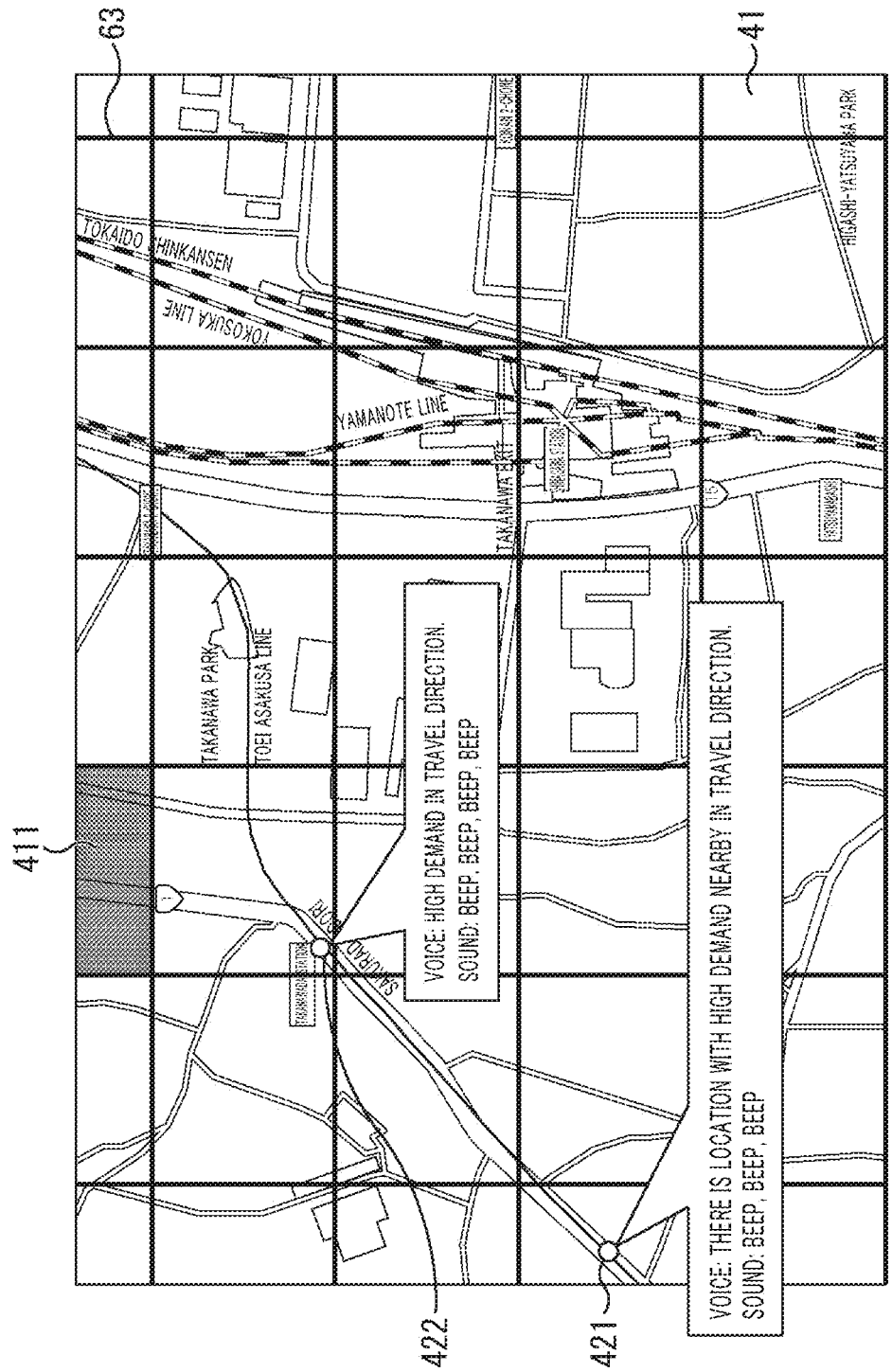
FIG. 24 is a diagram showing an example of the demand prediction screen in a case of wide-area map display.

FIG. 24 shows an example of the demand prediction screen in a case where the scale of the map 41 that displays a demand prediction is a high magnification or, in other words, in a case of wide-area map display.

On the demand prediction screen shown in FIG. 24, it is assumed that an area 411 among the respective areas AR of the demand prediction mesh 63 that is superimposed and displayed on the map 41 is an area AR predicted as a location with a high pick-up demand. In FIG. 24, display of a color or a density in accordance with a degree of a pick-up demand of each area AR other than the area 411 has been omitted.

The taxi 11 is traveling in a location indicated by a host vehicle position symbol 421, and the area 411 predicted as a location with a high pick-up demand is present in a travel direction of Route 1.

The demand prediction application detects that the area 411 with a high pick-up demand is present in the travel direction and notifies the driver by sound or voice to the effect that the area 411 with a high pick-up demand is present in the travel direction. For example, the demand prediction application outputs "There is a location nearby with high demand in the travel direction" by voice and outputs three consecutive sounds of "Beep, beep, beep".

In addition, when the taxi 11 travels along Route 1 and is at a location indicated by a host vehicle position symbol 422, for example, the demand prediction application outputs "Demand is high in the travel direction" by voice and outputs four consecutive sounds of "Beep, beep, beep, beep".

In this manner, when the area 411 with a high pick-up demand is present in the travel direction, the demand prediction application notifies the driver to that effect by sound or voice at a prescribed timing. For example, the timing of notification may be set for each area AR of the demand prediction mesh 63. In this case, a notification by sound or voice is output every time the area AR in which the traveling taxi 11 is positioned changes. Alternatively, the demand prediction application may issue a notification every preset time (for example, at 1-minute intervals) or every preset distance (for example, at 1-km intervals). The timing of notification can be changed on a setting screen that is displayed by operating the setting button 64.

The demand prediction application changes contents of a voice message or types of sound to be output in accordance with a distance (proximity) to the area AR with a high pick-up demand having been detected in the travel direction. In the example described above, at the host vehicle position symbol 421 indicating a host vehicle position at a distance from a high demand area, the demand prediction application outputs "There is a location nearby with high demand in the travel direction" by voice and outputs three consecutive sounds of "Beep, beep, beep". At a closer location, the demand prediction application outputs "Demand is high in the travel direction" by voice and outputs four consecutive sounds of "Beep, beep, beep, beep". In other words, in terms of voice output, the message is changed from "There is a location nearby with high demand in the travel direction" to "Demand is high in the travel direction". In terms of sound output, three consecutive sounds of "Beep, beep, beep" is changed to four consecutive sounds of "Beep, beep, beep, beep" so that the closer to the high-demand area, the larger the number of consecutive "beep" sounds. Besides increasing the number of consecutive sound effects, a length of sound may be changed such as "beep", "beeeeep", and "beeeeeep", or a volume of the sound may be gradually increased. In addition, a combination of at least two of the number, the length, and the volume of sounds may be adopted.

Furthermore, for example, when an intersection is present in the travel direction and a high-demand area is in a direction of a right turn taken at the intersection, the demand prediction application can output a voice of "Demand is high in a direction of a right turn taken at the intersection".

A degree of a pick-up demand at which a high-demand area is notified by sound or voice by the demand prediction application can also be changed on a setting screen that is displayed by operating the setting button 64. For example, while each area AR of the demand prediction mesh 63 is displayed in a color or density in accordance with a degree of a pick-up demand as shown in FIG. 2, when the degree of a pick-up demand that is distinguished by color or density on the demand prediction screen shown in FIG. 2 has five stages from level 1 to level 5, a configuration can be adopted such that a notification is issued when an area AR of which the degree of a pick-up demand is a highest level (level 5) is present in the travel direction or a notification is issued when an area AR of which the degree of a pick-up demand is level 4 or higher is present in the travel direction.

Whether guidance of a high-demand area is to be performed solely by sound, solely by voice, or by both sound and voice can also be set by the driver on the setting screen. The demand prediction application has a notification function (a notifying portion) for notifying a driver of a prescribed area AR that is a location with a high pick-up demand by at least one of sound and voice.

In FIG. 18, the long-distance display 241 was described in which, when there is an area AR or a pick-up position with a high ratio of pick-ups of which a ride distance is to be long distance, the ratio (proportion) of pick-ups of which a ride distance is to be long distance is displayed as a degree of long distance.

When the demand prediction screen set to wide-area map display is displayed on the display, the demand prediction application can also notify the driver of an area AR or a pick-up position with a high degree of long distance by sound or voice.

For example, when an area AR of which the degree of long distance is equal to or higher than a prescribed value is present in the travel direction, the demand prediction application outputs "There is a long-distance area nearby" by voice and outputs "boing" that is a different type of sound from a notification of a high-demand area.

Example of Sound Notification in Detailed Map Display

Figure 25:
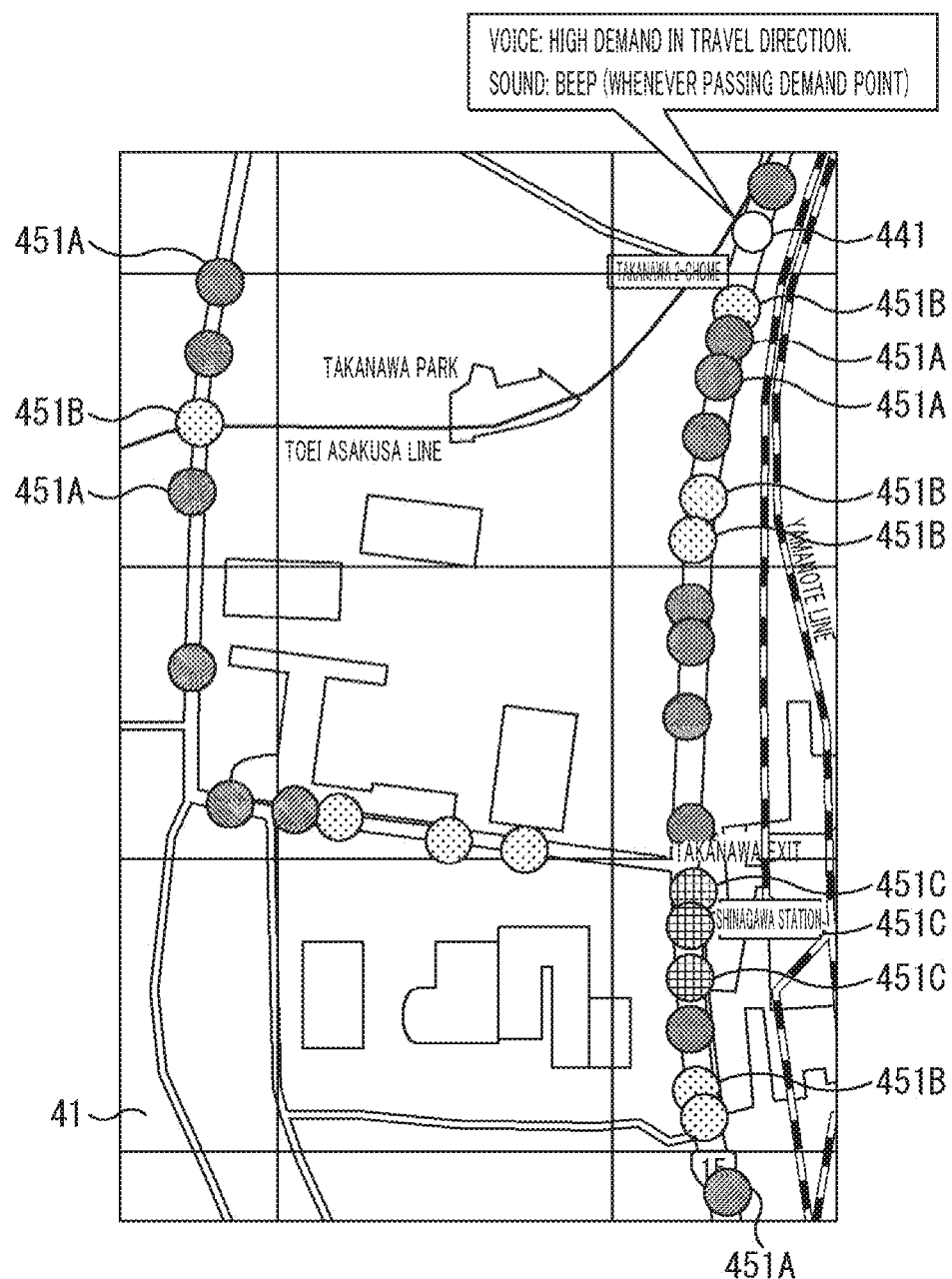
FIG. 25 is a diagram showing an example of the demand prediction screen in a case of detailed map display.

FIG. 25 shows an example of the demand prediction screen in a case where the scale of the map 41 that displays a demand prediction is a low magnification or, in other words, in a case of detailed map display.

In the detailed map display shown in FIG. 25, the taxi 11 is traveling in a location indicated by a host vehicle position symbol 441.

In detailed map display, as a result of learning using hired vehicle sequence data, pick-up positions at which a pick-up demand exceeds a prescribed level are respectively displayed as circular demand points 451 within a display region that is displayed on the display. It should be noted that, in FIG. 25, reference signs of a part of the demand points 451 have been omitted in order to prevent the diagram from becoming confusing.

For example, among pick-up positions learned within a display region that is displayed on the display, 30 locations with the highest pick-up demands are displayed as the demand points 451. However, a prescribed pick-up position that is selected due to a total number of pick-up positions being small is excluded even when the prescribed pick-up position is included in the 30 highest pick-up positions. Therefore, pick-up positions that are displayed as the demand points 451 are pick-up positions of which a predicted pick-up demand is at least equal to or higher than a prescribed first level ThA and which are included in the 30 highest pick-up positions.

In the example shown in FIG. 25, as the demand points 451, there is a demand point 451A displayed by a circle with high density, a demand point 451B displayed by a circle with low density, and a demand point 451C displayed by a pattern that differs from the demand points 451A and 451B.

A difference in density between the demand point 451A and the demand point 451B represents degrees of predicted pick-up demands. In other words, when the predicted pick-up demand is equal to or higher than a second level ThB that indicates a high pick-up demand, display by the demand point 451A with high density is adopted, and when the predicted pick-up demand is equal to or higher than the first level ThA and lower than the second level ThB, display by the demand point 451B with low density is adopted. In this manner, by changing the density of the demand point 451 in accordance with a magnitude of a pick-up demand, for example, when a demand point 451 is displayed independently without overlapping with other demand points 451, the driver can recognize a difference in pick-up demand based on a difference in density. In addition, when a demand point 451 is displayed while overlapping with other demand points 451, since the density of the demand point 451 appears to be high, even a location where pick-up demands have accumulated can be caused to be recognized as a location with a high pick-up demand by the driver. Instead of distinguishing demand points by two levels of densities represented by the demand point 451A and the demand point 451B, densities may be changed in a stepless manner in accordance with degrees of pick-up demand.

The demand point 451C that is displayed by a different pattern represents a demand point 451 of which a degree of long distance is equal to or higher than a prescribed value among the demand points 451 selected as the 30 demand points 451 with the highest pick-up demands. Accordingly, the driver can recognize demand points 451 with high degrees of long distance in the detailed map display.

Although the demand point 451C with a high degree of long distance and other demand points 451A and 451B are displayed by different patterns in FIG. 25 due to limitations intrinsic to the drawing, on a display capable of color display, the demand point 451C can be distinguished from the demand points 451A and 451B by changing colors.

While locations of up to 30 highest pick-up positions are displayed as the demand points 451 in the display region of detailed map display in the example described above, the number of demand points 451 to be displayed can be changed on a setting screen. For example, the number of demand points 451 to be displayed can be made selectable from 30 highest, 20 highest, 10 highest, and the like on the setting screen.

In addition, while up to 30 highest pick-up positions are selected and displayed in the display region of detailed map display in the example described above, 30 highest demand points 451 may be selected and displayed in units of areas AR of the demand prediction mesh 63. In other words, an extraction unit by which the demand points 451 are to be extracted can be set as appropriate.

Next, guidance by sound and voice in detailed map display such as that shown in FIG. 25 will be described.

The taxi 11 is traveling in a prescribed direction (for example, in a direction of Shinagawa Station) from a location indicated by the host vehicle position symbol 441. When demand points 451 are present within a prescribed distance in the travel direction, the demand prediction application outputs "Demand is high in travel direction" by voice. In addition, the demand prediction application outputs a "beep" sound every time the taxi 11 passes a demand point 451. One sound is output for each demand point 451.

In detailed map display, since a sound is output with respect to passing a demand point 451, the "beep" sound is consecutively generated with respect to roads on which many demand points 451 are displayed. Accordingly, the driver can recognize that a road currently traveled by the taxi 11 is a road with a high pick-up demand and contributions may be made toward improving recognition of areas AR and roads with a high pick-up demand and, in turn, towards improving a pick-up ratio. A volume when outputting the "beep" sound may be changed in accordance with a degree of a pick-up demand of each demand point 451.

Although different from the example shown in FIG. 25, when there are no demand points 451 in the travel direction of the taxi 11 but there are a large number of demand points 451 in an opposite direction to the travel direction, for example, the demand prediction application outputs a voice such as "There are high-demand points in the opposite direction". Furthermore, for example, when an intersection is present in the travel direction and a road with a large number of demand points 451 is in a direction of a right turn taken at the intersection, the demand prediction application outputs a voice such as "Demand is high in a direction of a right turn taken at the intersection".

Figure 26:
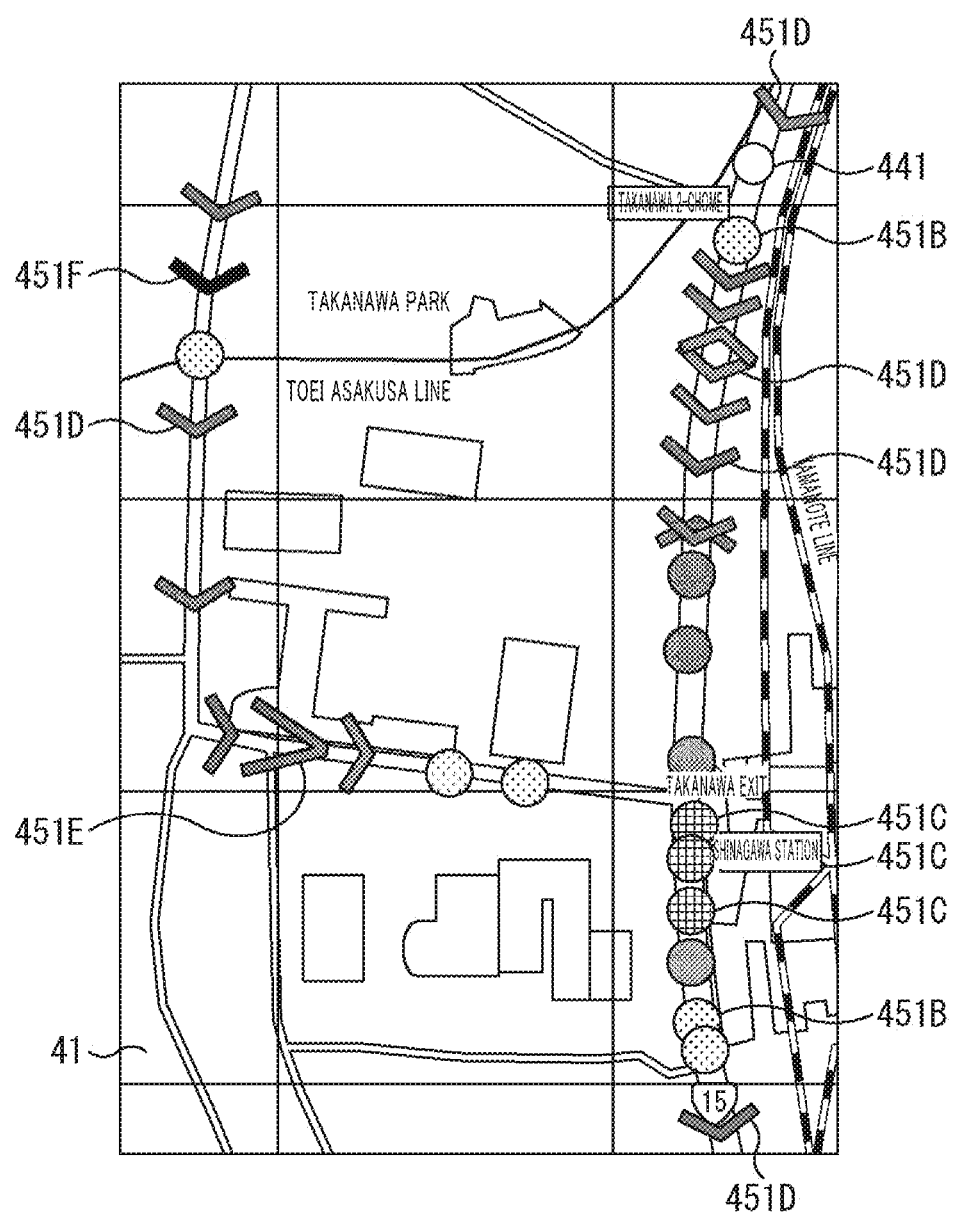
FIG. 26 is a diagram showing another example of detailed map display.

FIG. 26 shows another display example of detailed map display.

In the detailed map display shown in FIG. 26, a part of the demand points 451 displayed in the detailed map display shown in FIG. 25 has been replaced by demand points 451D to 451F.

Since vehicle dynamic log data also records the travel direction of the taxi 11 as shown in FIG. 4, the travel direction of the taxi 11 having picked up a passenger at the demand point 451 is also learned. For example, the travel direction of the taxi 11 at the demand point 451 is learned in eight directions in a similar manner to the arrows 212-1 to 212-8 in FIG. 14. When there is a travel direction that has a ratio of 50% or higher among the eight travel directions of the taxi 11 having picked up a passenger at each demand point 451, the demand prediction application can display the direction (hereinafter, referred to as a dominant direction).

The demand point 451D represents the demand point 451 indicating the dominant direction. The demand point 451E is displayed when the number of demand points 451D which have a same dominant direction and which are present within a prescribed range is equal to or larger than a prescribed number.

In other words, the demand point 451E represents a set of a prescribed number or more of the demand points 451D.

For example, the demand point 451D is displayed by a chevron (a V-shaped) symbol as shown in FIG. 26 and a direction indicated by an angle represents the dominant direction. The demand point 451E is represented by a symbol created by further enlarging the symbol of the demand point 451D. Alternatively, for example, the demand point 451D and the demand point 451E may be displayed by other symbols capable of indicating a direction such as arrow symbols.

The demand point 451F represents the demand point 451 which has the dominant direction and which has a high degree of long distance. In other words, when the demand point 451D having the dominant direction is a demand point 451 with a high degree of long distance in a similar manner to the demand point 451C shown in FIG. 25, displaying the demand point 451D by changing a pattern or a color in a similar manner to the demand point 451F simultaneously expresses the fact that the demand point 451D is also a demand point 451 with a high degree of long distance. When the demand point 451E also has a high degree of long distance, the demand point 451E is similarly displayed by changing a pattern or a color.

When a dominant direction is present at each demand point 451 in the detailed map display, displaying the dominant direction can help the driver to determine a travel direction when performing so-called "cruising" and can contribute toward improving a pick-up ratio. In addition, even with respect to an intersection that potentially has various directions, referring to a dominant direction around the intersection enables the driver to determine a travel direction with a high pick-up demand.

Since a notification method using sound and voice in the detailed map display shown in FIG. 26 is similar to that shown in FIG. 25, a description will be omitted.

Even in detailed map display, whether guidance of the demand points 451 is to be performed solely by sound, solely by voice, or by both sound and voice is changed in accordance with a setting value of the setting screen. The demand prediction application has a notification function (a notifying portion) for notifying a driver of a prescribed demand point 451 that is a location with a high pick-up demand by at least one of sound and voice.

As described above, the demand prediction application can contribute toward improving a pick-up ratio by notifying the driver of a prediction result of a pick-up demand with respect to the travel direction of the taxi 11 by sound or voice.

Between cases where the demand prediction screen is wide-area map display (FIG. 24) and the demand prediction screen is detailed map display (FIGS. 25 and 26), methods of displaying a pick-up demand differ and, accordingly, notification methods by sound and voice also differ.

Switching between wide-area map display and detailed map display can be performed by the driver by, for example, operating the scaling button 62 or changing settings on the setting screen. Alternatively, instead of a touch panel operation, the demand prediction application may perform the switching by recognizing (speech recognition) a vocal instruction of "wide-area display" or "detailed display" that is uttered by the driver. Furthermore, the demand prediction application may perform the switching automatically. For example, the demand prediction application can switch to detailed map display when it is determined that the host vehicle position of the taxi 11 has entered a high-demand area having been guided in wide-area map display and can switch to wide-area map display when it is determined that the host vehicle position of the taxi 11 has exited the high-demand area.

<Voice Guidance Control Processing>

The guidance of a prediction of a pick-up demand by sound or voice described above is necessary when the taxi 11 is for hire and without a passenger but is not necessary when the taxi 11 is hired and with a passenger. In addition, notifications by sound and voice are perceived as noise by a passenger. In consideration thereof, the demand prediction application can acquire a status of "hired" or "for hire" that is detected by the taximeter 21 and control enabling or disabling guidance by sound and voice in conjunction with the status.

Figure 27:
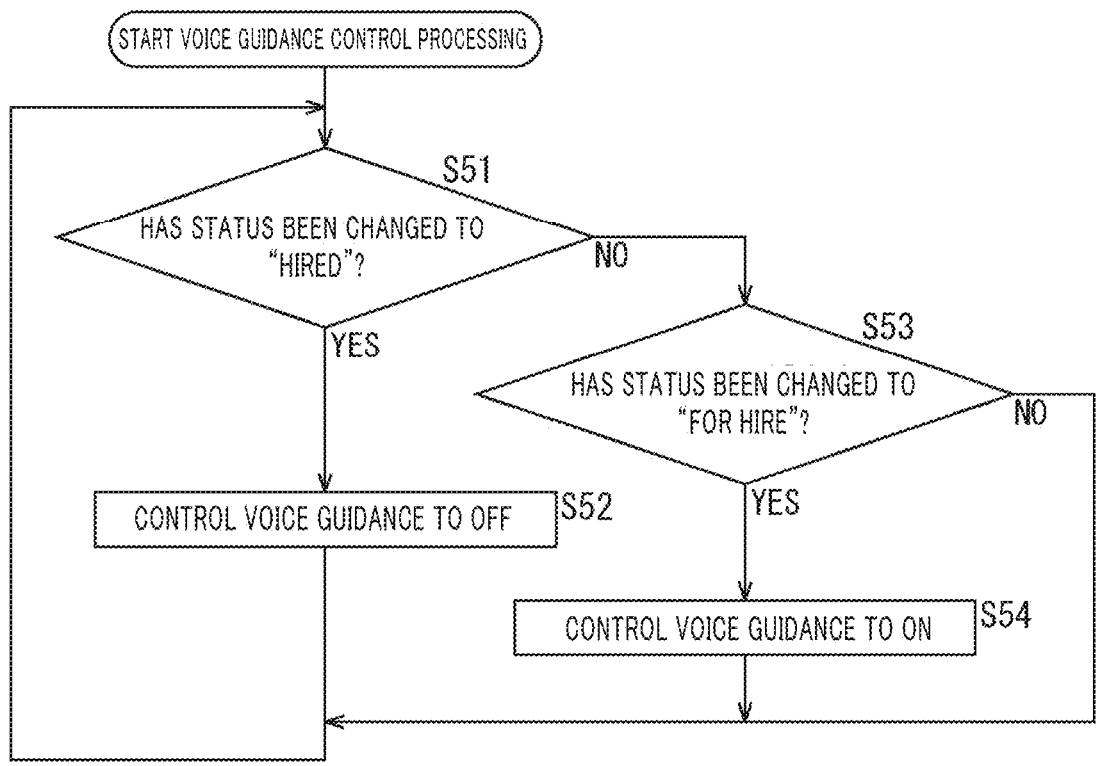
FIG. 27 is a flow chart for explaining voice guidance control processing.

FIG. 27 is a flow chart of voice guidance control processing for controlling voice guidance.

First, in step S51, the demand prediction application determines whether or not the status of the taxi 11 (vehicle) has been changed to "hired".

When it is determined in step S51 that the status of the taxi 11 has been changed to "hired", processing advances to step S52 and the demand prediction application controls the voice guidance to an off state. After step S52, the processing returns to step S51.

On the other hand, when it is determined in step S51 that the status of the taxi 11 has not been changed to "hired", processing advances to step S53 and the demand prediction application determines whether or not the status of the taxi 11 has been changed to "for hire".

When it is determined in step S53 that the status of the taxi 11 has been changed to "for hire", processing advances to step S54 and the demand prediction application controls the voice guidance to an on state. After step S54, the processing returns to step S51.

On the other hand, even when it is determined in step S53 that the status of the taxi 11 has not been changed to "for hire", the processing returns to step S51. The voice guidance control processing shown in FIG. 27 is started when the demand prediction application is activated or when voice guidance is enabled on the setting screen, and is repetitively performed until the demand prediction application is deactivated.

As described above, the demand prediction application can control enabling or disabling voice guidance in conjunction with a status of "hired" or "for hire" that is detected by the taximeter 21. Due to control in conjunction with the status of "hired" or "for hire", voice guidance can be automatically (without an operation by the driver) executed only when required by the driver.

While the voice guidance control processing shown in FIG. 27 represents an example of notification control processing of voice guidance that outputs a pick-up demand in a travel direction in the form of a voice message, a notification by sound and a notification by both sound and voice are controlled in a similar manner. The demand prediction application may directly acquire the status of "hired" or "for hire" from the taximeter 21 or the demand prediction application may indirectly acquire the status via the vehicle management apparatus 22.

<Other Voice Output>

In addition to notifying a pick-up demand by sound and voice as described above, the demand prediction application can also notify the driver of the following types of information by voice.

For example, the demand prediction application can acquire information on shutdown of train operations and resumption of train operations from the server 12 in real time and output the information as voice (message). Accordingly, the driver can quickly move to an area in which a pick-up demand is to increase in accordance with the operation information of trains.

For example, the demand prediction application can acquire an end timing or a start timing of an event being held in the business area of the taxis 11 from the server 12 in real time and output the information as voice (message). Accordingly, the driver can quickly move to an area in which a pick-up demand is to increase in accordance with the end or the start of the event.

For example, the demand prediction application can acquire information on weather of the business area of the taxis 11 or, particularly, information related to a sudden weather variation from the server 12 in real time and output the information as voice (message). Accordingly, the driver can quickly move to an area in which a pick-up demand is to increase in accordance with the weather variation.

The server 12 acquires information on operations of trains, event information, weather information, and the like from a server of an affiliated information providing company and transmits the acquired information to the demand prediction application of each terminal apparatus 23.

18. Recommended Route Presentation Processing

In the embodiment described above, an example has been explained in which the driver determines a movement direction of the taxi 11 and drives the taxi 11 based on display of a pick-up demand prediction displayed on the display of the terminal apparatus 23 by the demand prediction application or voice output of the pick-up demand prediction.

Hereinafter, a recommended route presentation function will be described in which the demand prediction application searches for a path with a high pick-up demand based on pick-up demand prediction data transmitted from the server 12 and presents a recommended route.

The demand prediction application has a navigation function (a navigation processing portion) which, based on a host vehicle position, searches for a path to a destination set by an arbitrary method. Furthermore, in addition to a function of a general navigation system (hereinafter, referred to as a car navigation system) that is mounted to a vehicle, the demand prediction application has a function of searching for a path to the destination by taking into consideration locations predicted as locations with a high pick-up demand.

It should be noted that the destination may be a prescribed pinpoint location or a destination area such as one or more areas AR divided on the demand prediction mesh 63. In the following description, a location having been predicted as a location with a high pick-up demand will be referred to as a pick-up point. A pick-up point is the same as a location referred to as a pick-up position or a demand point in the description provided above.

The recommended route presentation function of the demand prediction application is used when the taxi 11 is for hire which is a state where no passenger is on board or, in other words, when the taxi 11 is so-called "cruising". Using the recommended route presentation function enables a passenger to be found within a short period of time and a for-hire period or a drive distance during a for-hire state to be reduced. In addition, the recommended route presentation processing is particularly useful for novice drivers who have only been in the taxi business for a short period of time because such drivers are yet to have an area (region) of specialty and have no knowledge about locations with a high pick-up demand. Even experienced drivers who have been in the taxi business for a long period of time and drivers who generate more than average sales have an area of specialty as well as not-so-familiar areas, when driving through a not-so-familiar area, a passenger can be found within a short period of time and a for-hire period or a drive distance during a for-hire state can be reduced. Setting an area or a location of specialty as a destination when searching for a route enables a driver to return to a desired area or location through a path (a pick-up point) with a high demand while carrying a passenger. Repetitively passing through a path (a pick-up point) with a high demand using the recommended route presentation function enables the driver to overcome the not-so-familiar area and expand the driver's area of specialty.

An area of specialty may be registered (set) by the driver in advance on the setting screen or the like or may be determined (automatically registered) by the demand prediction application using vehicle dynamic log data and hired vehicle data of the driver. As a location of specialty, for example, an office of the driver or a pinpoint pick-up position that is frequently used by the driver such as locations including a taxi stand which are frequently used by the driver and at which the driver performs "queueing".

Figure 28:
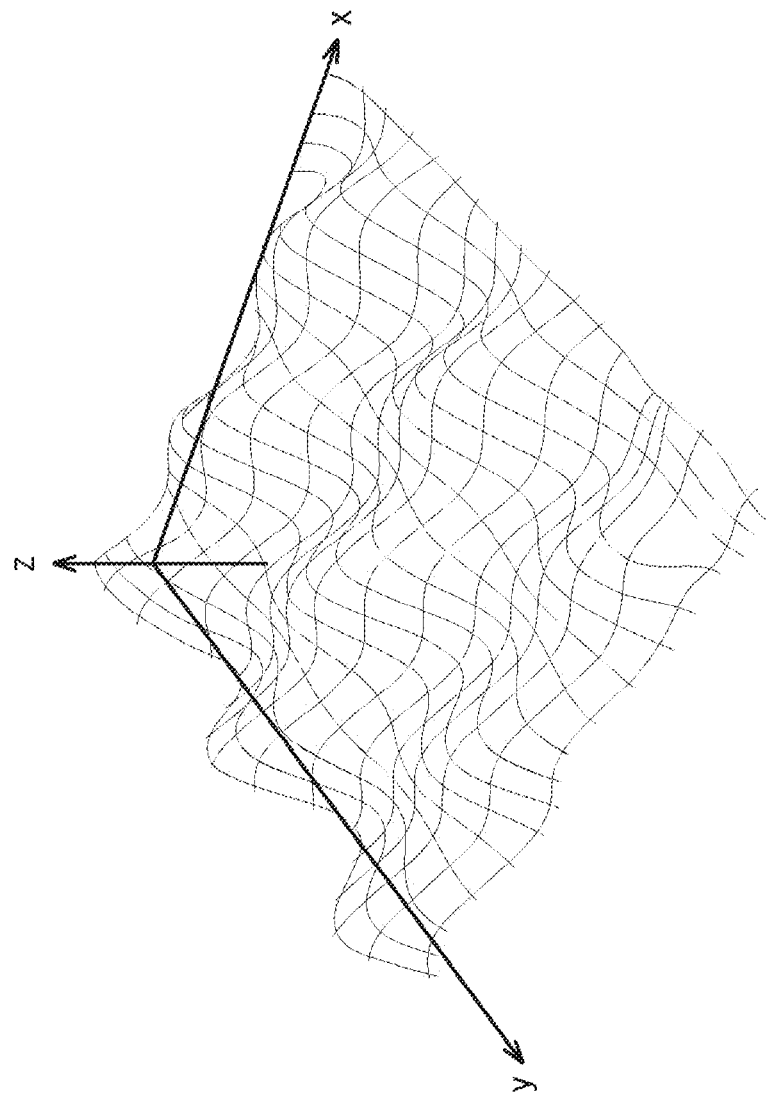
FIG. 28 is a diagram for explaining a heat map for extracting an area of specially.

When the demand prediction application determines an area of specialty using data, for example, the demand prediction application can create a heat map in which a Z axis direction represents accumulated time relative to a business area distributed on an XY plane as shown in FIG. 28 and extract a region of which a time value is equal to or greater than a prescribed threshold such as 70% of total time as an area of specialty of the driver. The area of specialty may be all of one or more areas extracted as being equal to or greater than the threshold, a single area with a longest accumulated time, or a plurality of areas with longest accumulated times. A display unit of the area of specialty may be the extracted v without modification or, in order to enhance recognition by the driver, a municipality with a largest area among the extracted region or a municipality in which a point with a longest accumulated time is present.

When vehicle dynamic log data is used as original data from which the accumulated time in the Z axis direction is calculated, an area in which the driver has spent a long time moving can be adopted as the area of specialty. In addition, when only vehicle dynamic log data of which the status is "hired" is used as the original data from which the accumulated time in the Z axis direction is calculated, an area in which the driver has spent a long time carrying a passenger can be adopted as the area of specially. When hired vehicle data is used as original data from which the accumulated time in the Z axis direction is calculated, an area with a large number of locations where the driver had picked up passengers can be adopted as the area of specialty.

Figure 29:
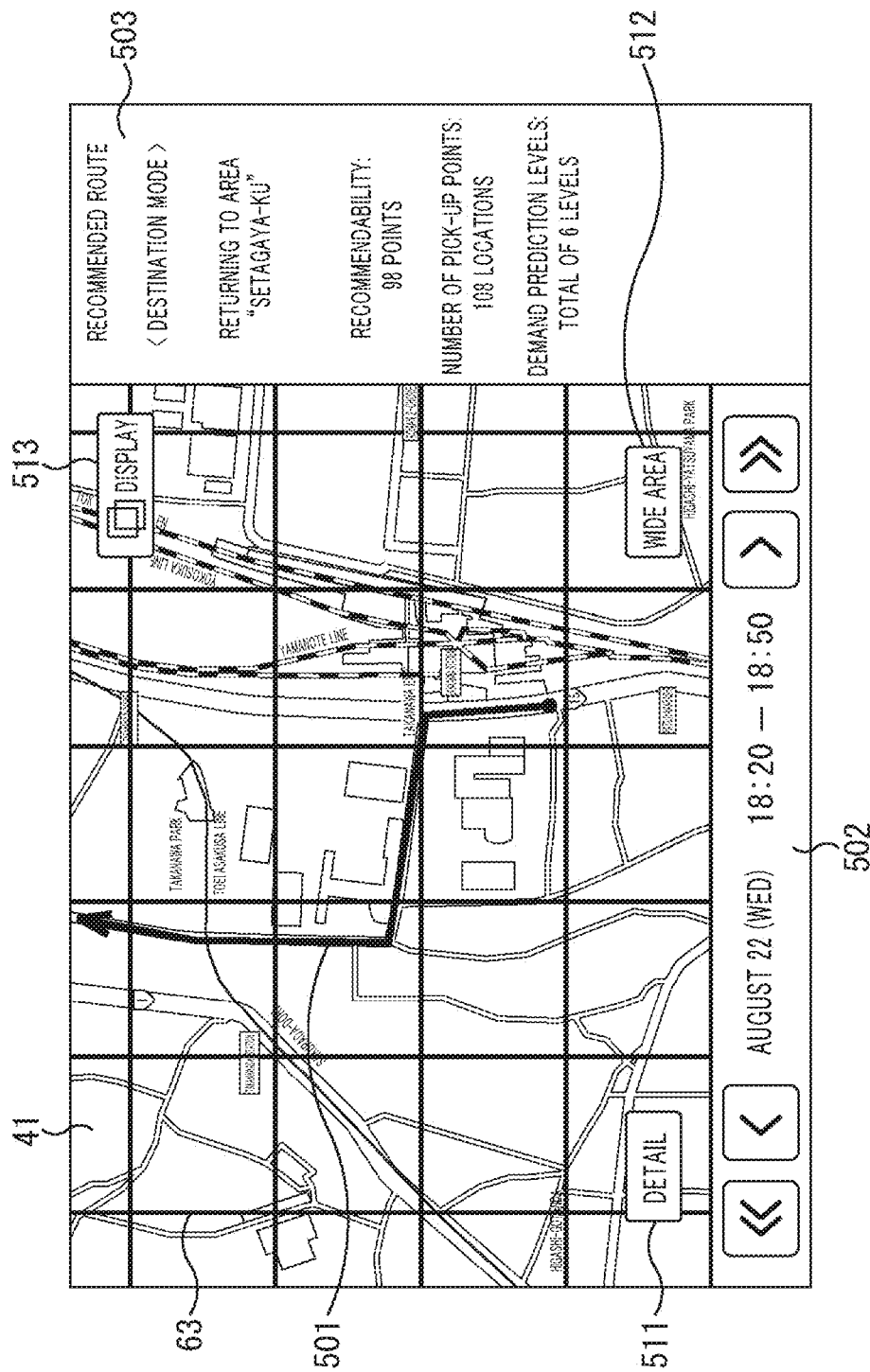
FIG. 29 is a diagram showing a display example of a recommended route presentation screen.

FIG. 29 shows a display example of a recommended route presentation screen in a state where the recommended route presentation function is being executed by the demand prediction application.

The recommended route presentation screen shown in FIG. 29 is displayed after a recommended route is searched when, for example, the driver taps on a recommended route search button or the like being displayed on a screen of the demand prediction screen shown in FIG. 2 or the like.

The map 41 on which the demand prediction mesh 63 is superimposed is displayed on the recommended route presentation screen shown in FIG. 29. While each area AR of the demand prediction mesh 63 is classified and displayed in a color or density in accordance with a degree of a pick-up demand as described earlier with reference to FIG. 2, display by color or density has been omitted in the example shown in FIG. 29 for the sake of brevity. The omission of display by color or density in accordance with a degree of a pick-up demand similarly applies to FIGS. 32 to 44 to be described later.

A route search result 501 of a recommended route is displayed on the map 41. In addition, a detail button 511 that is operated when changing a scale of the map 41 to a low magnification, a wide area button 512 that is operated when changing the scale of the map 41 to a high magnification, a full-screen display button 513 that is operated when switching to full-screen display, and the like are also displayed on the map 41.

A prediction time point display portion 502 is arranged below the map 41. The prediction time point display portion 502 displays a prediction time point of demand prediction when performing the search for a recommended route and, at the same time, the prediction time point of demand prediction can be changed in a similar manner to the prediction time point setting region 42 shown in FIG. 2.

A recommended route information presenting portion 503 is arranged to the right of the map 41 and the prediction time point display portion 502. In the recommended route information presenting portion 503, characters that read "recommended route" indicating that the current screen is a recommended route presentation screen is displayed in an uppermost part.

"<Destination mode>" is displayed in the recommended route information presenting portion 503, representing that the route search result 501 displayed on the map 41 had been searched in the "destination mode" among a plurality of search modes. As modes of route search that take demand points into consideration, the demand prediction application has three search modes, namely, the "destination mode", an "immediate pick-up mode", and a "nearby pick-up point mode".

The "destination mode" is a mode in which a destination is set and a route that passes through a demand point is searched from a plurality of routes to the destination. The destination may be set by the driver or an area of specialty of the driver may be set as a destination (a destination area). For example, the "destination mode" is suitable when a current location of the taxi 11 is some place other than an area of specialty and the driver wishes to find a passenger while returning to the area of specialty.

The "immediate pick-up mode" is a mode in which a specific destination has not been set and a route that passes through a demand point is searched from the current location. The "immediate pick-up mode" can be used when the current location of the taxi 11 is within an area of specialty.

The "nearby pick-up point mode" is a mode in which a specific destination has not been set and a route which is close to the current location and which passes through a demand point with a high evaluated value is searched. The "nearby pick-up point mode" can be used both when the current location of the taxi 11 is within an area of specialty and when the taxi 11 is outside of the area of specialty.

"Returning to area 'Setagaya-ku'" which represents that the destination of the route search in the "destination mode" is Setagaya-ku is displayed below "<Destination mode>" in the recommended route information presenting portion 503.

Furthermore, information including "Recommendability: 98 points", "Number of pick-up points: 108 locations", and "Demand prediction levels: Total of 6 levels" are displayed in the recommended route information presenting portion 503.

"Recommendability: 98 points" represents that recommendability of the route search result 501 displayed on the map 41 is 98 points. Recommendability may be a point display with 100 being a full score or a point display representing that the larger the numerical value, the higher the recommendability. "Number of pick-up points: 108 locations" represents that a route indicated by the route search result 501 displayed on the map 41 is a route that passes through 108 pick-up points. While an example in which a degree of a pick-up demand of each area AR being distinguished by color or density is displayed in 5 stages from level 1 to level 5 has been described with reference to the demand prediction screen shown in FIG. 2, "Demand prediction levels: Total of 6 levels" represents that a sum of levels of pick-up demands of one or more areas AR through which the route search result 501 displayed on the map 41 passes through is 6 levels.

Recommended route presentation processing which searches for a recommended route in consideration of demand points and which presents the driver with the recommended route will be described with reference to the flow chart shown in FIG. 30.

The processing is started by tapping, for example, a recommended route search button or the like being displayed on a screen of the demand prediction screen shown in FIG. 2 or the like. As the pick-up demand prediction data to be used in recommended route presentation processing, in addition to using data periodically transmitted from the server 12, data can be acquired by making a request to the server 12 when necessary.

First, in step S71, the demand prediction application determines whether or not a search mode has been designated. A search mode can be designated by, for example, selecting any search mode button of the "destination mode", the "immediate pick-up mode", and the "nearby pick-up point mode" on a mode selection screen that is displayed after pressing the route search button. Alternatively, a setting may be configured in advance so that the "destination mode" is selected when the host vehicle position is outside of an area of specialty and the "immediate pick-up mode" or the "nearby pick-up point mode" is selected when the host vehicle position is within the area of specialty.

The processing of step S71 is repeated until a determination that a search mode has been designated is made, and once it is determined that a search mode has been designated, the processing advances to step S72.

In step S72, the demand prediction application determines which of the "destination mode", the "immediate pick-up mode", and the "nearby pick-up point mode" is the designated search mode.

When it is determined in step S72 that the designated search mode is the "destination mode", the processing advances to step S73 and processing of steps S73 to S75 is executed. When it is determined that the designated search mode is the "immediate pick-up mode", the processing advances to step S76 and processing of steps S76 and S77 is executed. When it is determined that the designated search mode is the "nearby pick-up point mode", the processing advances to step S78 and processing of steps S78 to S80 is executed.

In step S73 when it is determined that the designated search mode is the "destination mode", the demand prediction application sets an area of specialty as the destination. While the destination is set by default to an area of specialty that is registered in advance, the destination can also be changed by an operation by the driver.

In step S74, the demand prediction application searches for a plurality (a prescribed number) of routes based on the host vehicle position and the destination using a route search algorithm such as Dijkstra's method or A* algorithm. The processing is similar to the processing performed by a general car navigation function.

In step S75, the demand prediction application calculates a total score SUMscore of the respective searched routes.

The total score SUMscore of the routes can be calculated by, for example, calculating score Sc=pick-up demand level [1 to 5] of area AR×pick-up point [0 or 1]×degree of coincidence of direction [cos 0] for each area AR that the searched route passes through and adding up the scores Sc of the respective areas AR from the host vehicle position to the destination. The pick-up demand level [1 to 5] of an area AR represents a degree of a pick-up demand of the area AR and takes any value among levels 1 to 5. The pick-up point [0 or 1] takes a value of 1 when a pick-up point is present in the area AR and 0 when a pick-up point is not present. The degree of coincidence of direction [cos 0] represents an angle (cos 0) of a direction of the area AR from the host vehicle position relative to a direction of the destination from the host vehicle position, and the higher the degree of coincidence of direction, the closer the value is to 1. With respect to a demand prediction that is used in the calculation formula of the score Sc described above, a prediction time point of the area AR is sequentially updated in accordance with a distance from the host vehicle position such as the number of passed areas AR. For example, assuming that a single area AR is 500 m×500 m and the taxi 11 operates for 10 minutes at 30 km/h, since the taxi 11 travels 5 km in 10 minutes, the prediction time point of the area AR is advanced by 10 minutes every time the taxi 11 moves through 10 areas and the demand prediction of the route is updated accordingly. It should be noted that the pick-up point [0 or 1] in the calculation formula of the score Sc described above may be replaced with the number of pick-up points present in the area AR or the like.

In the total score SUMscore of the routes, the score Sc may be calculated for each pick-up point that is present on the routes instead of in units of the areas AR described above. In addition, when a direction of a part of the paths of the searched route is an opposite direction relative to the destination or the like, the score Sc may not be added or the score Sc may be subtracted.

The total score SUMscore of the routes is not limited to the example described above and an arbitrary calculation method that produces a high total score SUMscore with respect to routes with a high demand prediction level and a large number of pick-up points can be adopted.

In addition, other perspectives may be added to the total score SUMscore of the routes to calculate the score Sc or the total score SUMscore. For example, a coefficient or a score Sc in accordance with a degree of long distance of a pick-up point may be added so that the higher the degree of long distance, the larger the total score SUMscore or the score Sc. Alternatively, a coefficient or a score Sc may be added in accordance with whether a path that is passed along a searched route is a main thoroughfare, a narrow road, or the like. A movement direction of a passenger when picked up at each pick-up point can be identified from points of origin and points of arrival in previous ride history (hired vehicle data). The total score SUMscore or the score Sc may be calculated such that the closer the destination of the driver to a movement direction at a pick-up point, the larger the total score SUMscore or the score Sc.

After the calculation of the total score SUMscore of the respective routes in step S75, processing advances to step S81 to be described later.

On the other hand, in step S76 when it is determined that the designated search mode is the "immediate pick-up mode", the demand prediction application determines a plurality of routes by depth-limited search which is a graph theory with respect to a prescribed route search region. More specifically, assuming that intersections are nodes and roads (paths) between intersections are edges in graph theory, a plurality of routes are determined within the route search region by a depth-limited search. When the host vehicle position is within an area of specialty, the route search region may be the area of specialty, a region within a radius of a certain number of km from the host vehicle position, or a prescribed number of areas AR centered on the host vehicle position.

In step S77, the demand prediction application calculates a total score SUMscore of the respective searched routes. For example, the demand prediction application calculates the total score SUMscore by calculating a score Sc of each pick-up point that is present on a searched route as, for example, score Sc=pick-up demand level [1 to 5] of area AR including pick-up point and adding up the scores Sc.

The total score SUMscore of the routes is not limited to the example described above and an arbitrary calculation method that produces a high total score SUMscore with respect to routes with a high demand prediction level and a large number of pick-up points can be adopted. An addition or subtraction of a score Sc in an opposite direction and an update of a prediction time point of a demand prediction can be performed in a similar manner to the calculation in the "destination mode".

After the calculation of the total score SUMscore of the respective routes in step S77, processing advances to step S81 to be described later.

On the other hand, in step S78 when it is determined that the designated search mode is the "nearby pick-up point mode", the demand prediction application extracts pick-up points of which a distance from the host vehicle position is within a certain value and adds the score Sc to each extracted pick-up point.

For example, the score Sc of each pick-up point in the "nearby pick-up point mode" can be added as follows.

For example, at each pick-up point, the closer a date and time at which a pick-up had been made is to the present date and time, the larger the score Sc to be added by the demand prediction application. At each pick-up point, the larger the number of pick-ups that have been made, the larger the score Sc to be added by the demand prediction application. At each pick-up point, the longer a total ride time (a sum of ride times of the respective pick-ups) or the longer an average ride time, the larger the score Sc to be added by the demand prediction application.

At each pick-up point, the demand prediction application adds a higher score Sc to locations that can be reached by traveling straight ahead or turning left and adds a lower score Sc to locations that can be reached by turning right.

Figure 31:
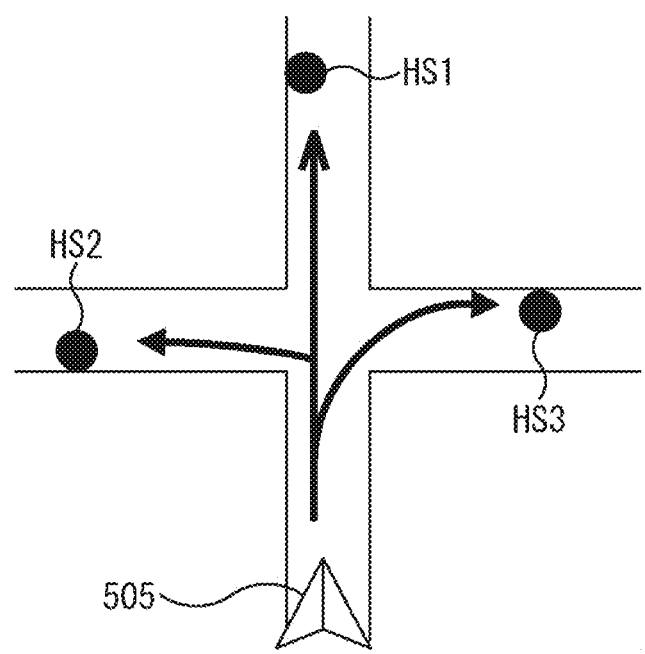
FIG. 31 is a diagram for explaining impartation of a score of a pick-up point.

For example, as shown in FIG. 31, let us assume that the taxi 11 is traveling in a location indicated by a host vehicle position symbol 505, and a pick-up point HS1 that can be reached by traveling straight ahead, a pick-up point HS2 that can be reached by turning left, and a pick-up point HS3 that can be reached by turning right are present as pick-up points. In Japan which uses left-hand traffic, while the straight-ahead pick-up point HS1 and the left-turn pick-up point HS2 are relatively readily reached, the right-turn pick-up point HS3 which requires traversing the opposite lane is often dependent on a timing of traffic lights and timings of vehicles traveling on the opposite lane and may take time to be reached. Therefore, the demand prediction application can add a higher score Sc to the pick-up point HS1 and the pick-up point HS2 than the score Sc to be added to the pick-up point HS3.

On roads in other countries where right-hand traffic is used, the score Sc is added so that a higher score Sc is added to locations that can be reached by traveling straight ahead or turning right and a lower score Sc is added to locations that can be reached by turning left. In other words, a higher score Sc is added to pick-up points that can be reached by traveling straight ahead or in a direction that does not require traversing the opposite lane and a lower score Sc is added to pick-up points in a direction that require traversing the opposite lane.

At each pick-up point, the closer the location is to the host vehicle position, the larger the score Sc to be added by the demand prediction application.

At each pick-up point, the larger the ratio of the pick-up point in an area AR in which the pick-up point is present (for example, the number of pick-ups at the pick-up point/the number of pick-ups in the entire area AR), the larger the score Sc to be added by the demand prediction application.

When a destination has been set, at each pick-up point, the higher the degree of coincidence with a direction of the destination, the larger the score Sc to be added by the demand prediction application.

A sum of the scores Sc added to the respective pick-up points as described above is adopted as the final score Sc of each pick-up point. It should be noted that the example described above is an example of an addition method by which the score Sc is added to each pick-up point and the score Sc may be added according to other addition criteria.

In step S79, the demand prediction application refers to the score Sc added to each pick-up point and searches for a plurality of routes having a prescribed number of pick-up points with high scores Sc as via-points. More specifically, first, the score Sc added to each pick-up point is referred to and a prescribed number of pick-up points with high scores is extracted. Subsequently, a plurality (a prescribed number) of routes are searched using a route search algorithm so that the routes pass through the extracted pick-up points.

In step S80, the demand prediction application calculates a total score SUMscore of the respective searched routes. For example, the demand prediction application calculates the total score SUMscore by adding up scores Sc of the respective pick-up points that are present on the searched routes. Alternatively, the number of pick-up points that are present on the routes may be adopted as the total score SUMscore.

After the calculation of the total score SUMscore of the respective routes in step S80, processing advances to step S81.

In step S81, a route with a highest total score SUMscore among the plurality of routes having been calculated in any of the search modes of the "destination mode", the "immediate pick-up mode", and the "nearby pick-up point mode" is displayed on the display as a recommended route. The recommended route presentation screen shown in FIG. 29 represents a display example when the search mode is the "destination mode".

Figure 30:
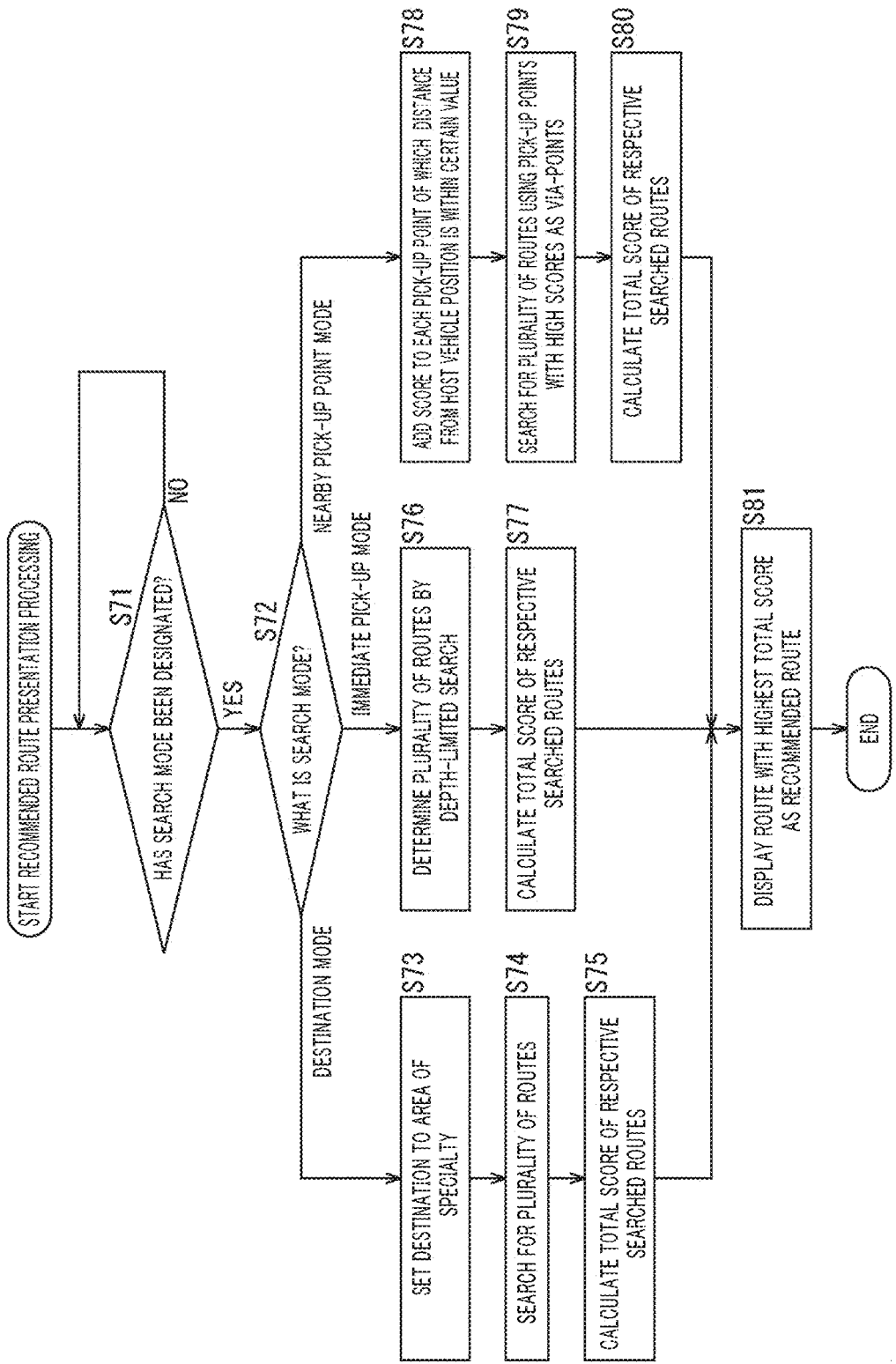
FIG. 30 is a flow chart for explaining route presentation processing.

Recommended route presentation processing shown in FIG. 30 is executed as follows. After the recommended route is presented, guidance of the route is started in a similar manner to a general car navigation system. In other words, in addition to a route display by the display, the driver is instructed of the route by voice guidance such as "Turn right at the next intersection". In route display by the display, a symbol, a color, a pattern, or the like of a pick-up point to be displayed on the route may be changed and displayed in accordance with a value (a magnitude) of the score Sc of the pick-up point in a similar manner to the demand point 451 shown in FIG. 26.

When the driver performs an operation to stop the guidance of the recommended route by a touch panel operation or the like, guidance of the recommended route is ended. Alternatively, the demand prediction application of the terminal apparatus 23 may acquire a status of "hired", "for hire", or "pre-booked" from the taximeter 21 or the vehicle management apparatus 22 and end (automatically end) guidance of the recommended route when a statue other than "for hire" or, in other words, the status of "hired" or "pre-booked" is attained.

19. No-Pick-Up Zone Guide Display

The driver of the taxi 11 must beware of no-pick-up zones where it is prohibited to pick up passengers at locations other than taxi stands. Hypothetically speaking, when a driver unfamiliar with no-pick-up zones such as a novice driver picks up a passenger in a no-pick-up zone, a harsh penalty is imposed on the driver. For example, in the Kanto region, no-pick-up zones are set in Ginza and Shinbashi. In the Kansai region, no-pick-up zones are set in Kita-shinchi and Nanchi.

The demand prediction application can display a no-pick-up zone on the demand prediction screen.

Figure 32:
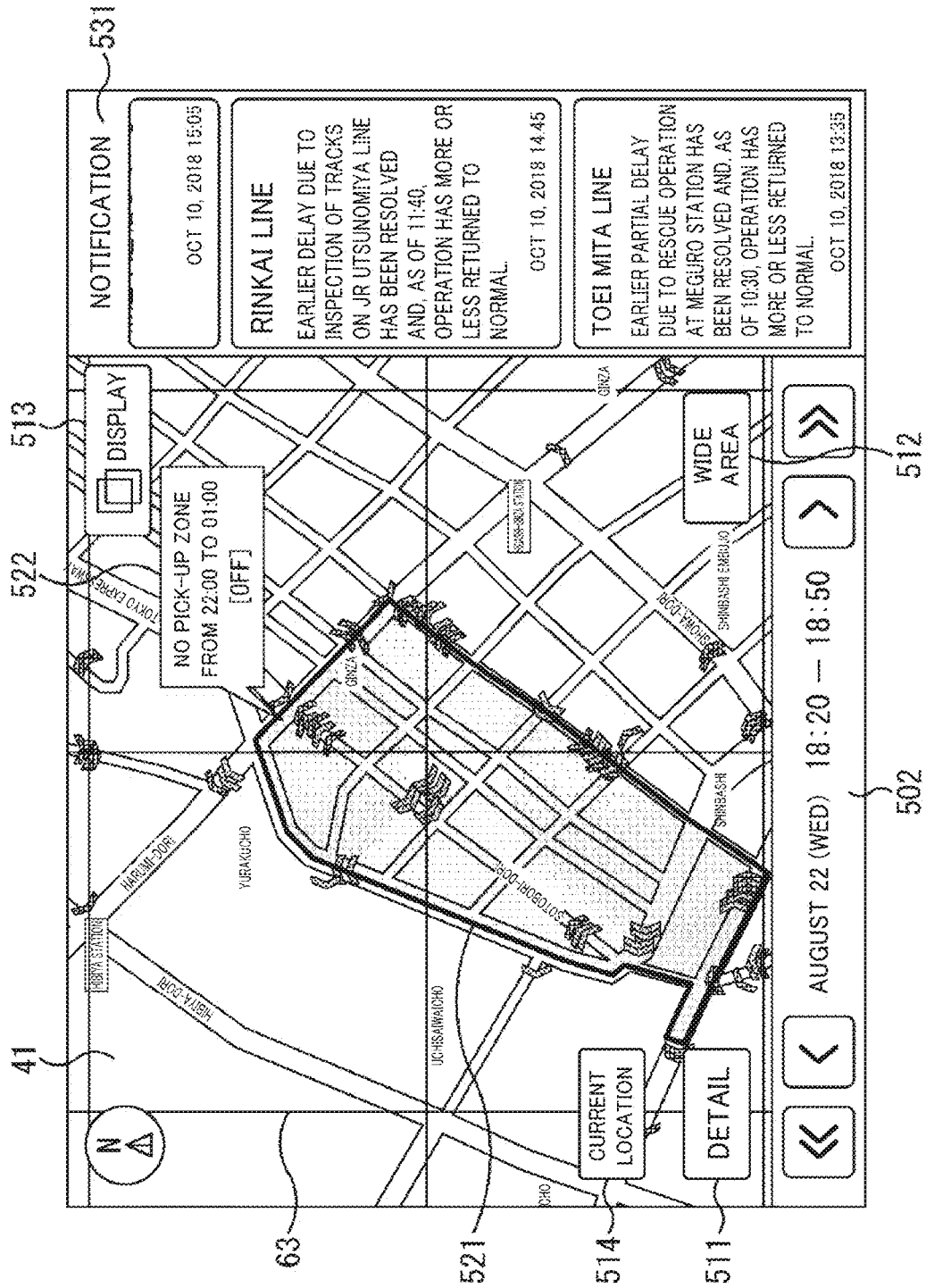
FIG. 32 is a diagram showing an example of the demand prediction screen displaying a no-pick-up zone.

FIG. 32 shows an example of the demand prediction screen displaying a no-pick-up zone.

In FIG. 32, portions corresponding to FIG. 29 and the like are denoted by same reference signs and descriptions of such portions will be omitted when appropriate.

On the demand prediction screen shown in FIG. 32, the detail button 511, the wide area button 512, and the full screen display button 513 are displayed on the map 41 on which the demand prediction mesh 63 is superimposed. In addition, a current location button 514 that switches the display of the map 41 to a display with a host vehicle position as a reference is also displayed on the map 41.

Furthermore, a no-pick-up zone display 521 is displayed in a region corresponding to the no-pick-up zone of the map 41. In addition, a detailed display 522 that displays detailed information related to the no-pick-up zone is also displayed in a vicinity of the no-pick-up zone display 521. The detailed display 522 includes characters reading "No-pick-up zone from 22:00 to 01:00" that indicates a period in which the no-pick-up zone is applied and an [OFF] button for erasing the no-pick-up zone display 521. Since the no-pick-up zone display 521 is superimposed on the map 41, the no-pick-up zone display 521 can be erased by operating the [OFF] button when a display indicating a pick-up point of a demand prediction is not readily visible or when the driver does not require the no-pick-up zone to be displayed. Once outside of the period in which the no-pick-up zone is applied, the demand prediction application erases the no-pick-up zone display 521 and the detailed display 522.

In addition, on the demand prediction screen shown in FIG. 32, a prediction time point display portion 502 and an additional information display portion 531 are provided in a region that differs from the display region of the map 41. For example, operation information on trains, event information, or weather information is displayed in the additional information display portion 531.

Information related to a no-pick-up zone may be stored in advance in the demand prediction application (the terminal apparatus 23) or may be acquired from the server 12 or a server at another information-providing company or the like.

20. Queue Location Display

In the display of queueing time prediction shown in FIG. 17, it has been described that there is a method referred to as "queueing" in which a taxi 11 waits in a queue of taxis 11 at a taxi stand and acquires a passenger in a stand-by state. Locations (hereinafter, referred to as queue locations) where queueing is performed include taxi stands in front of a station or a hotel, an entrance of a prescribed office building, and the like. Such queue locations include locations where a taxi company that can use the queue location is limited. A queue location limited to a prescribed taxi company cannot be used by a taxi 11 belonging to other taxi companies. The demand prediction application has a function of displaying that a queue location is reserved for a prescribed taxi company.

Figure 33:
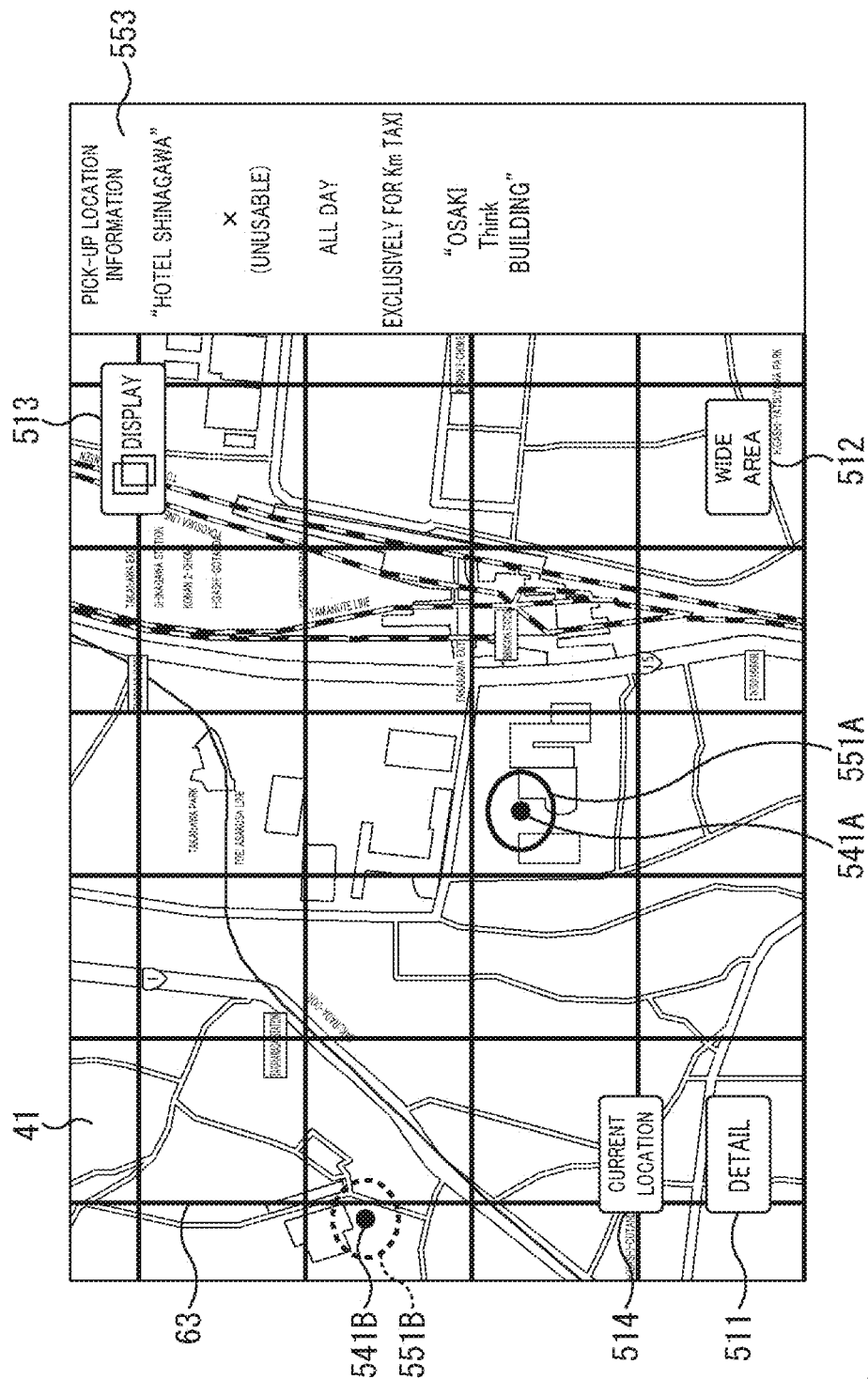
FIG. 33 is a diagram showing an example of the demand prediction screen displaying a queue location.

FIG. 33 shows an example of the demand prediction screen displaying a queue location for each taxi company.

On the demand prediction screen shown in FIG. 33, the detail button 511, the wide area button 512, the full screen display button 513, and the current location button 514 are displayed on the map 41 on which the demand prediction mesh 63 is superimposed.

In addition, at prescribed pick-up points 541A and 541B on the map 41, queue location displays 551A and 551B indicating that the pick-up points are queue locations are displayed. The queue location display 551A is represented by a solid circular shape while the queue location display 551B is represented by a dashed-line circular shape, which means that display methods differ between the queue location display 551A and the queue location display 551B. The difference in display methods represents a difference in taxi companies that can use the queue locations. The queue location display 551A and the queue location display 551B will be simply referred to as the queue location display 551 when not particularly distinguishing between the two.

By selecting (tapping) a prescribed queue location display 551, the driver can display detailed information 553 of the queue location. In the example shown in FIG. 33, the detailed information 553 related to the queue location display 551A of the pick-up point 541A is displayed.

The detailed information 553 displays information such as a pick-up place name, whether or not the taxi 11 can use the queue location, a time slot during which passengers can be picked up, a name of a taxi company that can use the queue location, and other usable queue locations displayed on the map 41 on the demand prediction screen.

The detailed information 553 of the queue location display 551A in FIG. 33 displays "Hotel Shinagawa" as the pick-up place name, "x (unusable)" representing a queue location that cannot be used in regards to whether or not the taxi 11 can use the queue location, "All day" as a time slot during which passengers can be picked up, "For exclusive use by Km Taxi" as the name of the taxi company that can use the queue location, and "Osaki Think Building" as another usable queue location that is displayed on the map 41 on the demand prediction screen or, in other words, the pick-up place name of the pick-up point 541B that is represented by the queue location display 551B.

The demand prediction application can identify the taxi company of a driver by registering (inputting) a company ID for identifying the company, a driver ID for identifying a driver who drives the taxi 11, or the like on a login screen when activating the demand prediction application, a setting screen, or the like.

While the queue location displays 551A and 551B are represented by circular shapes that surround pick-up points in the screen example shown in FIG. 33, a display method of queue locations is not limited thereto. The display (color or symbol) of the queue location display 551 may be changed depending on whether or not the queue location is usable by the taxi 11 or the queue location display 551 may be displayed only with respect to queue locations that can be used by the taxi 11.

Information related to a queue location may be stored in advance in the demand prediction application or may be acquired from the server 12 or a server at another information-providing company or the like. Since vehicle dynamic log data includes a company ID for identifying a company to which the taxi 11 belongs, in addition to acquiring information on existing queue locations, the server 12 can estimate a pick-up point from history in the vehicle dynamic log data and, at the same time, specify whether or not the pick-up point is a queue location and, if so, specify which taxi company can use the queue location. Since whether or not a pick-up point is a queue location can be specified by detecting a queueing operation by the taxi 11 as described earlier, a pick-up change point at which the status changes from "for hire" to "hired" after the queueing operation can be adopted as a pick-up point that is a queue location.

The queue location display 551 of the demand prediction application prevents the driver from visiting unnecessary queue locations and enables business to be conducted in an efficient manner.

21. Train Time Display

At a station where a train to be operated last (a so-called last train) has departed during business hours of a railroad line, demands for taxis 11 by people who missed the train increase. In addition, even at a station where a last train has arrived, since other connecting trains and buses are likely to have finished for the day due to the late hour, demands for taxis 11 increase. Alternatively, on a railroad line with only a small number of operated trains (long operation intervals), people who get off a given station are likely to use the taxi 11. Therefore, if the driver can be provided with guidance about train time information such as a departure time or an arrival time of a last train, the driver can acquire a passenger by heading toward a taxi stand in front of a station based on the train time information.

The demand prediction application has a function for displaying a prescribed train time such as a time of a last train of a station of a railroad line being displayed on the map 41 on the demand prediction screen.

Figure 34:
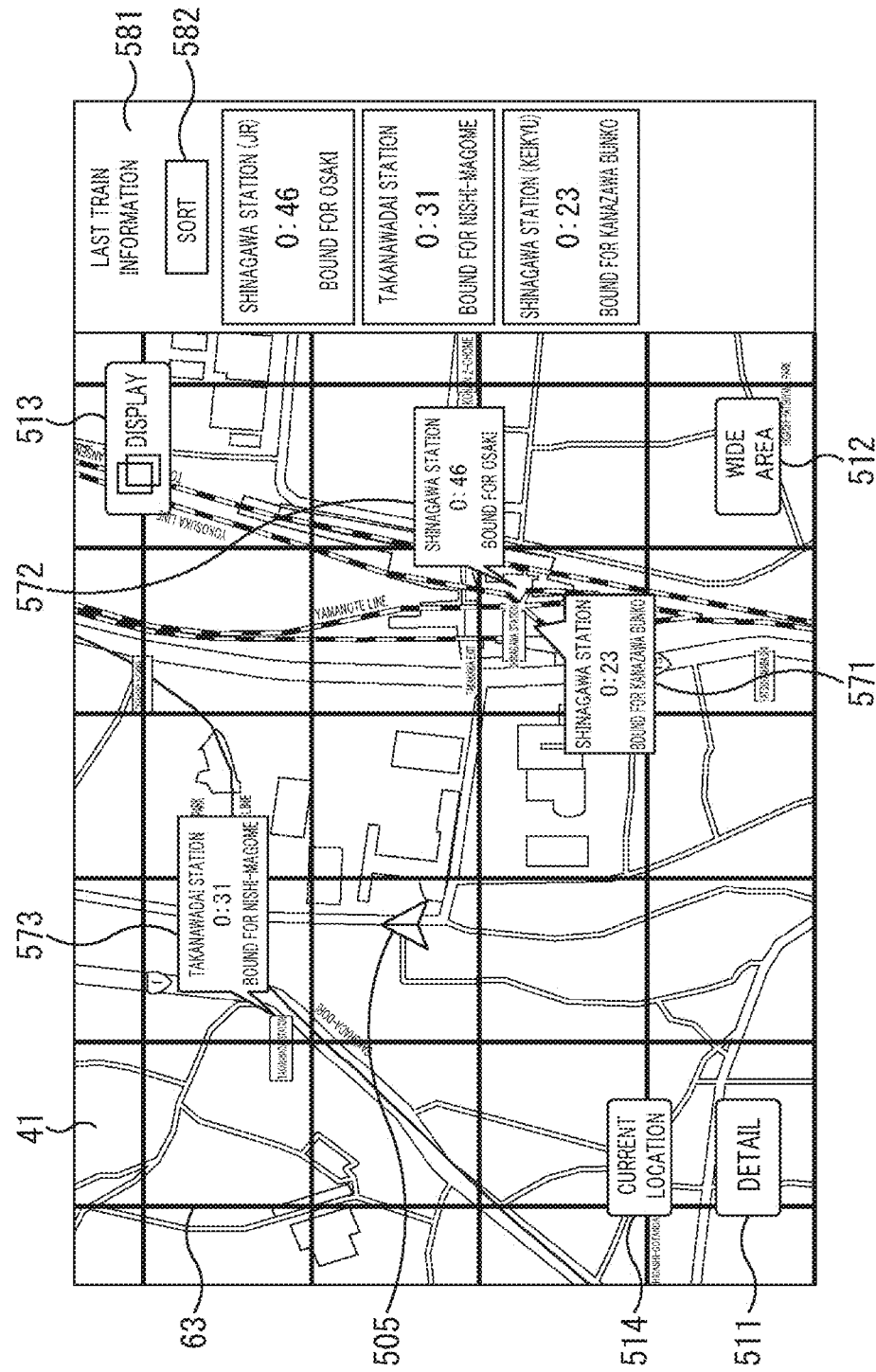
FIG. 34 is a diagram showing an example of the demand prediction screen displaying a train time of a last train.

FIG. 34 shows an example of the demand prediction screen displaying a train time of a last train.

On the map 41 on the demand prediction screen shown in FIG. 34, Shinagawa Station of Keihin Electric Express Railway Co., Ltd., Shinagawa Station of East Japan Railway Company (JR East), and Takanawadai Station of the Toei Asakusa Line are present and respective train times of last trains at the stations are displayed.

Specifically, a time display 571 displays "Shinagawa Station 0:23 Bound for Kanazawa-bunko", indicating that a departure time of the last train from Shinagawa Station of Keihin Electric Express Railway Co., Ltd., which is bound for Kanazawa-bunko, is 0:23.

A time display 572 displays "Shinagawa Station 0:46 Bound for Osaki", indicating that a departure time of the last train from Shinagawa Station of East Japan Railway Company (JR East), which is bound for Osaki, is 0:46.

A time display 573 displays "Takanawadai Station 0:31 Bound for Nishi-Magome", indicating that a departure time of the last train from Takanawadai Station of the Toei Asakusa Line, which is bound for Nishi-Magome, is 0:31.

A list displaying portion 581 that displays, as a list, train time information already displayed on the map 41 is displayed to the right of the map 41 on the demand prediction screen.

In the list displaying portion 581, the same information as the time displays 571 to 573 is displayed as a list in a prescribed order such as an ascending order or a descending order of train times or an ascending order or a descending order of distances from the host vehicle position to the station. A sort button 582 is operated when changing the order of display in the list displaying portion 581 such as changing from an ascending order to a descending order of train times, changing from an ascending order to a descending order of distances from the host vehicle position, and changing from an order of train times to an order of distances from the host vehicle position. The train times may be either arrival times or departure times.

Due to the demand prediction application having a function for displaying a prescribed train time such as a time of a last train, opportunities to acquire people who missed a last train, people who had gotten off a last train, or the like as passengers increase. Display of the train time display function can be enabled or disabled according to settings. Instead of displaying train times of all stations displayed on the map 41 on the demand prediction screen, displaying train times may be limited to stations with a large number of users (of which the number of users is equal to or larger than a certain value), terminal stations on which a plurality of railroad lines converge, stations that are stations of origin or stations of destination, or the like. Instead of stations being displayed on the map 41, stations within a certain distance (for example, within a 2.5 km-radius) from the host vehicle position may be displayed. Alternatively, only stations present in a travel direction of the host vehicle may be displayed. Conditions satisfied by stations of which a train time is to be displayed may be made settable on a setting screen.

As described above, with respect to a railroad line with only a small number of operated trains (long operation intervals), all train times may be displayed instead of displaying only a last train or a first train.

The demand prediction application can acquire data of train time display together with pick-up demand prediction data or as a part of pick-up demand prediction data from the server 12 and display the data on the demand prediction screen. The demand prediction application may display a train time in a linked manner with a current location of the taxi 11 and the current time point when it is a prescribed period of time before the train time, or a train time display button may be provided on the demand prediction screen, in which case a train time may be displayed based on an operation of the train time display button by the driver.

22. Reverse Pick-Up Point Display

When passengers use the taxi 11 with Haneda Airport or Narita Airport as their destination, a long ride distance can be expected. Therefore, a driver may desire passengers who are heading to specific destinations. Since a point of origin and a point of arrival are recorded in hired vehicle data, by gathering pieces of hired vehicle data of which the point of arrival is a specific location, pick-up points (points of origin) of which a destination is the specific location can be analyzed.

In consideration thereof, the demand prediction application has a reverse pick-up point displaying function for having the driver designate a specific location as a destination and displaying only pick-up points in previous hired vehicle data where passengers were actually picked up with the designated location as the destination. A reverse pick-up point refers to a pick-up point of which a destination is limited to specific locations. Examples of locations that can be designated as a destination include Haneda Airport, Narita Airport, and Tokyo Disney Resort (registered trademark) (hereinafter, referred to as TDR).

Figure 35:
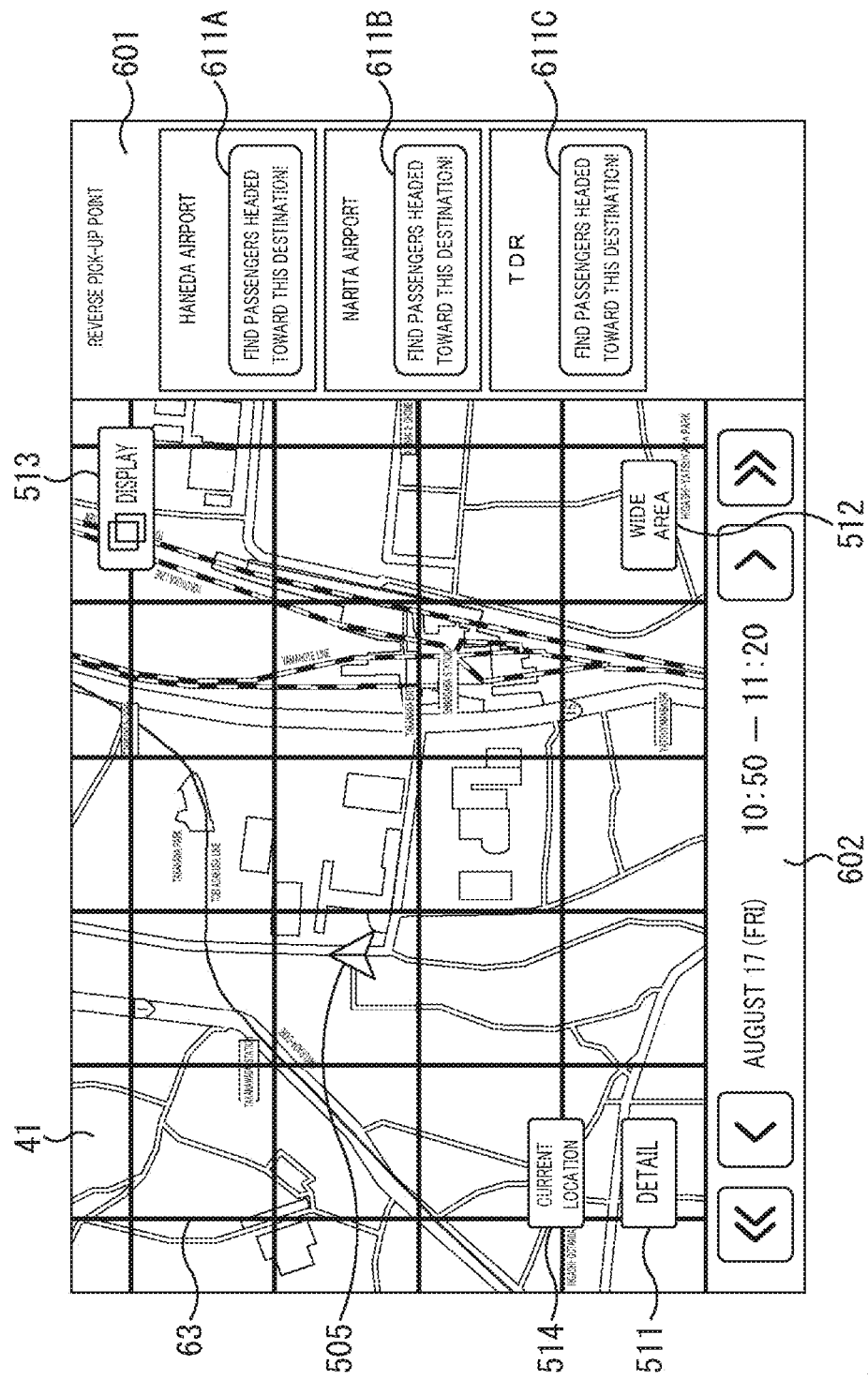
FIG. 35 is a diagram showing an example of the demand prediction screen when the reverse pick-up point display function is executed.

FIG. 35 shows an example of the demand prediction screen when the reverse pick-up point display function is executed.

The recommended route presentation screen shown in FIG. 35 is displayed when, for example, the driver operates a reverse pick-up point display button or the like being displayed on the demand prediction screen.

On the demand prediction screen shown in FIG. 35, a reverse pick-up point displaying portion 601 is arranged next to (to the right of) the map 41 on which the demand prediction mesh 63 is superimposed. A prediction time point display portion 602 is arranged below the map 41.

A list of destinations of passengers of which a demand prediction is to be displayed and an execute button 611 for executing demand prediction display are displayed in the reverse pick-up point displaying portion 601. In the example shown in FIG. 35, three destinations, namely, Haneda Airport, Narita Airport, and TDR are displayed, and an execute button 611A is touched (selected) when displaying a demand prediction of passengers headed toward Haneda Airport, an execute button 611B is touched (selected) when displaying a demand prediction of passengers headed toward Narita Airport, and an execute button 611C is touched (selected) when displaying a demand prediction of passengers headed toward TDR.

The prediction time point display portion 602 displays a prediction time point of demand prediction and, at the same time, the prediction time point of demand prediction can be changed in a similar manner to the prediction time point setting region 42 shown in FIG. 2.

Figure 36:
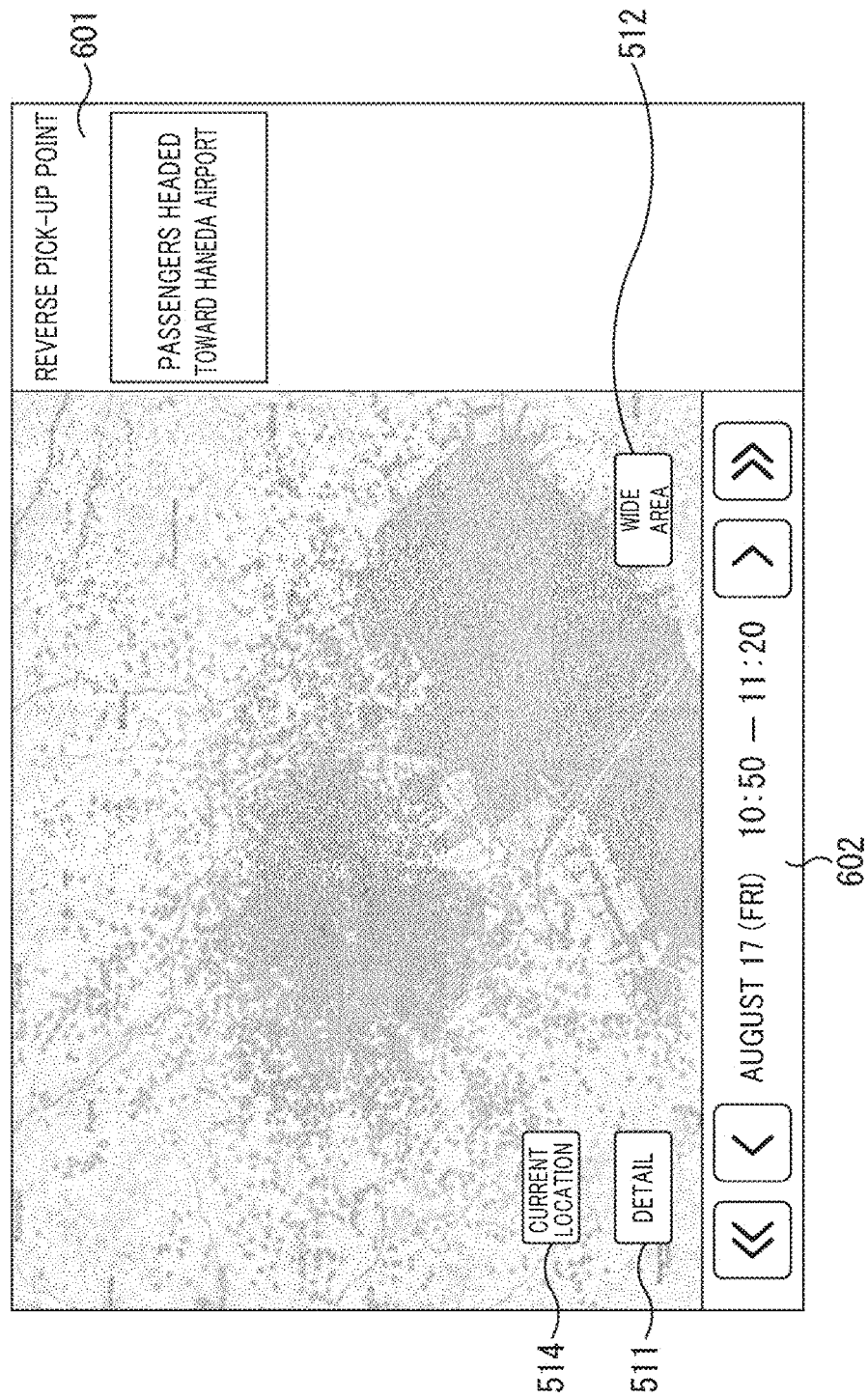
FIG. 36 is a diagram showing an example of the demand prediction screen when a reverse pick-up point display function is executed.

FIG. 36 shows an example of the demand prediction screen of passengers heading toward Haneda Airport when the execute button 611A is touched. A scale of the map 41 on the demand prediction screen can be changed by operating the detail button 511 or the wide area button 512. While the example shown in FIG. 36 is an example in which the scale of the map 41 on the demand prediction screen that is initially displayed by operating the execute button 611A is high magnification (wide-area map), the scale of the map 41 on the demand prediction screen that is initially displayed by operating the execute button 611A may be a same magnification as the map 41 on the demand prediction screen during execution shown in FIG. 35. On the demand prediction screen shown in FIG. 36, for each pick-up point or destination, a probability corresponding to passengers who are headed toward the destination may be displayed.

Demand predictions of passengers having a prescribed location as a destination can be classified according to conditions other than time slots such as weather, day of the week (weekday, day before holiday, holiday), and the like and reverse pick-up points that satisfy such conditions at the time of demand prediction execution can be displayed.

The one or more destinations to be displayed in the reverse pick-up point displaying portion 601 may be locations set in advance such as Haneda Airport, Narita Airport, and TDR shown in FIG. 35 or locations in accordance with a current location of the taxi 11 which are frequently visited from the current location. In addition to the examples described above, other theme parks, concert venues, event venues, ballparks, and the like can be set in advance as the destination.

23. Display of Demand Prediction Classification of Pre-Booking, Hailing, and Queueing When a passenger rides the taxi 11, there are three ways of hiring the taxi 11: "pre-booking", "hailing", and "queueing". "Pre-booking" refers to a method involving booking the taxi 11 through a call center of a taxi company, an application, or the like in advance and having the taxi 11 come to a prescribed location. "Hailing" refers to a method of hailing or flagging a moving taxi 11 for hire. "Queueing" refers to a method involving moving to a queue location and getting on a taxi 11 that is queueing. When displaying a demand prediction on the demand prediction screen, the demand prediction application can display a demand prediction by distinguishing differences in the pick-up methods of "pre-booking", "hailing", and "queueing". In other words, the demand prediction application has a function of displaying a demand prediction by distinguishing differences in the pick-up methods of "pre-booking", "hailing", and "queueing".

Figure 37:
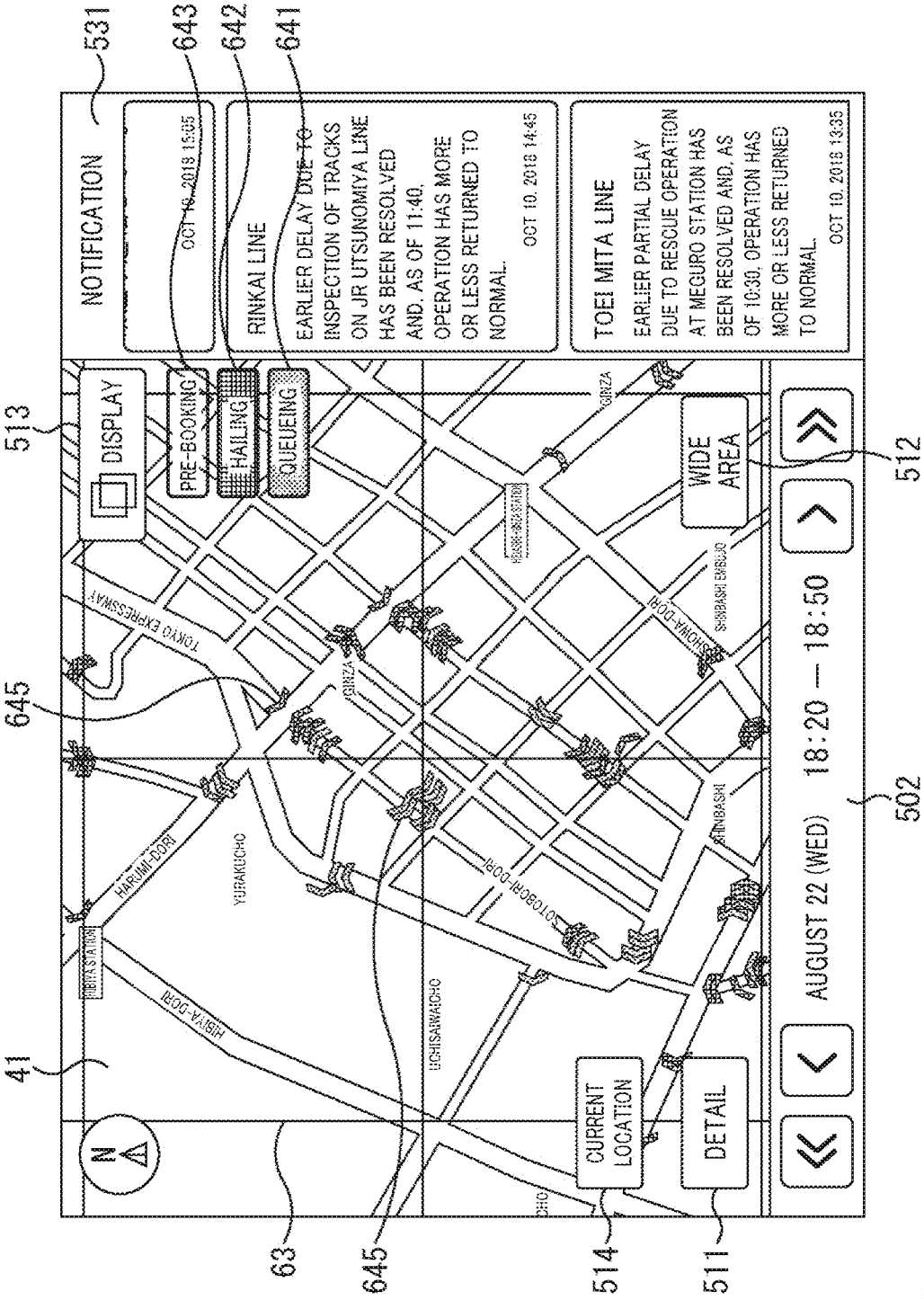
FIG. 37 is a diagram showing an example of the demand prediction screen that distinguishes among pre-booking, cruising, and queueing.

FIG. 37 shows an example of a demand prediction screen that displays a demand prediction by distinguishing differences in the pick-up methods of "pre-booking", "hailing", and "queueing".

The demand prediction screen shown in FIG. 37 is provided with the map 41 on which the demand prediction mesh 63 is superimposed, the prediction time point display portion 502 that enables a prediction time point of demand prediction to be designated, and the additional information display portion 531.

In addition to the detail button 511, the wide area button 512, the full-screen display button 513, and the current location button 514, a queueing display button 641, a hailing display button 642, and a pre-booking display button 643 are provided on the map 41 on the demand prediction screen.

Furthermore, pick-up points 645 of which display methods such as a color, a pattern, a shape of a symbol, and the like are differentiated so that differences in pick-up methods of "pre-booking", "hailing", and "queueing" can be identified are displayed on the map 41.

The queueing display button 641 is operated when displaying pick-up points 645 of which the pick-up method is "queueing" on the map 41. The hailing display button 642 is operated when displaying pick-up points 645 of which the pick-up method is "hailing" on the map 41. The pre-booking display button 643 is operated when displaying pick-up points 645 of which the pick-up method is "pre-booking" on the map 41. The queueing display button 641, the hailing display button 642, and the pre-booking display button 643 are configured as toggle buttons and, every time the buttons are operated, display of pick-up points 645 can be enabled or disabled in units of designated pick-up methods. In addition, "pre-booking", "hailing", and "queueing" can also be arbitrarily combined and, for example, when both "pre-booking" and "hailing" are turned on, both pick-up points 645 of which the pick-up method is "pre-booking" and pick-up points 645 of which the pick-up method is "hailing" are displayed on the map 41.

Demand predictions of pick-up points based on differences in pick-up methods of "pre-booking", "hailing", and "queueing" can be obtained by predicting a pick-up demand for each difference in pick-up methods of "pre-booking", "hailing", and "queueing". For hired vehicle data due to "pre-booking", hired vehicle data of "hired" immediately after the status of the taxi 11 changes to "pre-booked" may be gathered. For hired vehicle data due to "queueing", hired vehicle data of "hired" immediately after a queueing operation may be gathered. For hired vehicle data due to "hailing", hired vehicle data other than "pre-booking" and "queueing" may be adopted.

Displaying pick-up demands (pick-up points) by distinguishing differences in pick-up methods of "pre-booking", "hailing", and "queueing" enables the driver to be presented with pick-up demands suitable to a business style of the driver.

24. Display of Fare Prediction

An example of performing, when a prescribed area AR is selected as an area AR of attention, the long-distance display 241 that displays a ratio of long-distance passengers in the area AR of attention has been described with reference to FIG. 18.

In addition, an example of performing, when a prescribed area AR is selected as the area AR of attention, the ride distance display 251 that displays an average ride distance and a confidence interval thereof of passengers who are picked up in the area AR of attention has been described with reference to FIG. 19.

In addition, with reference to FIG. 19, it has been described that the demand prediction application may display an average fare and a confidence interval instead of an average ride distance and a confidence interval and that the demand prediction application can predict a pick-up demand for each time slot or each type of weather.

Figure 38:
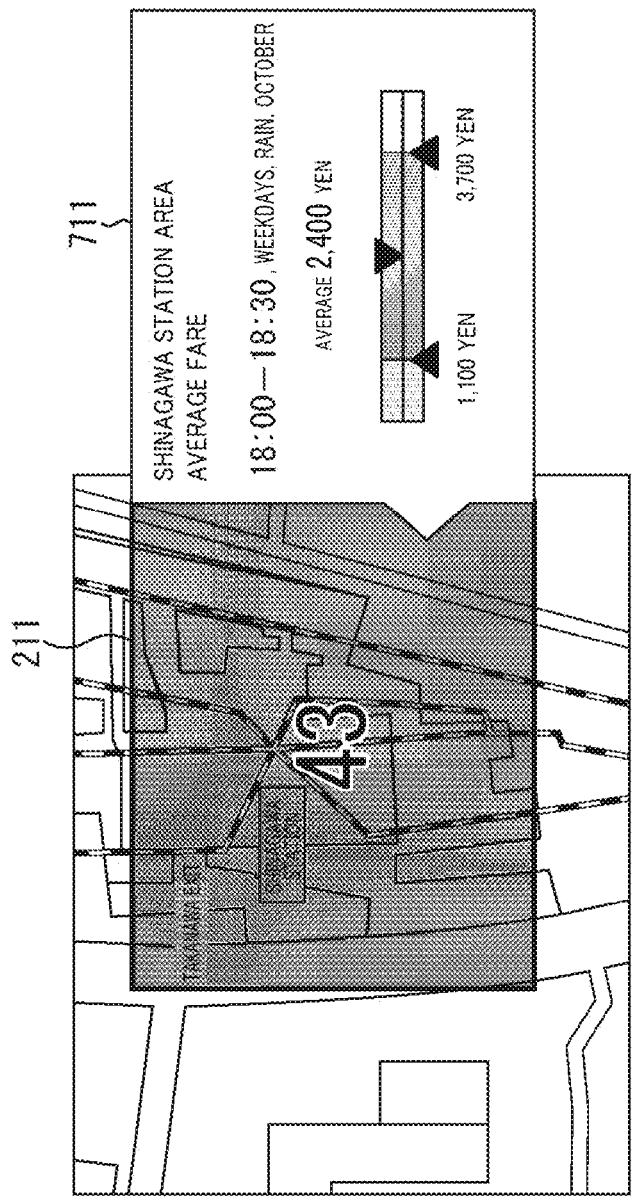
FIG. 38 is a diagram showing an example of the demand prediction screen displaying an average fare and a confidence interval.

FIG. 38 shows a display example in a case where an average fare and a confidence interval of passengers who are picked up in the area AR of attention are displayed.

As shown in FIG. 38, the demand prediction application can perform fare display 711 that displays an average fare and a confidence interval thereof of passengers who are picked up in the area AR of attention separately from the number of pick-ups in the entire area AR of attention.

In the fare display 711, it is displayed that the average fare of pick-ups in the area AR of attention is "2,400 yen" and a confidence interval of the average fare at, for example, 70%-reliability is "1,110 yen to 3,700 yen". The reliability of the confidence interval is not limited to 70% and can be arbitrarily set to 80% or the like.

In addition, in the fare display 711, it is shown that a predicted value of the displayed fare is a value based on hired vehicle data exclusive to "a time slot of 18:00 to 18:30, on weekdays, in rain, and in October".

In this manner, by displaying an average fare and a confidence interval thereof of the area AR of attention, for example, the driver can search for an area AR where high fares can be expected.

The fare display 711 may display an average fare and a confidence interval with respect to the area AR of attention as shown in FIG. 38 or display an average fare and a confidence interval in association with the pinpoint pick-up position symbol 221 (FIG. 15) and display an average fare and a confidence interval with respect to a pinpoint pick-up position.

In addition, in the description given above, while each area AR of the demand prediction mesh 63 is displayed in a different color or density in accordance with a degree of a pick-up demand in a similar manner to the description with reference to FIG. 2, each area AR of the demand prediction mesh 63 may be displayed in a different color or density in accordance with an expected fare. In this case, the driver can perform a "hailing" operation by, for example, selecting a route on which high fares are expected.

25. Display of Number of Vehicles for Hire in Real Time

While the demand prediction application predicts and displays a pick-up demand at a prescribed time point (in a prescribed time slot), for example, when a pick-up demand of 10 taxis is predicted in the area AR of attention but there are 20 taxis 11 that want to pick up passengers in the area AR of attention, 10 taxis 11 will be unable to acquire passengers. In other words, whether or not passengers can be acquired is also dependent on a relationship between demand and supply.

Taxi companies manage, at a dispatch center or the like, current locations and a status such as "hired", "for hire", and "pre-booked" of the respective taxis 11 conducting business in real time. By combining operation data including the current location and the status of each taxi 11 which is acquired in real time and a pick-up demand prediction, the driver can conduct business in a highly-efficient manner which also takes the relationship between demand and supply described above into consideration. It should be noted that "real time" includes a minor time lag (for example, around several minutes) that is required to gather information on a current location and a status of each taxi 11 conducting business, distribute operation data to the demand prediction application, and the like.

Figure 39:
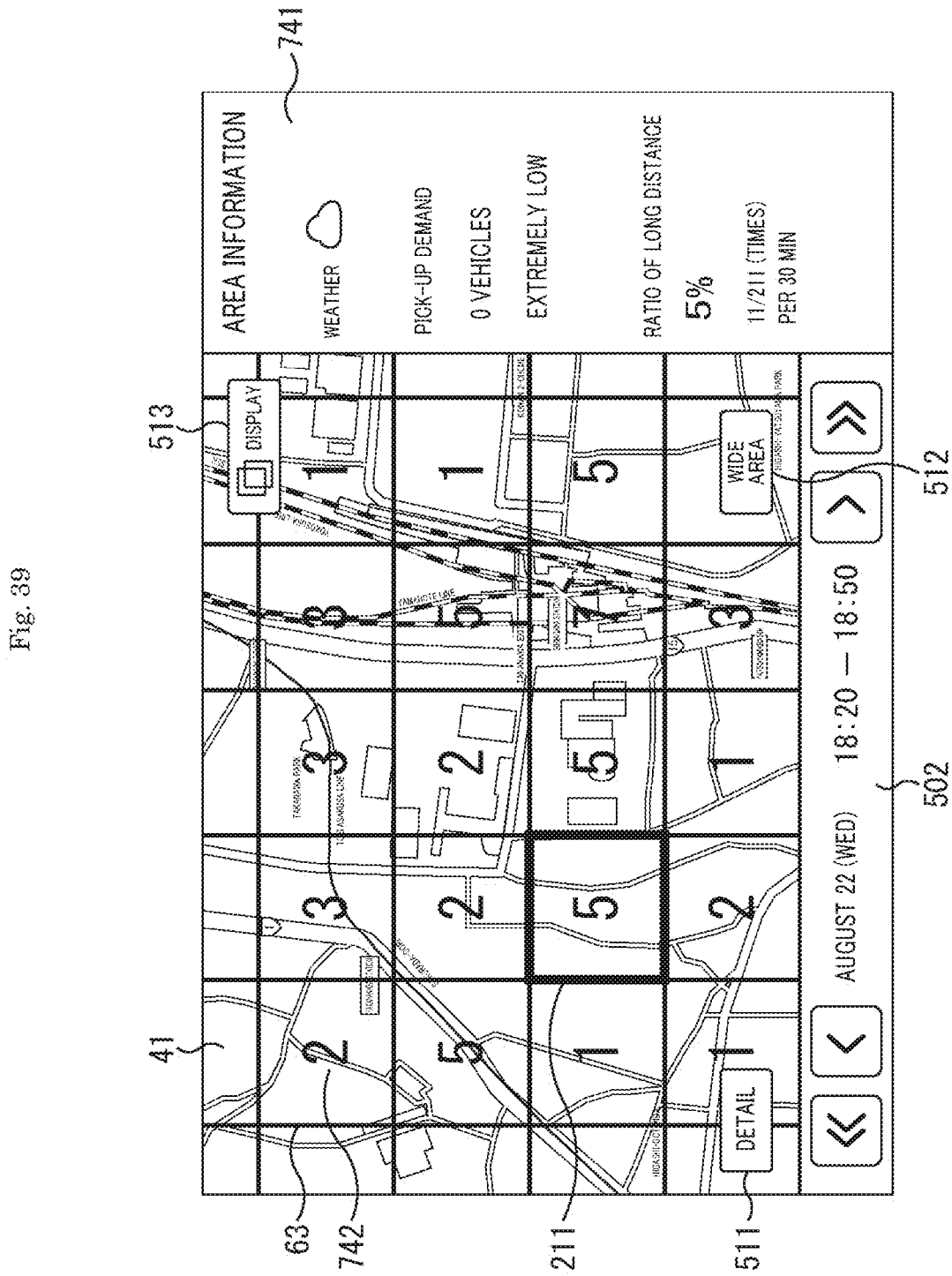
FIG. 39 is a diagram showing an example of the demand prediction screen displaying the number of vehicles for hire in real time.

FIG. 39 shows an example of the demand prediction screen displaying real-time for-hire information based on operation data.

The demand prediction screen shown in FIG. 39 is provided with the map 41 on which the demand prediction mesh 63 is superimposed, the prediction time point display portion 502 that enables a prediction time point of demand prediction to be designated, and an area information display portion 741.

Each area AR divided by the demand prediction mesh 63 of the map 41 displays, in real time, for-hire information 742 of taxis 11 that are present in the area AR. The for-hire information 742 of the taxis 11 represents the number of taxis 11 which are currently moving inside the area AR and of which the status is "for hire".

Among the areas AR divided by the demand prediction mesh 63, an area AR of attention designated by the driver displays the area-of-attention frame 211. The area information display portion 741 displays, as area information, detailed information of the area-of-attention frame 211. For example, the area information display portion 741 displays a predicted number of pick-up demands of the area AR, a ratio of long distance of passengers in the area AR, or the like. The example shown in FIG. 39 represents a case where, in the area AR of attention in which the area-of-attention frame 211 is displayed, there are currently 5 "for hire" taxis 11 despite the predicted number of pick-up demands being 0.

Figure 40:
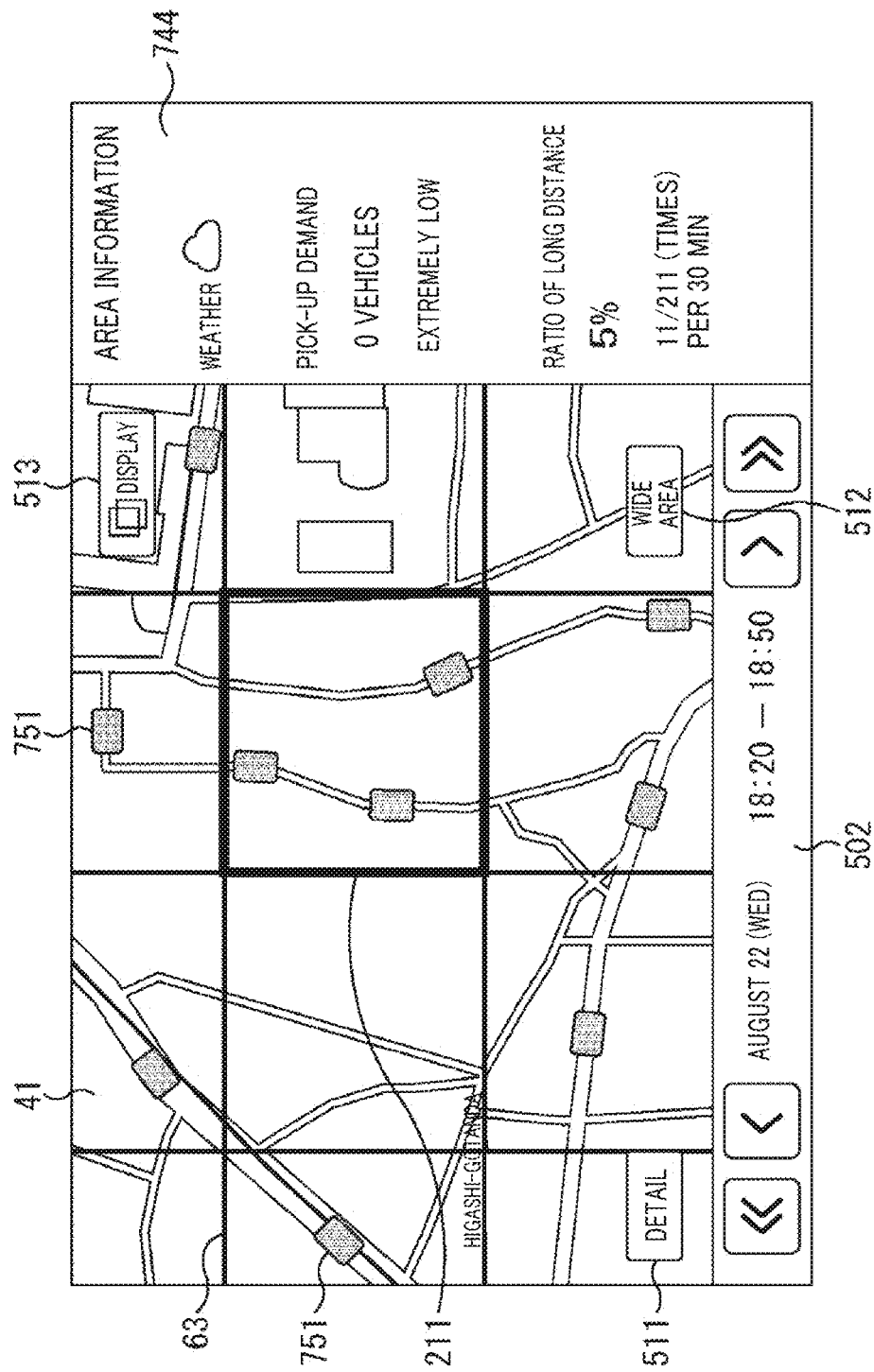
FIG. 40 is a diagram showing an example of the demand prediction screen displaying the number of vehicles for hire in real time.

FIG. 40 shows a display example of the demand prediction screen showing real-time for-hire information in a case where the scale of the map 41 is a low magnification or, in other words, in a case of detailed map display.

FIG. 39 showed a display example of the demand prediction screen showing real-time for-hire information in a case where the scale of the map 41 is a high magnification or, in other words, in a case of wide-area map display. In the case of wide-area map display, as shown in FIG. 39, the number of taxis 11 that are "for hire" is displayed as for-hire information in units of areas AR of the demand prediction mesh 63.

In contrast, in the case of detailed map display, as shown in FIG. 40, an icon 751 indicating a presence of a taxi 11 that is "for hire" is displayed at a position where the taxi 11 that is "for hire" is present.

It should be noted that, at a pick-up point that is a queueing location or the like, the number of taxis queueing at the pick-up point that is a queueing location can also be displayed.

Due to the demand prediction application being equipped with a function for displaying real-time for-hire information based on operation data, the driver can select and operate in an area AR where the probability of acquiring a passenger is high and the probability of acquiring a passenger can be increased.

In addition, when the demand prediction application can acquire operation data, a recommended route can be searched and presented so as to include real-time for-hire information in operation data in the recommended route presentation processing described earlier. In other words, when selecting a prescribed path as a part of a recommended route, the demand prediction application may select a path of which the predicted number of pick-up demands is equal to or higher than the number of taxis that are "for hire" as the recommended route or may add a large score Sc to such a path. Furthermore, when no taxis 11 that are "for hire" have passed along a prescribed path from the present to a prescribed period of time ago, the demand prediction application may include processing of selecting the path as a recommended route since there may be a pick-up demand.

26. Display of One-Day Business Evaluation

The demand prediction application can include a function for outputting, after conclusion of business of a day by the driver, business evaluation information that evaluates the business of the day. The evaluation of business can be performed using a competent driver such as a driver with high average daily sales as a reference. Using a competent driver as a reference driver for evaluations enables a driver to be provided with information for increasing sales.

Figure 41:
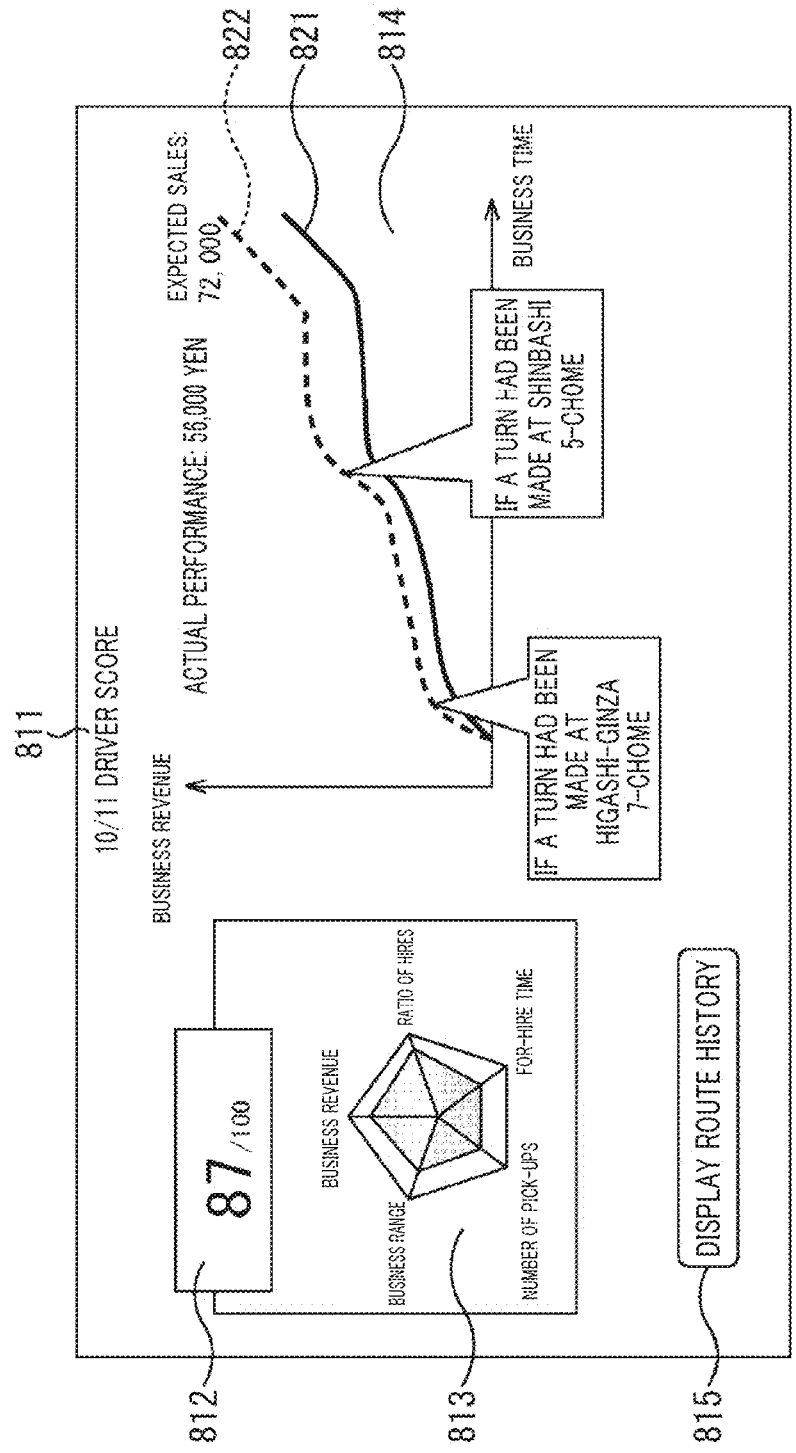
FIG. 41 is a diagram showing an example of an evaluation screen for outputting one-day business evaluation information.

FIG. 41 shows an example of an evaluation screen for outputting one-day business evaluation information. The evaluation screen is displayed at a timing where, for example, an operation to end the day's business is performed on the demand prediction application.

A title display 811 is displayed in an upper part of the evaluation screen shown in FIG. 41. In the example shown in FIG. 41, "10/11 Driver score" is displayed, indicating that the evaluation screen represents evaluation information for a business day of October 11.

In addition, the evaluation screen is provided with an evaluated point display 812, a radar chart 813, a business revenue graph 814, and a route history display button 815.

The evaluated point display 812 indicates a comprehensive evaluation of an entire single day of a driver relative to 100 points for the reference driver. Referring to the comprehensive evaluated value enables the driver to check how much the driver has approached the reference driver.

The radar chart 813 indicates an evaluation result obtained by dividing the comprehensive evaluation of an entire single day of the driver into a plurality of items. In the example shown in FIG. 41, the comprehensive evaluation is divided into five items, namely, a business revenue, a ratio of hires, a for-hire time, the number of pick-ups, and a business range. The business revenue represents an evaluated value from the perspective of business revenue (sales) per actual travel time. The ratio of hires represents an evaluated value from the perspective of travel time when "hired"\total travel time. The for-hire time represents an evaluated value from the perspective of time when "for hire"\total travel time. The number of pick-ups represents an evaluated value from the perspective of the number of times a passenger had been picked up. The business range represents an evaluated value from the perspective of a size of an area traveled.

The business revenue graph 814 displays a trend of business revenue for a single day by having an abscissa represent a business time (business time point) on the day and an ordinate represent business revenue. A solid line 821 displayed in the business revenue graph 814 represents actual sales of the driver. On the other hand, a dashed line 822 displayed in the business revenue graph 814 represents a virtual ideal sales of the driver based on an actual operation path of the driver and operation data of other taxis 11 and the like. For example, if the actual operation path of the driver and operation data of other taxis 11 are available, cases such as when the driver had actually proceeded straight through a given intersection but acquisition of passengers was expected if the driver had made a left turn can be analyzed. Analyzing such suppositions with respect to an actual operation path enables an ideal business revenue that should have been acquired had the operation path been slightly different to be predicted. Such an ideal business revenue is displayed as the dashed line 822. In addition, on the dashed line 822, comments such as "if a turn had been made at Higashi-Ginza 7-chome" and "if a turn had been made at Shinbashi 5-chome" are displayed with respect to points (locations) where there was a possibility that business revenue could have been increased.

The route history display button 815 is a function for displaying an actual operation history for one day of the driver on a map.

Figure 42:
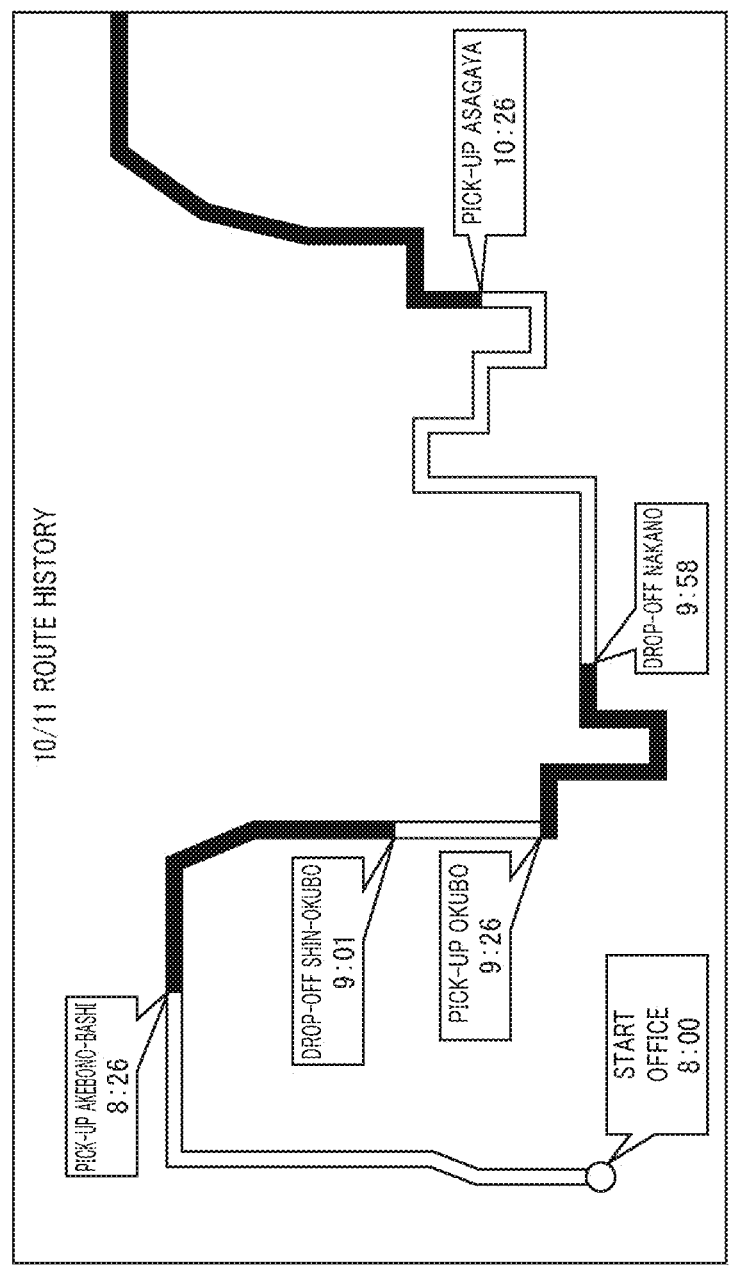
FIG. 42 is a diagram showing an example of an operation history screen.
Figure 48:
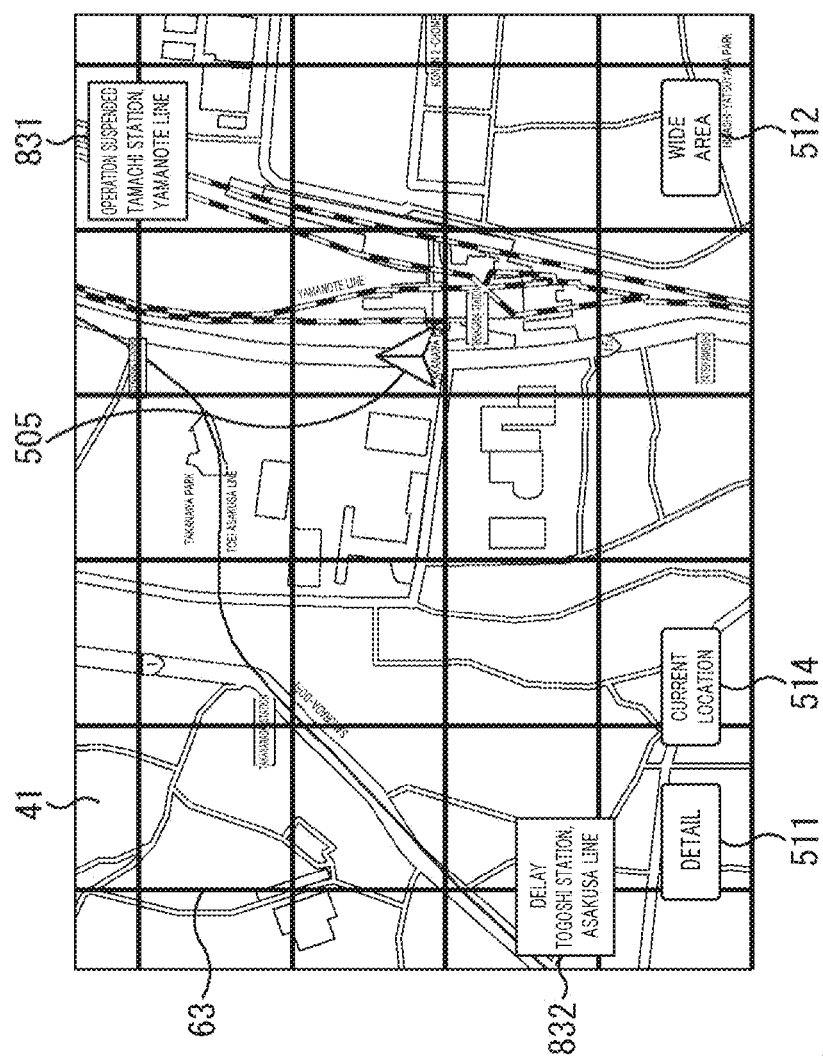

FIG. 42 shows an example of an operation history screen that is displayed when the route history display button 815 is operated.

As shown in FIG. 42, the operation history screen displays a path along which the taxi 11 had moved, a status of "hired", "for hire", or "pre-booked", a location where a passenger had been picked up and a time point thereof and a location where the passenger had been dropped off and a time point thereof, and the like from start of business to end of business of the day. While the map 41 is not displayed in the example shown in FIG. 42, in reality, the operation history screen is superimposed and displayed on the map 41. In addition, while only a part of the operation paths of the day is displayed in the example shown in FIG. 42, the driver may confirm a part of or all of the operation paths of the day by changing a display magnification of the map 41.

The operation history screen shown in FIG. 42 may be combined with the evaluation screen shown in FIG. 41 and displayed on a single screen. By referring to the operation history screen shown in FIG. 42 in combination with the points where there was a possibility that business revenue could have been increased on the business revenue graph 814 on the evaluation screen shown in FIG. 41, the information can be used as a reference when next conducting business.

27. Display of Additional Information in Consideration of Distance and Bearing When displaying addition information such as operation information of trains, event information, or weather information, while the additional information may be displayed in the additional information display portion 531 that is provided in a region that differs from the display region of the map 41 as demonstrated in the example shown in FIG. 32, the additional information may be displayed on the map 41 in consideration of distance and bearing.

FIG. 43 shows an example of the demand prediction screen displaying additional information in consideration of a distance or a bearing.

In the example shown in FIG. 43, additional information 831 and additional information 832 are displayed on the map 41.

The additional information 831 is information notifying that operations have been suspended at Tamachi Station on the Yamanote Line. The additional information 831 is displayed at a position corresponding to a bearing of Tamachi Station with the host vehicle position symbol 505 indicating a current location of the taxi 11 as a reference. In the example shown in FIG. 43, while the additional information 831 is displayed at a position corresponding to a bearing of Tamachi Station because Tamachi Station is at a location outside of the display of the map 41 on the demand prediction screen, supposing that Tamachi Station is on the map 41 on the demand prediction screen, a symbol such as x or Δ indicating that operation has been suspended is displayed together with the additional information 831 in a portion of Tamachi Station on the map 41. Alternatively, as the additional information 831, only a symbol may be displayed, in which case the additional information is displayed when the symbol is tapped (selected).

The additional information 832 is information notifying that a train delay has occurred at Togoshi Station on the Toei Asakusa Line. The additional information 832 is displayed at a position corresponding to a bearing of Togoshi Station with the host vehicle position symbol 505 indicating a current location of the taxi 11 as a reference.

A bearing with the host vehicle position symbol 505 as a reference may be a detailed angle in 1-degree units or an angle that converges to a prescribed range such as four directions or eight directions.

In a similar manner, with respect to distance, when a distance to a position related to additional information from the current location is long, the additional information is displayed far from the host vehicle position symbol 505, but when the distance is short, the additional information is displayed close to the host vehicle position symbol 505.

For example, when additional information is information related to a train delay, a bearing and a direction of a station calculated to have been affected by the train delay from the host vehicle position symbol 505 can be calculated as a position related to the additional information.

For example, when additional information is information related to an event, a bearing and a direction of a location where the event is to be held from the host vehicle position symbol 505 can be calculated as a position related to the additional information.

For example, when additional information is information related to weather such as torrential rain, a bearing and a direction of a location where the weather phenomenon is to occur from the host vehicle position symbol 505 can be calculated as a position related to the additional information.

As described above, by displaying additional information on the map 41 in accordance with a distance and a bearing of the additional information and presenting the additional information to the driver, the driver can intuitively comprehend the additional information.

It should be noted that display of pick-up points 645 (similarly, the demand points 451) to be displayed on the map 41 and display of the prediction time point display portion 502 have been omitted on the demand prediction screen shown in FIG. 43.

28. Display of Information in Accordance with Travel Direction

Among prediction information such as a pick-up point where demand is predicted and supplementary additional information such as event information and train delay information shown in FIG. 43 and the like, although information in the travel direction of the taxi 11 is important, information in an opposite direction to the travel direction is less important. The same description applies to information on paths on the map 41.

Therefore, when displaying the map 41 on the demand prediction screen, the demand prediction application can display the map 41 so that an amount of information displayed in the travel direction is larger than an amount of information displayed in the opposite direction to the travel direction.

A in FIG. 44 represents a display example in a Head Up mode in which the travel direction of the taxi 11 is pointed upward (toward an upper side) of the screen.

In the head up mode, with respect to an entire region of the map 41, the host vehicle position symbol 505 is arranged so that a right-side region R1 and a left-side region L1 are the same or approximately the same in a left-right direction but an upper-side region U1 is larger than a lower-side region D1 in an up-down direction.

B in FIG. 44 represents a display example in a North Up mode in which a bearing of north is pointed upward (toward an upper side) of the screen regardless of the travel direction of the taxi 11.

In the north up mode, while a distribution between the right-side region R1 and the left-side region L1 and a distribution between the upper-side region U1 and the lower-side region D1 differ depending on the travel direction of the taxi 11, B in FIG. 44 represents a display example in which the travel direction of the taxi 11 is northeast. In this case, the host vehicle position symbol 505 is arranged so that the right-side region R1 is larger than the left-side region L1 in the left-right direction and the upper-side region U1 is larger than the lower-side region D1 in the up-down direction.

While other cases will not be illustrated, for example, when the travel direction of the taxi 11 is southwest, the host vehicle position symbol 505 is arranged so that the left-side region L1 is larger than the right-side region R1 in the left-right direction and the lower-side region D1 is larger than the upper-side region U1 in the up-down direction.

As described above, by displaying information so that the amount of information displayed in the travel direction is larger than the amount of information displayed in the opposite direction to the travel direction, information that is more useful to the driver can be displayed.

29. Configuration Example of Computer

The series of processing described above can be executed by hardware or by software. When the series of processing is to be executed by software, a program constituting the software is installed in a computer. Examples of the computer in this case include a microcomputer that is built into dedicated hardware and a general-purpose personal computer or the like capable of executing various functions when various programs are installed therein.

Figure 45:
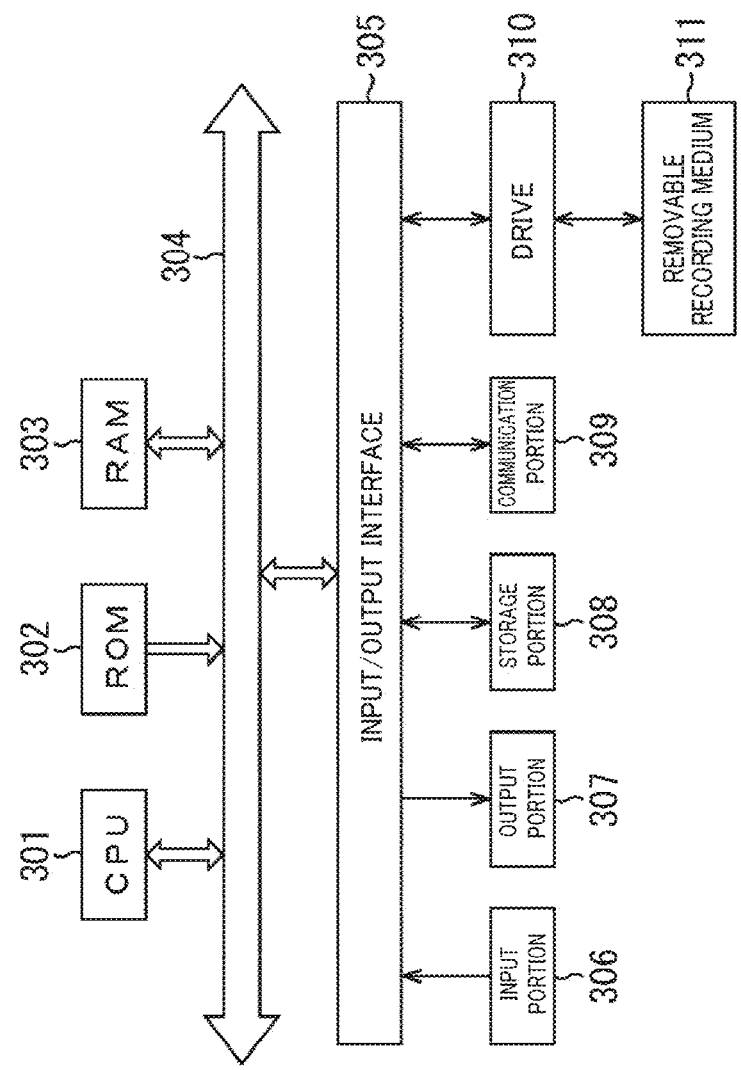
FIG. 45 is a block diagram showing a configuration example of an embodiment of a computer to which the present technique has been applied.

FIG. 45 is a block diagram showing a configuration example of hardware of a computer in a case where the computer executes, using a program, the respective processing steps to be executed by the server 12, the vehicle management apparatus 22, or the terminal apparatus 23.

In a computer, a CPU (Central Processing Unit) 301, a ROM (Read Only Memory) 302, and a RAM (Random Access Memory) 303 are connected to each other by a bus 304.

An input/output interface 305 is further connected to the bus 304. An input portion 306, an output portion 307, a storage portion 308, a communication portion 309, and a drive 310 are connected to the input/output interface 305.

The input portion 306 is constituted by an operating button, a keyboard, a mouse, a microphone, a touch panel, an input terminal, or the like. The output portion 307 is constituted by a display, a speaker, an output terminal, or the like. The storage portion 308 is constituted by a hard disk, a RAM disk, a non-volatile memory, or the like. The communication portion 309 is constituted by a network interface or the like. The drive 310 drives a removable recording medium 311 that is a magnetic disk, an optical disc, a magneto optical disk, a semiconductor memory, or the like.

In the computer configured as described above, the series of processing described earlier is performed as the CPU 301 loads a program stored in the storage portion 308 onto the RAM 303 via the input/output interface 305 and the bus 304 and executes the program. Data required by the CPU 301 to execute the various types of processing is also stored in the RAM 303 when appropriate.

For example, the program executed by the computer (the CPU 301) can be provided by being recorded on the removable recording medium 311 as a packaged medium or the like. Alternatively, the program can be provided via a wired or wireless transmission medium such as a local area network, the Internet, or digital satellite broadcasting.

In the computer, the program can be installed in the storage portion 308 via the input/output interface 305 by mounting the removable recording medium 311 to the drive 310. In addition, the program can be received by the communication portion 309 via a wired or wireless transmission medium and installed in the storage portion 308. Alternatively, the program can be installed in the ROM 302 or the storage portion 308 in advance.

In the present specification, a system signifies a set of a plurality of components (apparatuses, modules (parts), and the like), and whether or not all of the components are present inside a same casing does not matter. Therefore, a plurality of apparatuses which are housed in separate casings but which are connected to each other via a network and a single apparatus in which a plurality of modules are housed in a single casing are both considered systems.

In addition, in the present specification, in addition to cases where the steps described in the flow charts are time-sequentially performed in the described orders, the steps need not necessarily be processed in a time-sequential manner and may be executed in parallel or at necessary timings such as when a call is performed.

Embodiments of the present technique are not limited to the embodiment described above and various modifications can be made without departing from the gist of the present technique.

While an example of a prediction system that predicts demands for hiring a taxi as a business vehicle has been explained in the embodiment described above, the embodiment can also be applied to systems that predict demands for other business vehicles that carry passengers (people) such as buses, trains, airplanes, ocean vessels, and helicopters as well as business vehicles that carry goods (cargo) such as trucks and dump trucks. Alternatively, the business vehicle may be a transport vehicle that operates in an unmanned manner such as a drone.

A mode that combines all of or a part of the embodiment described above as appropriate can be adopted.

For example, the present technique may adopt a configuration of cloud computing in which a single function is shared among and cooperatively processed by a plurality of apparatuses via a network.

In addition, each step explained in the flow charts described above can be executed in a shared manner by a plurality of apparatuses in addition to being executed by a single apparatus.

Furthermore, when a single step includes a plurality of processing steps, the plurality of processing steps included in the single step can be executed in a shared manner by a plurality of apparatuses in addition to being executed by a single apparatus.

It should be noted that the advantageous effects described in the present specification are merely exemplary and are not restrictive, and advantageous effects other than those described in the present specification may be produced.

The present technique can also be configured as follows.

(1)

An information processing apparatus, including:

a display control portion configured to divide a business area of a business vehicle into a plurality of areas and cause a display portion to display, as a prediction result,

49 a movement direction and a movement distance of passengers in an attention area being the area of attention among the plurality of areas for which a pick-up demand has been predicted per area.

(2)

The information processing apparatus according to (1), wherein the display control portion is configured to cause the display portion to display the movement direction and the movement distance by an arrow that is pointed outward from the area of attention.

(3)

The information processing apparatus according to (2), wherein a direction of the arrow represents the movement direction, a length of the arrow represents the movement distance, and a thickness of the arrow represents a ratio of pick-ups in the movement direction to all directions.

(4)

The information processing apparatus according to any one of (1) to (3), wherein the display control portion is configured to cause the display portion to display, as a prediction result, a pick-up position with a large number of pick-ups and the number of pick-ups at the pick-up position in the area of attention.

(5)

The information processing apparatus according to any one of (1) to (4), wherein the display control portion is configured to cause the display portion to display, as a prediction result, a pick-up position with a large number of pick-ups and the number of pick-ups at the pick-up position in the area of attention, and the number of pick-ups of the area of attention.

(6)

The information processing apparatus according to any one of (1) to (5), wherein the display control portion is configured to cause the display portion to display, as a prediction result, a prescribed pick-up position in the area of attention, the number of pick-ups at the pick-up position, and a time required until picking up a passenger while waiting at the pick-up position.

(7)

The information processing apparatus according to any one of (1) to (6), wherein the display control portion is configured to cause the display portion to display, as a prediction result, a ratio of pick-ups in the area of attention of which a ride distance is equal to or longer than a prescribed distance.

(8)

The information processing apparatus according to any one of (1) to (7), wherein the display control portion is configured to divide ride distances in the area of attention into a plurality of classifications and cause the display portion to display, as a prediction result, a ratio of pick-ups for each divided classification.

(9)

The information processing apparatus according to (8), wherein the display control portion is configured to cause the display portion to also display, as a prediction result, a ratio of pick-ups for each classification to all of the plurality of areas.

(10)

The information processing apparatus according to any one of (1) to (9), wherein the display control portion is configured to cause the display portion to display, as a prediction result, a time and a fare required to move to a destination and a time and a fare required by movement for each division unit created by dividing a movement path to the destination into prescribed units.

(11)

The information processing apparatus according to any one of (1) to (10), wherein the display control portion is configured to cause the display portion to display, as a prediction result, an average ride distance and a confidence interval thereof of the passengers in the area of attention.

(12)

The information processing apparatus according to any one of (1) to (10), wherein the display control portion is configured to cause the display portion to display, as a prediction result, an average fare and a confidence interval thereof of the passengers in the area of attention.

(13)

The information processing apparatus according to any one of (1) to (10), wherein the display control portion is configured to cause the display portion to display, as a prediction result, an average ride duration and a confidence interval thereof of the passengers in the area of attention.

(14)

The information processing apparatus according to any one of (1) to (10), wherein the display control portion is configured to cause the display portion to display the prediction result by coupling, as a single area, a plurality of areas of which the number of pick-ups of a plurality of adjacent areas is equal to or smaller than a prescribed threshold among the plurality of divided areas.

(15)

The information processing apparatus according to any one of (1) to (14), further including a notifying portion configured to notify a location which is present in a travel direction and of which a pick-up demand is high by sound.

(16)

The information processing apparatus according to (15), wherein the notifying portion is configured to notify a location of which the pick-up demand is high in units of the areas.

(17)

The information processing apparatus according to (15) or (16), wherein the notifying portion is configured to notify a location of which the pick-up demand is high by varying types of sound in accordance with a scale of the prediction result that is displayed in the display portion.

(18)

The information processing apparatus according to any one of (15) to (17), wherein the notifying portion is configured to notify a location of which the pick-up demand is high by varying types of sound in accordance with a distance to the location of which the pick-up demand is high.

(19)

The information processing apparatus according to any one of (15) to (18), wherein the notifying portion is configured to notify a location of which the pick-up demand is high by varying types of sound in accordance with a magnitude of the pick-up demand.

(20)

The information processing apparatus according to any one of (15) to (19), wherein the notifying portion is configured to make a notification by sound every time a location of which the pick-up demand is passed.

(21)

The information processing apparatus according to any one of (15) to (20), wherein the notifying portion is configured to enable or disable notification in conjunction with a status of "hired" or "for hire".

(22)

The information processing apparatus according to any one of (15) to (21), wherein the sound is a sound effect or a voice message.

(23)

The information processing apparatus according to any one of (15) to (22), wherein the notifying portion is configured to further notify, by a voice message, at least one of operation information of trains, event information, and weather information.

(24)

The information processing apparatus according to any one of (1) to (23), wherein the display control portion is configured to cause the display portion to display a recommended route based on a prediction result of predicting a pick-up demand.

(25)

The information processing apparatus according to (24), wherein the display control portion is configured to search for a route toward a destination having been set and cause the display portion to display the searched route as a recommended route.

(26)

The information processing apparatus according to (25), wherein the destination is an area or a location of specialty of a driver.

(27)

The information processing apparatus according to (26), wherein the area of specialty of a driver is an area in which a time of movement by the driver is equal to or longer than a prescribed value.

(28)

The information processing apparatus according to (26) or (27), wherein the area of specialty of a driver is an area in which a time during which the driver has carried a passenger is equal to or longer than a prescribed value.

(29)

The information processing apparatus according to any one of (26) to (28), wherein a display unit of the area of specialty of a driver is a municipality, and a display unit of the location of specialty of a driver is a pick-up position with a large number of pick-ups.

(30)

The information processing apparatus according to (24), wherein the display control portion is configured to search for a route that passes a location where a pick-up demand is predicted around a current location and cause the display portion to display the searched route as a recommended route.

(31)

The information processing apparatus according to any one of (24) to (30), wherein the display control portion is configured to cause the display portion to display, as the recommended route, a route of which a total score obtained by adding up scores of the route to be passed is high.

(32)

The information processing apparatus according to (31), wherein the total score is calculated by adding up the score for each area based on a level of a pick-up demand.

(33)

The information processing apparatus according to (31), wherein the total score is calculated by adding up the score for each location where a pick-up demand is predicted.

(34)

The information processing apparatus according to any one of (31) to (33), wherein the score at a location that requires traversing the opposite lane is set lower than the score at a location that does not require traversing the opposite lane.

(35)

The information processing apparatus according to any one of (31) to (34), wherein the closer a prediction result of a movement direction of a passenger is to a direction of a destination, the higher the score.

(36)

The information processing apparatus according to any one of (24) to (35), wherein a prediction time point at which the pick-up demand of a prescribed area is predicted when searching for the recommended route is changed in accordance with a distance from a current location.

(37)

The information processing apparatus according to any one of (24) to (36), wherein a route of which the number of predicted vehicles in the pick-up demand is equal to or larger than the number of business vehicles for hire is caused to be displayed as the recommended route.

(38)

The information processing apparatus according to any one of (1) to (37), wherein the display control portion is configured to cause the display portion to further display a no-pick-up zone.

(39)

The information processing apparatus according to any one of (1) to (38), wherein the display control portion is configured to cause the display portion to further display a location where "queueing" is to be performed.

(40)

The information processing apparatus according to (39), wherein the display control portion is configured to cause the display portion to further display a name of a company that is capable of using the location where "queueing" is to be performed.

(41)

The information processing apparatus according to (39) or (40), wherein the display control portion is configured to cause the display portion to further display another location where "queueing" is to be performed that is usable by the business vehicle.

(42)

The information processing apparatus according to any one of (1) to (41), wherein the display control portion is configured to cause a train time at a station on a map displayed in the display portion to be further displayed.

(43)

The information processing apparatus according to (42), wherein the display control portion is configured to cause train times of a plurality of the stations to be displayed as a list in an order of arrival times or an order of distances from a host vehicle position to the stations.

(44)

The information processing apparatus according to any one of (1) to (43), wherein the display control portion is configured to cause only pick-up points where a passenger has been picked up with a designated location as a destination of the passenger to be displayed.

(45)

The information processing apparatus according to (44), wherein the display control portion is configured to cause a plurality of the destinations to be displayed and only pick-up points with a selected destination to be displayed.

(46)

The information processing apparatus according to any one of (1) to (45), wherein the display control portion is configured to cause the display portion to further display a demand prediction of pick-ups by distinguishing among pick-up methods of "pre-booking", "cruising", and "queueing".

(47)

The information processing apparatus according to (46), wherein the display control portion is configured to cause display of the demand prediction of pick-ups to be enabled or disabled in units of pick-up methods of "pre-booking", "cruising", and "queueing".

(48)

The information processing apparatus according to any one of (1) to (47), wherein the display control portion is configured to cause the display portion to display, as a prediction result, an average fare and a confidence interval thereof of the passengers in the area of attention.

(49)

The information processing apparatus according to any one of (1) to (47), wherein the display control portion is configured to cause the display portion to display, as a prediction result, an average fare and a confidence interval thereof of the passengers at a prescribed pick-up position.

(50)

The information processing apparatus according to any one of (1) to (49), wherein the display control portion is configured to cause the display portion to further display real-time for-hire information.

(51)

The information processing apparatus according to (50), wherein the display control portion is configured to cause the number of vehicles for hire for each of the areas to be displayed as the for-hire information.

(52)

The information processing apparatus according to (50) or (51), wherein the display control portion is configured to cause an icon of the business vehicle for hire to be displayed as the for-hire information.

(53)

The information processing apparatus according to any one of (1) to (52), wherein the display control portion is configured to cause the display portion to further display, after conclusion of business of a day, business evaluation information that evaluates the business of the day.

(54)

The information processing apparatus according to (53), wherein the display control portion is configured to cause actual sales and virtual sales to be displayed as a part of the business evaluation information.

(55)

The information processing apparatus according to (53) or (54), wherein the display control portion is configured to cause an operation path including statuses of "hired" and "for hire" to be displayed as a part of the business evaluation information.

(56)

The information processing apparatus according to any one of (1) to (55), wherein the display control portion is configured to cause, in accordance with a distance or a bearing of additional information, the additional information to be further displayed on a map of the display portion.

(57)

The information processing apparatus according to any one of (1) to (56), wherein the display control portion is configured to cause the display portion to display information so that an amount of information to be displayed with respect to information in a travel direction is larger than information in an opposite direction to the travel direction.

(58)

An information processing method, including:
an information processing apparatus
dividing a business area of a business vehicle into a plurality of areas and causing a display portion to display, as a prediction result, a movement direction and a movement distance of passengers in an attention area being the area of attention among the plurality of areas for which a pick-up demand has been predicted per area.

(59)

A program for causing a computer to execute processing for:
dividing a business area of a business vehicle into a plurality of areas; and causing a display portion to display, as a prediction result, a movement direction and a movement distance of passengers in an attention area being the area of attention among the plurality of areas for which a pick-up demand has been predicted per area.

REFERENCE SIGNS LIST

1 Prediction system
11 Taxi
12 Server
22 Vehicle management apparatus
23 Terminal apparatus
63 Demand prediction mesh
121 Control portion
131 Data generating portion
132 Learning portion
133 Predicting portion
141 Control portion
142 Operating portion
143 Display portion
145 Speaker
146 Microphone
211 Area-of-attention frame
212 Arrow
221 Pinpoint pick-up position symbol
222 Number-of-pick-ups display
223 Queueing start button
224 Queueing display
241 Long-distance display
251 Ride distance display
261 Individual display
262 Destination display
301 CPU
302 ROM
303 RAM
306 Input portion
307 Output portion
308 Storage portion
309 Communication portion
310 Drive
521 No-pick-up zone display 531 Additional information display portion
551 Queue location display
553 Detailed information
581 List displaying portion
582 Sort button
601 Reverse pick-up point display portion
641 Queueing display button
642 Cruising display button
643 Pre-booking display button
711 Fare display
741 Area information display portion
742 For-hire information
751 Icon
812 Evaluated point display
813 Radar chart
814 Business revenue graph
815 Route history display button
821, 822 Solid line
831, 832 Additional information

The invention claimed is:

1. An information processing apparatus, comprising:
circuitry configured to
divide a business area of a business vehicle into a plurality of geographic areas and cause a display to display, as a prediction result, a movement direction and a movement distance of passengers in an attention area being an area of attention among the plurality of geographic areas for which a pick-up demand has been predicted per area; and
cause the display to display the movement direction and the movement distance by an arrow that is pointed outward from the area of attention.

2. The information processing apparatus according to claim 1, wherein
a direction of the arrow represents the movement direction, a length of the arrow represents the movement distance, and a thickness of the arrow represents a ratio of pick-ups in the movement direction to pick-ups in all directions.

3. The information processing apparatus according to claim 1, wherein
the circuitry is configured to cause the display to display, as a prediction result, a pick-up position with a number of pick-ups greater than a threshold number and the number of pick-ups at the pick-up position in the area of attention.

4. The information processing apparatus according to claim 1, wherein
the circuitry is configured to cause the display to display, as a prediction result, a pick-up position with a number of pick-ups greater than a threshold number and the number of pick-ups at the pick-up position in the area of attention, and the number of pick-ups of the area of attention.

5. The information processing apparatus according to claim 1, wherein
the circuitry is configured to cause the display to display, as a prediction result, a prescribed pick-up position in the area of attention, the number of pick-ups at the pick-up position, and a time required until picking up a passenger while waiting at the pick-up position.

6. The information processing apparatus according to claim 1, wherein
the circuitry is configured to cause the display to display, as a prediction result, a ratio of pick-ups in the area of attention of which a ride distance is equal to or longer than a prescribed distance compared to a total number of pick-ups.

7. The information processing apparatus according to claim 1, wherein the circuitry is configured to divide ride distances in the area of attention into a plurality of classifications and cause the display to display, as a prediction result, a ratio of pick-ups for each divided classification compared to a total number of pick-ups.

8. The information processing apparatus according to claim 7, wherein
the circuitry is configured to cause the display to also display, as a prediction result, a ratio of pick-ups for each classification compared to a total number of pick-ups for all of the plurality of geographic areas.

9. The information processing apparatus according to claim 1, wherein
the circuitry is configured to cause the display to display, as a prediction result, a time and a fare required to move to a destination and a time and a fare required by movement for each division unit created by dividing a movement path to the destination into prescribed units.

10. The information processing apparatus according to claim 1, wherein
the circuitry is configured to cause the display to display, as a prediction result, an average ride distance and a confidence interval thereof of the passengers in the area of attention.

11. The information processing apparatus according to claim 1, wherein
the circuitry is configured to cause the display to display, as a prediction result, an average fare and a confidence interval thereof of the passengers in the area of attention.

12. The information processing apparatus according to claim 1, wherein
the circuitry is configured to cause the display to display, as a prediction result, an average ride duration and a confidence interval thereof of the passengers in the area of attention.

13. The information processing apparatus according to claim 1, wherein
the circuitry is configured to cause the display to display the prediction result by coupling, as a single area, a plurality of geographic areas of which a number of pick-ups of a plurality of adjacent areas is equal to or smaller than a prescribed threshold among the plurality of divided geographic areas.

14. The information processing apparatus according to claim 1, further comprising a notifier configured to notify, to a user, a location which is present in a travel direction and of which the pick-up demand is high by sound.

15. The information processing apparatus according to claim 1, further comprising a notifier configured to notify, to a user, a location of which the pick-up demand is high in units of the plurality of geographic areas.

16. The information processing apparatus according to claim 14, wherein
the notifier is configured to notify, to the user, a location of which the pick-up demand is high by varying types of sound in accordance with a scale of the prediction result that is displayed in the display.

17. The information processing apparatus according to claim 14, wherein
the notifier is configured to notify, to the user, a location of which the pick-up demand is high by varying types of sound in accordance with a distance to the location of which the pick-up demand is high.

18. An information processing method, comprising:
an information processing apparatus including circuitry configured to
divide a business area of a business vehicle into a plurality of geographic areas and cause a display to display, as a prediction result, a movement direction and a movement distance of passengers in an attention area being an area of attention among the plurality of geographic areas for which a pick-up demand has been predicted per area; and
cause the display to display the movement direction and the movement distance by an arrow that is pointed outward from the area of attention.

19. A non-transitory computer program product having instructions stored therein that when executed by a computer, configure the computer to:
divide a business area of a business vehicle into a plurality of geographic areas and cause a display to display, as a prediction result, a movement direction and a movement distance of passengers in an attention area being an area of attention among the plurality of geographic areas for which a pick-up demand has been predicted per area; and
cause the display to display the movement direction and the movement distance by an arrow that is pointed outward from the area of attention.

* * * * *